United States Patent
Di Martino

(10) Patent No.: US 11,722,360 B2
(45) Date of Patent: Aug. 8, 2023

(54) SOFTWARE DEFINED NETWORKING CONTROL PLANE RESILIENCY TESTING

(71) Applicant: Nokia Solutions and Networks Oy, Espoo (FI)

(72) Inventor: Catello Di Martino, Uberlandia (BR)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 17/151,536

(22) Filed: Jan. 18, 2021

(65) Prior Publication Data
US 2022/0231904 A1 Jul. 21, 2022

(51) Int. Cl.
*H04L 12/24* (2006.01)
*H04L 41/0654* (2022.01)
*H04L 67/60* (2022.01)

(52) U.S. Cl.
CPC .......... *H04L 41/0654* (2013.01); *H04L 67/60* (2022.05)

(58) Field of Classification Search
None
See application file for complete search history.

(56) References Cited

U.S. PATENT DOCUMENTS

| | | | | |
|---|---|---|---|---|
| 10,986,013 B1* | 4/2021 | Theimer | ................ | H04L 43/12 |
| 2014/0337674 A1* | 11/2014 | Ivancic | ................ | H04L 41/342 |
| | | | | 714/43 |
| 2017/0212784 A1* | 7/2017 | Johnsen | ............... | H04L 12/4641 |
| 2017/0242784 A1* | 8/2017 | Heorhiadi | ........... | G06F 11/3692 |
| 2019/0173764 A1* | 6/2019 | Di Martino | ........... | H04L 41/122 |
| 2020/0174832 A1 | 6/2020 | Wilding | | |
| 2020/0175157 A1* | 6/2020 | Wilding | ................ | G06F 9/4881 |
| 2020/0195519 A1 | 6/2020 | Di Martino | | |
| 2020/0322218 A1* | 10/2020 | Anwer | .................... | H04L 41/14 |

OTHER PUBLICATIONS

Di Martino, C., et al., "In Production Performance Testing of SDN Control Plane for Telecom Operators," 2018 4th Annual IEEE/IFIP International Conference on Dependable Systems and Networks, Jun. 25, 2018, pp. 642-653.

(Continued)

*Primary Examiner* — Natisha D Cox
(74) *Attorney, Agent, or Firm* — Tong, Rea, Bentley & Kim, LLC

(57) ABSTRACT

Various example embodiments for supporting control plane resiliency testing in a software defined network are presented. Various example embodiments for supporting control plane resiliency testing in a software defined network may be configured to support control plane resiliency testing in a software defined network based on use of failure injection. Various example embodiments for supporting control plane resiliency testing in a software defined network based on use of failure injection may be configured to support control plane resiliency testing in a software defined network by injecting failures into the software defined network, monitoring the software defined network after the injection of the failures and collecting results data from the software defined network related to the injection of the failures, and evaluating resiliency of the control plane of the software defined network based on the results data from the software defined network related to the injection of the failures.

6 Claims, 29 Drawing Sheets

(56) References Cited

OTHER PUBLICATIONS

EP Search Report mailed in corresponding EP Patent Application No. 22151266.8 dated May 16, 2022, 9 pages.
Kreutz, F., et al., "Towards Secure and Dependable Software-Defined Networks," ACM Proceedings of the 2nd Workshop on Hot Topics in Software Defined Networking (HotSDN'13), Aug. 16, 2013, pp. 55-60.
Kim, H., et al., "Improving Network Management With Software Defined Networking," IEEE Communications Magazine, vol. 51, No. 2, Feb. 2013, pp. 114-119.
Allied Market Research, "Software-Defined Networking Market: Global Opportunity Analysis and Industry Forecasts, 2015-2022," downloaded from www.alliedmarketresearch.com/software-defined-networking-market, Apr. 2017, 6 pages.
Gude, N., et al., "NOX: Towards an Operating System for Networks," ACM SIGCOMM Computer Communication Review, vol. 38, No. 3, Jul. 2008, pp. 105-110.
Erickson, D., The Beacon OpenFlow Controller, ACM Proceeding of the 2nd Workshop on Hot Topics in Software Defined Networking (HotSDN'13), Aug. 2013, pp. 13-18.
Medved, J., et al., "OpenDaylight: Towards a Model-Driven SDN Controller architecture," Proceedings of IEEE 15th International Symposium on a World of Wireless, Mobile and Multimedia Networks 2014, Jun. 19, 2014, 3 pages.
Berde, P., et al., "ONOS: Towards an Open, Distributed SDN OS," ACM Proceedings of the 3rd Workshop on Hot Topics in Software Defined Networking (HotSDN'14), Aug. 22, 2014, pp. 1-6.
McKeown, N., et al., "OpenFlow: Enabling Innovation in Campus Networks," SIGCOMM Computer Communication Review, vol. 38, No. 2, Apr. 2008, pp. 69-74.
Lenrow, D., "Intent As The Common Interface to Network Resources," Presentation at the Intent Based Network Summit 2015, Palo Alto, CA, USA, Feb. 2015, 14 pages.
ONOS Project, "Intent Framework," printed from http://wiki.onosproject.org/display/ONOS/Intent+Framework, May 2016, 3 pages.
Open Networking Foundation, "OpenFlow," printed from www.opennetworking.org/sdnresources/openflow on Jul. 11, 2022, 4 pages.
ONOS Project, "ONOS Mission," printed from http://onosproject.org/mission/ on Jul. 11, 2022, 7 pages.
ONOS Project, "Software Defined Networking—Introducing ONOS—A SDN Network Operating System for Service Providers," ONOS White Paper, http://onosproject.org/wpcontent/uploads/2014/11/Whitepaper-ONOS-final.pdf, 2014, 14 pages.
Castet, J.F., et al., "Survivability and Resiliency of Spacecraft and Space-Based Networks: a Framework for Characterization and Analysis," American Institute of Aeronautics and Astronautics (AIAA) SPACE Conference, Sep. 11, 2008, 17 pages.
Resilinets, "Definitions—ResiliNets Wiki," printed from https://wiki.ittc.ku.edu/resilinetswiki/index.php/DefinitionsResilience on Jul. 12, 2022, 19 pages.
Smith, P., et al., "Network Resilience: a Systematic Approach," IEEE Communications Magazine, vol. 49, No. 7, Jul. 2011, pp. 88-97.
Henry, D., et al., "Generic metrics and quantitative approaches for system resilience as a function of time," Reliability Engineering & System Safety, vol. 99, Mar. 2012, pp. 114-122.
Laprie, J.C., et al., "Resilience for the Scalability of Dependability," Proceedings of the 4th IEEE International Symposium on Network Computing and Applications (NCA), Jul. 27, 2005, 2 pages.
Sharma, S., et al., "OpenFlow: Meeting carrier-grade recovery requirements," Computer Communications, vol. 36, Issue 6, Mar. 2013, pp. 656-665.
Jagadeesan, J., et al., "Programming the Network: Application Software Faults in Software-Defined Networks," Proceedings of the IEEE 27th International Symposium on Software Reliability Engineering Workshops (ISSREW), Oct. 23, 2016, 3 pages.
Bosch, P., et al., "Telco clouds and Virtual Telco: Consolidation, Convergence, and Beyond," Proceedings of the IFIP/IEEE International Symposium on Integrated Network Management (IM), May 23, 2011, 3 pages.
Laprie, J.C., et al. "From Dependability to Resilience," 38th IEEE/IFIP Int. Conf. On Dependable Systems and Networks, 2008, 2 pages.
Avizienis, A., et al., "Basic Concepts and Taxonomy of Dependable and Secure Computing," IEEE Transactions on Dependable and Secure Computing, vol. 1, No. 1, Jan. 2004, pp. 11-33.
Bauer, E., et al., "Reliability and Availability of Cloud Computing," John Wiley & Sons, Jul. 20, 2012, 5 pages.
AWS Team, "Summary of the Amazon Kinesis Event in the Northern Virginia (US-EAST-1) Region," https://aws.amazon.com/message/11201/, Nov. 25, 2020, 5 pages.
Jain, S., et al., "B4: Experience with a Globally-Deployed Software Defined WAN," ACM SIGCOMM Computer Communication Review, vol. 43, No. 4, Aug. 12, 2013, 12 pages.
Basiri, B., et al., "Chaos Engineering," IEEE Software, vol. 33, No. 3, May 2016, pp. 35-41.
Akella. A., et al., "A Highly Available Software Defined Fabric," ACM Proceedings of the 13th ACM Workshop on Hot Topics in Networks (HotNets '14), Oct. 27, 2014, pp. 1-7.
Dimartino, C., et al., "Resiliency Challenges in Accelerating Carrier-Grade Networks with SDN," Proceedings of the 46th Annual IEEE/IFIP International Conference on Dependable Systems and Networks Workshops (DSN-W), Oct. 3, 2016, 2 pages.
Dimartino, C., et al., Measuring the Resiliency of Extreme-Scale Computing Environments, Apr. 2, 2016, 12 pages.
Jha, S., et al., "Resiliency of HPC Interconnects: A Case Study of Interconnect Failures and Recovery in Blue Waters," IEEE Transactions on Dependable and Secure Computing, vol. 15, Issue 6, Nov. 1, 2018, pp. 915-930.
Fonseca, P., et al., "A Replication Component for Resilient OpenFlow-based Networking," 2012 IEEE Network Operations and Management Symposium (NOMS), Apr. 16, 2012, pp. 933-939.
Budhiraja, N. et al., "Chapter 8: The Primary-Backup Approach", Distributed Systems, ACM Press/Addison-Wesley Publishing Co., 2nd ed., 1993, 18 pages.
Arlat, J. et al., "Fault Injection for Dependability Validation: A Methodology and Some Applications," IEEE Transactions on Software Engineering, vol. 16, No. 2, Feb. 1990, pp. 166-182.
Natella, R., et al., "Assessing Dependability with Software Fault Injection: A Survey," ACM Computing Surveys, vol. 48, No. 3, Feb. 2016, 4 pages.
Cinque, M., et al., "An Effective Approach for Injecting Faults in Wireless Sensor Network Operating Systems," The IEEE Symposium on Computers and Communications, Jun. 22, 2010, 3 pages.
Dimartino, C., et al., "Characterization of Operational Failures from a Business Data Processing SaaS Platform," ICSE Companion 2014—Companion Proceedings of the 36th International Conference on Software Engineering, May 2014, 10 pages.
Natella, R., et al., "On Fault Representativeness of Software Fault Injection," IEEE Transactions on Software Engineering, vol. 39, No. 1, Jan. 3, 2013, 17 pages.
Cotroneo, D., et al., "Dependability Evaluation and Benchmarking of Network Function Virtualization Infrastructures," Proceedings of the 1st IEEE Conference on Network Softwarization (NetSoft), Apr. 13, 2015, 9 pages.
Principles of Chaos, "Principles of chaos Engineering," printed from http://principlesofchaos.org/, printed on Jul. 12, 2022, 4 pages.
Netflix Tech Blog, "FIT: Failure Injection Testing", printed from http://techblog.netflix.com/2014/10/fit-failure-injection-testing.html, Oct. 2014, 6 pages.
Alvaro, P., "Automating Failure Testing Research at Internet Scale," Proceedings of the Seventh ACM Symposium on Cloud Computing (SoCC), Oct. 5, 2016, 10 pages.
Lefever., R.M., et al., "An Experimental Evaluation of Correlated Network Partitions in the Coda Distributed FileSystem," Proceedings of the 22nd International Symposium on Reliable Distributed Systems (SRDS), Oct. 6, 2003, 10 pages.

(56) References Cited

OTHER PUBLICATIONS

Dawson, S., et al., "Testing of fault-tolerant and real-time distributed systems via protocol fault injection," Proceedings of Annual Symposium on Fault Tolerant Computing, Jun. 25, 1996, 3 pages.

Dimartino, C., et al., "Characterization of Operational Failures from a Business Data Processing SaaS Platform," in Companion Proceedings of the 36th International Conference on Software Engineering (ICSE '14), May 31, 2014, 10 pages.

Github, "A blog post on Network partitions in practice", printed from https://github.com/aphyr/partitions-post, May 19, 2014, 17 pages.

Apache Software Foundation, "Apache Active MQ," printed from http://activemq.apache.org, printed on Jul. 13, 2022, 2 pages.

Apache Software Foundation, Apache Karaf, "Monitoring and Management using JMX", printed from https://karaf.apache.org/manual/latest-3.0.x/monitoring, printed on Jul. 18, 2022, 10 pages.

Mwaikambo, Z., et al., "Linux Kernel Hotplug CPU Support," Proceedings of the Linux Symposium 2004—vol. Two, 2004, pp. 467-480.

Linux Foundation, "tc-tbf(8)—Linux man page—Token Bucket Filter," printed from http://linux.die.net/man/8/tc-tbf, printed on Jul. 13, 2022, 3 pages.

Linux Foundation, "iptables(8)—Linux man page—iptables administration tool for IPv4 packet filtering and NAT," printed from https://linux.die.net/man/8/iptables, printed on Jul. 13, 2022, 34 pages.

Linux Foundation, "ip(8)—Linux man page—ip show/manipulate routing, devices, policy routing and tunnels," printed from https://linux.die.net/man/8/ip, printed on Jul. 13, 2022, 27 pages.

Linux Foundation, "ptrace(2)—Linux manual page," printed from http://man7.org/linux/manpages/man2/ptrace.2.html, printed on Jul. 13, 2022, 33 pages.

Keniston, J., et al., "Ptrace, Utrace, Uprobes: Lightweight, Dynamic Tracing of User Apps," Proceedings of the 2007 Linux Symposium, vol. 1, 2007, pp. 215-224.

Sieh, V., "Fault-injector Using UNIX Ptrace Interface 1. Introduction 2. Ptrace(2) Interface," Computer Science, 1993, 4 pages.

Github, "The Raft Consensus Algorithm," printed from https://raft.github.io/, printed on Jul. 13, 2022, 12 pages.

Open Networking Foundation, "Collaboratively transforming network infrastructure by leveraging: Open Source Software, Cloud-Native and SDN Technologies, Disaggregation and White Box Hardware," printed from http://onlab.us, printed on Jul. 13, 2022, 12 pages.

Linux Foundation, tc(8)—Linux manual page—tc—show / manipulate traffic control settings, printed from http://man7.org/linux/manpages/man8/tc-netem.8.html, printed on Jul. 13, 2022, 15 pages.

\* cited by examiner

FIG. 4

| Failure class | Failure type | Description |
|---|---|---|
| System Failures | System Hang | Stuck the system on an infinite loop without releasing the resources. The system's network interfaces are still responding. |
| | System Starvation | Cause the starvation of all the available system resources. The system first slow down, then crashes. |
| | System Outage | Cause a fatal error from which the system cannot safely recover (e.g. kernel panic). |
| | CPU Shutdown | Restrict the number of available CPUs. |
| | Disk Saturation | Cause the saturation of the disk, mimicking disk full errors. |
| | Memory Saturation | Cause the saturation of the memory, mimicking memory full errors. |
| | Burn CPU | Spawn CPU-bound processes, mimicking a faulty CPU and/or noisy process. |
| | Burn I/O | Spawn I/O-bound processes, mimicking a faulty disk and/or noisy process. |
| Network Failures | Black-hole | Abruptly drop the network communications towards a specific address or a subset of addresses. |
| | Packet Reject | Abruptly drop the inbound and/or outbound packets sent to specified address and/or port. |
| | Packet Drop | Quietly drop the inbound and/or outbound packets sent to specified address and/or port. |
| | Packet Latency | Induce artificial delays for packets sent to specified address and/or port. |
| | Packet Loss | Induce artificial losses for the packets sent to specified address and/or port. |
| | Packet Re-order | Induce a mis-ordering of certain packets sent to specified addresses and/or port. |
| | Packet Duplication | Induce duplication of certain packets sent to specified addresses and/or port. |
| | Packet Corruption | Induce a random noise by introducing an error in a random position of certain packets sent to specified addresses and/or port. |
| | Throttling | Induce a bandwidth limitation to the outgoing network traffic with specified addresses and/or port. |
| SDN Controller Failures | Kill Process | Quietly terminate the controller process (*SIGTERM* signal), mimicking a faulty service. |
| | Process Corruption | Randomly corrupt the state of the SDN controller process, mimicking a service misbehaviour. |
| | Controller Shutdown | Quietly stop of the SDN controller process. |
| | Controller Restart | Gracefully restart the SDN controller. |
| | Dependency Shutdown | Quietly stop one or more dependencies, i.e., modules of the SDN controller. |

FIG. 8

```
experiments:                    experiments:
-                               -
  id: CPUBURN_1                   id: NET_LATENCY_1
  runs: 5                         runs: 5
  cell: "five_controller_cell"    cell: "three_controller_cell"
  duration: 5                     duration: 5
  networkTopologyInfo:            networkTopologyInfo:

...                             ...
  failure:                        failure:
   hosts:                          hosts:
     - "X.Y.Z.1"                    - "X.Y.Z.1"
     - "X.Y.Z.2"                    - "X.Y.Z.2"
   what: burnCpu                   what: networkLatency
   when: now                       when: now
   where: compute                  where: compute
   mode: transient                 mode: permanent
   injectionSpanTime: 10           destinationIps:
   tasks: 10                        - "X.Y.Z.3
```

FIG. 12

| | Failure type | Configurable Parameters | Values |
|---|---|---|---|
| System Failures | System Hang | n/a | n/a |
| | System Starvation | n/a | n/a |
| | System Outage | n/a | n/a |
| | CPU Shutdown | CPUs to shutdown | 6 |
| | Disk Saturation | n/a | n/a |
| | Memory Saturation | n/a | n/a |
| | Burn CPU | CPU-bound tasks | 100 tasks |
| | Burn I/O | I/O-bound tasks | 100 tasks |
| Network Failures | Black-hole | Subnet to black hole. | control-plane subnet |
| | Packet Reject | Reject mode | outgoing packets |
| | Packet Drop | Drop mode | outgoing packets |
| | Packet Latency | Latency | 200ms |
| | Packet Loss | Loss percentage | 10% |
| | Packet Reorder[a] | Ordered percentage | 30% |
| | | Latency | 200ms |
| | Packet Duplication | Duplication percentage | 10% |
| | Packet Corruption | Corruption percentage | 10% |
| | Throttling | Bandwidth limitation | 1 Mbit |
| SDN Controller Failures | Kill Process | Process Name or PID | Controller's PID |
| | Process Corruption | Process Name or PID | Controller's PID |
| | Controller Stop | n/a | n/a |
| | Controller Restart | n/a | n/a |
| | Dependency Stop | Dependency Name | ONOS core |

FIG. 13

|  | Throughput [req/s] LoadLevel 1000 | Throughput [req/s] LoadLevel 3000 |
|---|---|---|
| 3 Controller | 997.52 | 2978.32 |
| 5 Controller | 997.39 | 2987.68 |

FIG. 14

|  | Latency [ms] LoadLevel 1000 | | Latency [ms] LoadLevel 3000 | |
|---|---|---|---|---|
|  | 50th %ile | 90th %ile | 50th %ile | 90th %ile |
| 3 Controller | 46 | 84 | 128 | 1007 |
| 5 Controller | 45 | 81 | 89 | 173 |

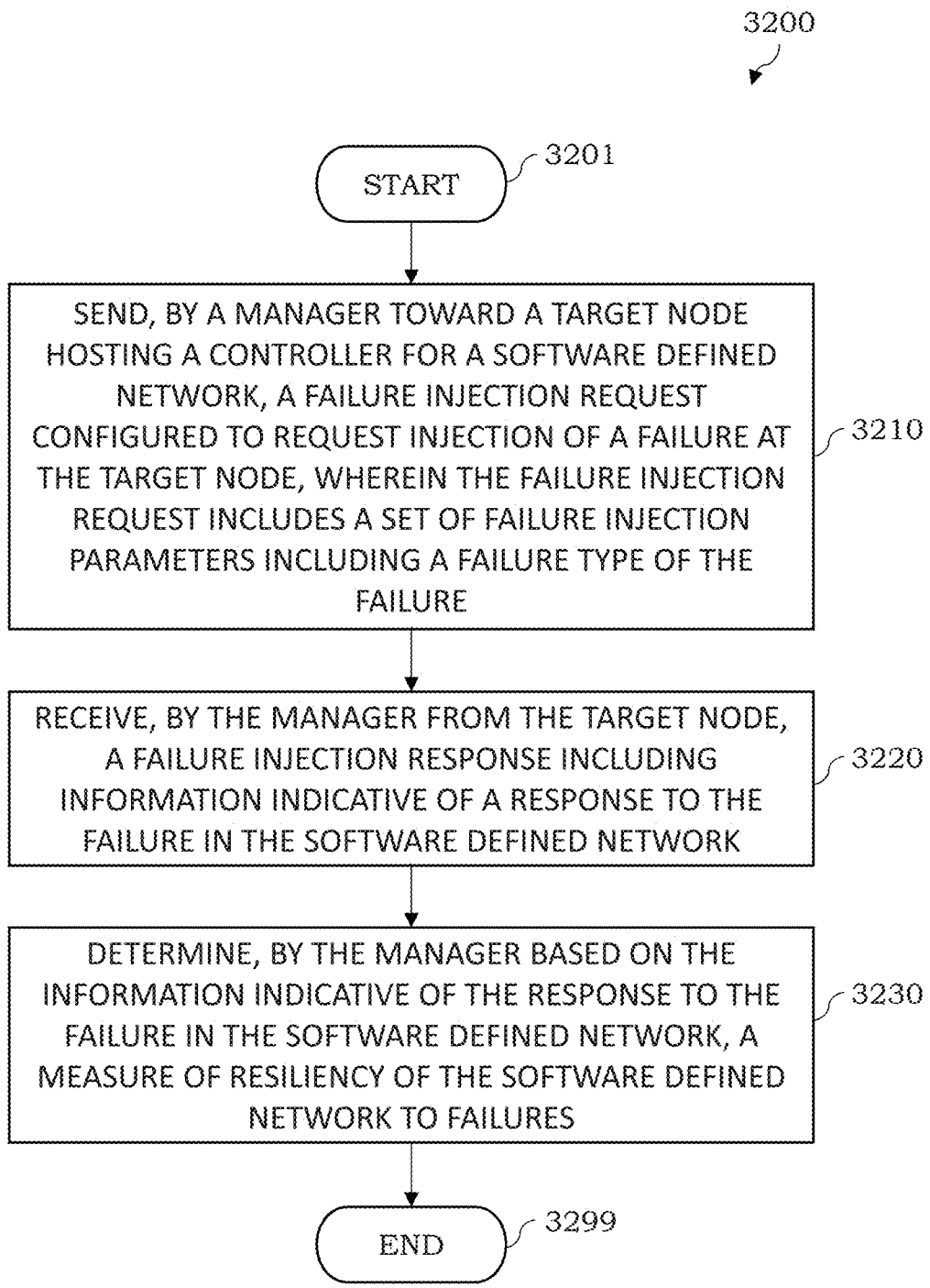

SOFTWARE DEFINED NETWORKING CONTROL PLANE RESILIENCY TESTING

TECHNICAL FIELD

Various example embodiments relate generally to communication systems and, more particularly but not exclusively, to supporting control plane resiliency testing in software defined networks.

BACKGROUND

In various communication networks, various communications technologies may be used to support various types of communications.

SUMMARY

In at least some example embodiments, an apparatus includes at least one processor and at least one memory including a set of instructions, wherein the set of instructions is configured to, when executed by the at least one processor, cause the apparatus to receive, by a target node configured to host a controller for a software defined network, a failure injection request configured to request injection of a failure at the target node, wherein the failure injection request includes a set of failure injection parameters including a failure type of the failure, inject, by the target node based on the set of failure injection parameters, a failure at the target node, and send, by the target node, a failure injection response including information indicative of a response to the failure in the software defined network. In at least some example embodiments, the set of failure injection parameters further includes at least one of a failure injection time for the failure or a failure injection duration for the failure. In at least some example embodiments, the failure type of the failure is indicative that the failure is a system failure. In at least some example embodiments, the system failure includes at least one of a system hang failure, a system starvation failure, a system outage failure, a central processing unit shutdown failure, a disk saturation failure, a memory saturation failure, a burn central processing unit failure, or a burn input/output failure. In at least some example embodiments, the failure type of the failure is indicative that the failure is a network failure. In at least some example embodiments, the network failure includes at least one of a black-hole failure, a packet reject failure, a packet drop failure, a packet latency failure, a packet loss failure, a packet re-order failure, a packet duplication failure, a packet corruption failure, or a throttling failure. In at least some example embodiments, the failure type of the failure is indicative that the failure is a controller failure. In at least some example embodiments, the controller failure includes at least one of a kill process failure, a process corruption failure, a controller shutdown failure, a controller restart failure, or a dependency shutdown failure. In at least some example embodiments, to inject the failure at the target node, the set of instructions is configured to, when executed by the at least one processor, cause the apparatus to determine, based on the failure type of the failure, whether to direct the request to host resources of the target node or to the controller for the software defined network. In at least some example embodiments, the failure injection response includes at least one of an indication as to whether a performance degradation was detected in the software defined network as a result of the failure, an indication as to whether an element of the software defined network raised a notification of the failure, a time at which an element of the software defined network raised a notification of the failure, or an indication as to whether a recovery process was successfully completed in response to the failure, or an indication as to whether an intent was successfully processed during the failure.

In at least some example embodiments, a non-transitory computer-readable medium stores a set of instructions configured to cause an apparatus to receive, by a target node configured to host a controller for a software defined network, a failure injection request configured to request injection of a failure at the target node, wherein the failure injection request includes a set of failure injection parameters including a failure type of the failure, inject, by the target node based on the set of failure injection parameters, a failure at the target node, and send, by the target node, a failure injection response including information indicative of a response to the failure in the software defined network. In at least some example embodiments, the set of failure injection parameters further includes at least one of a failure injection time for the failure or a failure injection duration for the failure. In at least some example embodiments, the failure type of the failure is indicative that the failure is a system failure. In at least some example embodiments, the system failure includes at least one of a system hang failure, a system starvation failure, a system outage failure, a central processing unit shutdown failure, a disk saturation failure, a memory saturation failure, a burn central processing unit failure, or a burn input/output failure. In at least some example embodiments, the failure type of the failure is indicative that the failure is a network failure. In at least some example embodiments, the network failure includes at least one of a black-hole failure, a packet reject failure, a packet drop failure, a packet latency failure, a packet loss failure, a packet re-order failure, a packet duplication failure, a packet corruption failure, or a throttling failure. In at least some example embodiments, the failure type of the failure is indicative that the failure is a controller failure. In at least some example embodiments, the controller failure includes at least one of a kill process failure, a process corruption failure, a controller shutdown failure, a controller restart failure, or a dependency shutdown failure. In at least some example embodiments, to inject the failure at the target node, the set of instructions is configured to determine, based on the failure type of the failure, whether to direct the request to host resources of the target node or to the controller for the software defined network. In at least some example embodiments, the failure injection response includes at least one of an indication as to whether a performance degradation was detected in the software defined network as a result of the failure, an indication as to whether an element of the software defined network raised a notification of the failure, a time at which an element of the software defined network raised a notification of the failure, or an indication as to whether a recovery process was successfully completed in response to the failure, or an indication as to whether an intent was successfully processed during the failure.

In at least some example embodiments, a method includes receiving, by a target node configured to host a controller for a software defined network, a failure injection request configured to request injection of a failure at the target node, wherein the failure injection request includes a set of failure injection parameters including a failure type of the failure, injecting, by the target node based on the set of failure injection parameters, a failure at the target node, and sending, by the target node, a failure injection response including information indicative of a response to the failure in the software defined network. In at least some example embodiments, the set of failure injection parameters further includes at least one of a failure injection time for the failure or a failure injection duration for the failure. In at least some example embodiments, the failure type of the failure is indicative that the failure is a system failure. In at least some example embodiments, the system failure includes at least one of a system hang failure, a system starvation failure, a system outage failure, a central processing unit shutdown failure, a disk saturation failure, a memory saturation failure, a burn central processing unit failure, or a burn input/output failure. In at least some example embodiments, the failure type of the failure is indicative that the failure is a network failure. In at least some example embodiments, the network failure includes at least one of a black-hole failure, a packet reject failure, a packet drop failure, a packet latency failure, a packet loss failure, a packet re-order failure, a packet duplication failure, a packet corruption failure, or a throttling failure. In at least some example embodiments, the failure type of the failure is indicative that the failure is a controller failure. In at least some example embodiments, the controller failure includes at least one of a kill process failure, a process corruption failure, a controller shutdown failure, a controller restart failure, or a dependency shutdown failure. In at least some example embodiments, injecting the failure at the target node includes determining, based on the failure type of the failure, whether to direct the request to host resources of the target node or to the controller for the software defined network. In at least some example embodiments, the failure injection response includes at least one of an indication as to whether a performance degradation was detected in the software defined network as a result of the failure, an indication as to whether an element of the software defined network raised a notification of the failure, a time at which an element of the software defined network raised a notification of the failure, or an indication as to whether a recovery process was successfully completed in response to the failure, or an indication as to whether an intent was successfully processed during the failure.

In at least some example embodiments, an apparatus includes means for receiving, by a target node configured to host a controller for a software defined network, a failure injection request configured to request injection of a failure at the target node, wherein the failure injection request includes a set of failure injection parameters including a failure type of the failure, means for injecting, by the target node based on the set of failure injection parameters, a failure at the target node, and means for sending, by the target node, a failure injection response including information indicative of a response to the failure in the software defined network. In at least some example embodiments, the set of failure injection parameters further includes at least one of a failure injection time for the failure or a failure injection duration for the failure. In at least some example embodiments, the failure type of the failure is indicative that the failure is a system failure. In at least some example embodiments, the system failure includes at least one of a system hang failure, a system starvation failure, a system outage failure, a central processing unit shutdown failure, a disk saturation failure, a memory saturation failure, a burn central processing unit failure, or a burn input/output failure. In at least some example embodiments, the failure type of the failure is indicative that the failure is a network failure. In at least some example embodiments, the network failure includes at least one of a black-hole failure, a packet reject failure, a packet drop failure, a packet latency failure, a packet loss failure, a packet re-order failure, a packet duplication failure, a packet corruption failure, or a throttling failure. In at least some example embodiments, the failure type of the failure is indicative that the failure is a controller failure. In at least some example embodiments, the controller failure includes at least one of a kill process failure, a process corruption failure, a controller shutdown failure, a controller restart failure, or a dependency shutdown failure. In at least some example embodiments, the means for injecting the failure at the target node includes means for determining, based on the failure type of the failure, whether to direct the request to host resources of the target node or to the controller for the software defined network. In at least some example embodiments, the failure injection response includes at least one of an indication as to whether a performance degradation was detected in the software defined network as a result of the failure, an indication as to whether an element of the software defined network raised a notification of the failure, a time at which an element of the software defined network raised a notification of the failure, or an indication as to whether a recovery process was successfully completed in response to the failure, or an indication as to whether an intent was successfully processed during the failure.

In at least some example embodiments, an apparatus includes at least one processor and at least one memory including a set of instructions, wherein the set of instructions is configured to, when executed by the at least one processor, cause the apparatus to send, by a manager toward a target node hosting a controller for a software defined network, a failure injection request configured to request injection of a failure at the target node, wherein the failure injection request includes a set of failure injection parameters including a failure type of the failure, receive, by the manager from the target node, a failure injection response including information indicative of a response to the failure in the software defined network, and determine, by the manager based on the information indicative of the response to the failure in the software defined network, a measure of resiliency of the software defined network to failures. In at least some example embodiments, the set of failure injection parameters further includes at least one of a failure injection time for the failure or a failure injection duration for the failure. In at least some example embodiments, the failure type of the failure is indicative that the failure is a system failure, a network failure, or a controller failure. In at least some example embodiments, the information indicative of the response to the failure in the software defined network includes at least one of an indication as to whether a performance degradation was detected in the software defined network as a result of the failure, an indication as to whether an element of the software defined network raised a notification of the failure, a time at which an element of the software defined network raised a notification of the failure, or an indication as to whether a recovery process was successfully completed in response to the failure, or an indication as to whether an intent was successfully processed during the failure. In at least some example embodiments, the measure of resiliency of the software defined network to failures includes a measure of resiliency of a control plane of the software defined network to failures. In at least some example embodiments, the measure of resiliency of the software defined network to failures includes a failure detection coverage computed based on a number of tests in which injected failures are detected and reported and a number of tests in which failures are not detected. In at least some example embodiments, the measure of resiliency of the software defined network to failures includes a failure detection latency computed based on a time at which the failure was injected at the target node and a time at which a notification of the failure was raised in the software defined network. In at least some example embodiments, the measure of resiliency of the software defined network to failures includes a failure recovery coverage computed based on a number of tests in which failures were detected and a number of tests in which a recovery action was successfully completed in response to failures. In at least some example embodiments, the measure of resiliency of the software defined network to failures includes a failure recovery latency computed based on a time at which a notification of the failure was raised in the software defined network and a time at which a recovery action was successfully completed in response to the failure. In at least some example embodiments, the measure of resiliency of the software defined network to failures includes an availability computed based on a number of intents requested during the failure and a number of intents successfully processed during the failure.

In at least some example embodiments, a non-transitory computer-readable medium stores a set of instructions configured to cause an apparatus to send, by a manager toward a target node hosting a controller for a software defined network, a failure injection request configured to request injection of a failure at the target node, wherein the failure injection request includes a set of failure injection parameters including a failure type of the failure, receive, by the manager from the target node, a failure injection response including information indicative of a response to the failure in the software defined network, and determine, by the manager based on the information indicative of the response to the failure in the software defined network, a measure of resiliency of the software defined network to failures. In at least some example embodiments, the set of failure injection parameters further includes at least one of a failure injection time for the failure or a failure injection duration for the failure. In at least some example embodiments, the failure type of the failure is indicative that the failure is a system failure, a network failure, or a controller failure. In at least some example embodiments, the information indicative of the response to the failure in the software defined network includes at least one of an indication as to whether a performance degradation was detected in the software defined network as a result of the failure, an indication as to whether an element of the software defined network raised a notification of the failure, a time at which an element of the software defined network raised a notification of the failure, or an indication as to whether a recovery process was successfully completed in response to the failure, or an indication as to whether an intent was successfully processed during the failure. In at least some example embodiments, the measure of resiliency of the software defined network to failures includes a measure of resiliency of a control plane of the software defined network to failures. In at least some example embodiments, the measure of resiliency of the software defined network to failures includes a failure detection coverage computed based on a number of tests in which injected failures are detected and reported and a number of tests in which failures are not detected. In at least some example embodiments, the measure of resiliency of the software defined network to failures includes a failure detection latency computed based on a time at which the failure was injected at the target node and a time at which a notification of the failure was raised in the software defined network. In at least some example embodiments, the measure of resiliency of the software defined network to failures includes a failure recovery coverage computed based on a number of tests in which failures were detected and a number of tests in which a recovery action was successfully completed in response to failures. In at least some example embodiments, the measure of resiliency of the software defined network to failures includes a failure recovery latency computed based on a time at which a notification of the failure was raised in the software defined network and a time at which a recovery action was successfully completed in response to the failure. In at least some example embodiments, the measure of resiliency of the software defined network to failures includes an availability computed based on a number of intents requested during the failure and a number of intents successfully processed during the failure.

In at least some example embodiments, a method includes sending, by a manager toward a target node hosting a controller for a software defined network, a failure injection request configured to request injection of a failure at the target node, wherein the failure injection request includes a set of failure injection parameters including a failure type of the failure, receiving, by the manager from the target node, a failure injection response including information indicative of a response to the failure in the software defined network, and determining, by the manager based on the information indicative of the response to the failure in the software defined network, a measure of resiliency of the software defined network to failures. In at least some example embodiments, the set of failure injection parameters further includes at least one of a failure injection time for the failure or a failure injection duration for the failure. In at least some example embodiments, the failure type of the failure is indicative that the failure is a system failure, a network failure, or a controller failure. In at least some example embodiments, the information indicative of the response to the failure in the software defined network includes at least one of an indication as to whether a performance degradation was detected in the software defined network as a result of the failure, an indication as to whether an element of the software defined network raised a notification of the failure, a time at which an element of the software defined network raised a notification of the failure, or an indication as to whether a recovery process was successfully completed in response to the failure, or an indication as to whether an intent was successfully processed during the failure. In at least some example embodiments, the measure of resiliency of the software defined network to failures includes a measure of resiliency of a control plane of the software defined network to failures. In at least some example embodiments, the measure of resiliency of the software defined network to failures includes a failure detection coverage computed based on a number of tests in which injected failures are detected and reported and a number of tests in which failures are not detected. In at least some example embodiments, the measure of resiliency of the software defined network to failures includes a failure detection latency computed based on a time at which the failure was injected at the target node and a time at which a notification of the failure was raised in the software defined network. In at least some example embodiments, the measure of resiliency of the software defined network to failures includes a failure recovery coverage computed based on a number of tests in which failures were detected and a number of tests in which a recovery action was successfully completed in response to failures. In at least some example embodiments, the measure of resiliency of the software defined network to failures includes a failure recovery latency computed based on a time at which a notification of the failure was raised in the software defined network and a time at which a recovery action was successfully completed in response to the failure. In at least some example embodiments, the measure of resiliency of the software defined network to failures includes an availability computed based on a number of intents requested during the failure and a number of intents successfully processed during the failure.

In at least some example embodiments, an apparatus includes means for send, by a manager toward a target node hosting a controller for a software defined network, a failure injection request configured to request injection of a failure at the target node, wherein the failure injection request includes a set of failure injection parameters including a failure type of the failure, means for receive, by the manager from the target node, a failure injection response including information indicative of a response to the failure in the software defined network, and means for determine, by the manager based on the information indicative of the response to the failure in the software defined network, a measure of resiliency of the software defined network to failures. In at least some example embodiments, the set of failure injection parameters further includes at least one of a failure injection time for the failure or a failure injection duration for the failure. In at least some example embodiments, the failure type of the failure is indicative that the failure is a system failure, a network failure, or a controller failure. In at least some example embodiments, the information indicative of the response to the failure in the software defined network includes at least one of an indication as to whether a performance degradation was detected in the software defined network as a result of the failure, an indication as to whether an element of the software defined network raised a notification of the failure, a time at which an element of the software defined network raised a notification of the failure, or an indication as to whether a recovery process was successfully completed in response to the failure, or an indication as to whether an intent was successfully processed during the failure. In at least some example embodiments, the measure of resiliency of the software defined network to failures includes a measure of resiliency of a control plane of the software defined network to failures. In at least some example embodiments, the measure of resiliency of the software defined network to failures includes a failure detection coverage computed based on a number of tests in which injected failures are detected and reported and a number of tests in which failures are not detected. In at least some example embodiments, the measure of resiliency of the software defined network to failures includes a failure detection latency computed based on a time at which the failure was injected at the target node and a time at which a notification of the failure was raised in the software defined network. In at least some example embodiments, the measure of resiliency of the software defined network to failures includes a failure recovery coverage computed based on a number of tests in which failures were detected and a number of tests in which a recovery action was successfully completed in response to failures. In at least some example embodiments, the measure of resiliency of the software defined network to failures includes a failure recovery latency computed based on a time at which a notification of the failure was raised in the software defined network and a time at which a recovery action was successfully completed in response to the failure. In at least some example embodiments, the measure of resiliency of the software defined network to failures includes an availability computed based on a number of intents requested during the failure and a number of intents successfully processed during the failure.

BRIEF DESCRIPTION OF THE DRAWINGS

The teachings herein can be readily understood by considering the following detailed description in conjunction with the accompanying drawings, in which:

FIG. 4 depicts a table of failure models which may be used to inject failures in an SDN for a failure injection experiment for the SDN;

FIG. 8 depicts an example of a user-provided specification for failure injection experiments for injection of failures in an SDN;

FIG. 12 depicts a table summarizing the values selected for the controllable parameters available for failure injections;

FIG. 13 depicts a table illustrating the throughput of failure free intent requests for three SDN controller and five SDN controller scenarios under workloads of 1000 requests per second and 3000 requests per second;

FIG. 14 depicts a table illustrating the latency of failure free intent requests for three SDN controller and five SDN controller scenarios under workloads of 1000 requests per second and 3000 requests per second;

FIG. 32 depicts an example embodiment of a method for use by a manager to support control plane resiliency testing in a software defined network;

To facilitate understanding, identical reference numerals have been used herein, wherever possible, in order to designate identical elements that are common among the various figures.

DETAILED DESCRIPTION

Various example embodiments for supporting control plane resiliency testing in a software defined network are presented. Various example embodiments for supporting control plane resiliency testing in a software defined network may be configured to support control plane resiliency testing in a software defined network based on use of failure injection. Various example embodiments for supporting control plane resiliency testing in a software defined network based on use of failure injection may be configured to support control plane resiliency testing in a software defined network by injecting failures (e.g., system failures, network failures, controller failures, or the like, as well as various combinations thereof) into the software defined network (e.g., into the control plane of the software defined network, such as into one or more nodes hosting one or more controller instances of the software defined network), monitoring the software defined network after the injection of the failures and collecting results data from the software defined network related to the injection of the failures, and evaluating resiliency of the control plane of the software defined network based on the results data from the software defined network related to the injection of the failures (e.g., based on various measures of resilience, such as failure detection coverage, failure detection latency, failure recovery coverage, failure recovery latency, availability, or the like, as well as various combinations thereof). Various example embodiments for supporting control plane resiliency testing in a software defined network may be configured to support control plane resiliency testing in a software defined network where the software defined network may be a test environment or a production environment. It will be appreciated that these and various other example embodiments and associated advantages or potential advantages of supporting control plane resiliency testing in a software defined network may be further understood by way of reference to the various figures, which are discussed further below.

Figure 1:
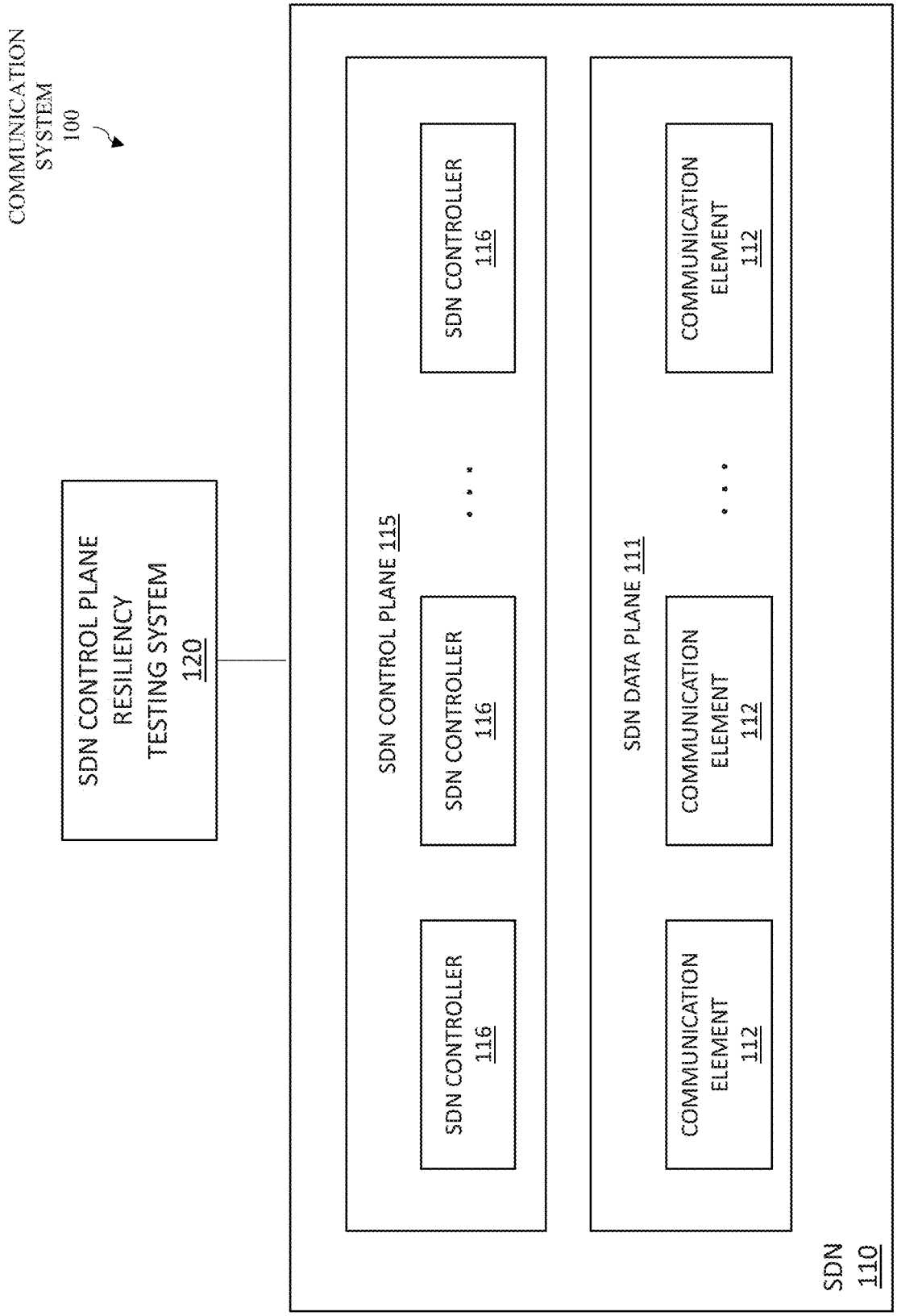
FIG. 1 depicts an example embodiment of a communication system configured to support control plane resiliency testing in a software defined network (SDN)

FIG. 1 depicts an example embodiment of a communication system configured to support control plane resiliency testing in a software defined network.

The communication system 100 is configured to support control plane resiliency testing in a software defined network (SDN). The communication system 100 includes an SDN 110 and an SDN control plane resiliency testing system 120. The SDN 110 may be a testbed SDN or may be a production SDN. The SDN 110 includes an SDN data plane 111 including a set of communication elements 112 and an SDN control plane 115 including a set of SDN controllers 116. The communication elements 112 of the SDN data plane 111 may include various types of communication elements which may depend on the type of communication network being implemented (e.g., routers, switches, servers, or the like, as well as various combinations thereof). The SDN controllers 116 of the SDN control plane 115 are configured to control the communication elements 112 of the SDN data plane 111 based on software defined networking techniques. The SDN control plane resiliency testing system 120 is configured to perform resiliency testing for testing the resiliency of the SDN control plane 115 to failures. The SDN control plane resiliency testing system 120 may be configured to perform resiliency testing, for testing the resiliency of the SDN control plane 115 to failures, by injecting failures (e.g., system failures, network failures, SDN controller failures, or the like, as well as various combinations thereof) into the SDN 110, monitoring the SDN 110 after the injection of the failures and collecting results data from the SDN 110 related to the injection of the failures, and evaluating resiliency of the SDN control plane 115 of the SDN 110 based on the results data from the SDN 110 related to the injection of the failures (e.g., based on various measures of resilience, such as failure detection coverage, failure detection latency, failure recovery coverage, failure recovery latency, availability, or the like, as well as various combinations thereof). It is noted that the operation of SDN control plane resiliency testing system 120 in performing resiliency testing of the SDN control plane 115 may be further understood by first considering various aspects of SDN.

Software Defined Networking (SDN) has emerged as a paradigm capable of providing new ways to design, build and operate networks. This is due to the key concept of separation of the network control logic (the so-called control plane) from the underlying equipment (such as routers and switches) that forward and transport the traffic (the data plane). Indeed, the logical level may host the network control logic in a programmable and highly flexible way: advanced network services become software defined, supporting much easier enforcement of networking policies, security mechanisms, re-configurability, and evolution than in previous computer networks. The many advantages promised by SDN in engineering and managing complex networks and network are very attractive for network operators and Internet Services Providers (ISP). Network operation and management include challenging tasks and providers face big issues in configuring large networks and enforcing desired Service Level Agreements (SLAs) in a very dynamic environment.

The logical entity hosting software-defined core network services in the control plane (e.g. routing, authentication, discovery, and so forth) is typically known as the SDN controller (or simply controller). Very recently, the concept of controller has evolved to that of a network operating system (NOS), an operating system—which can run on commodity hardware—specifically providing an execution environment for network management applications, through programmable network functions. In the logical SDN architecture, the controller is below the application layer, and atop the data plane, that it controls enacting the policies and the services required by applications. The applications atop the control plane are management programs accessing the controller programming interface to request network services or to enforce policies. The separation of the planes is realized by means of well-defined application programming interfaces (API) therebetween. Relevant examples of SDN controllers are NOX, Beacon, OpenDaylight, and ONOS, while probably the most widely known API is OpenFlow.

The separation of the layers is realized by means of open APIs, called the Northbound Interface (NBI, towards applications) and the Southbound Interface (SBI, between the control and data planes). This concept allows co-existence of the new paradigm with the traditional one; indeed, several current commercial network equipments are hybrid, supporting both the new SBI and traditional protocols. This should ease the transition to SDN architectures. The logical entity hosting software defined core network services in the control plane (e.g. routing, authentication, discovery, and so forth), as indicated above, is known as an SDN controller (or, more simply, controller). An SDN controller is responsible for enacting the policies and the services required by applications, by issuing commands and receiving events and status information from devices in the data plane (referred to as SDN-enabled switches) through the SBI. The NBI is responsible for providing means to specify and request network policies and services in an abstract way, independent from way the policies and services are actuated by the controller. A promising proposal for the northbound interface is Intent Based Networking (IBN). From a technological and industrial viewpoint, several initiatives have started in recent years to foster SDN development and adoption.

The Open Networking Foundation (ONF) is a non-profit organization that currently includes many partner companies and has as its mission the promotion and adoption of SDN through open standards development. The first ONF achievement is the OpenFlow Standard, enabling remote programming of the forwarding plane. OpenFlow provides the interface between the control and data planes, enabling a seamless communication between components in the two levels. OpenFlow was initially proposed for technology and application experimentation in a campus network and then gained momentum, up to being defined as an ONF standard for the SBI between the control and the data plane.

The ONOS project has been established to develop an open SDN-based vision of the next generation networks, to go beyond current networks. The explicit goal is to produce the Open Source Network Operating System that will enable service providers to build real Software Defined Networks. This goal is pursued by a community of partners including many of the major industrial players in the field, be they network operators, Internet service providers, cloud and data center providers, and vendors, and so forth. The project has promoted the development of (Open Network Operating System (ONOS), an open source SDN controller targeting scalability, high availability, and high performance. It has been conceived to overcome the limitations of previous controllers such as NOX and Beacon, which were closely tied to the OpenFlow API and provided applications with direct access to OpenFlow messages—in this sense, they did not provide the proper level of SDN abstraction to applications, hence the need for a real SDN network operating system. Note that the term network operating system (NOS) some decades ago referred to operating systems with networking features; however, this obsolete usage has been changed recently to denote systems that provide an execution environment for programmatic control of the network. This is what is currently still meant with the term in the context of SDN, which is probably why nowadays the terms SDN controller and network operating system are often used interchangeably.

In the ONOS view, the IBN model plays an important role in specifying the network needs through a policy-management service. The idea of IBN is that applications should send requests or policies to the control plane in the form of intents, specified in terms of what and not in terms of actions to be taken in controlling the network, i.e. of how they should be actuated. A simple example of an intent is the request to establish a point-to-point interconnection between two nodes, complemented by performance or service requirements, such as minimum bandwidth and duration. The intents specify at a logical level the actions requested, and then the SDN is in charge of satisfying them by directly interacting with the physical devices. By doing so, the IBN framework abstracts the network complexity allowing network operators and applications to describe policies rather than low level instructions for the devices.

In IBN, an intent can be regarded as an object containing a request to the network operating system to alter the network behavior. For example, an intent may include Network Resources (the parts of the network affected by the intent), the SLA (e.g., bandwidth, resiliency, reliability, optical frequency, and link type requested), the Criteria (e.g., describing the slice of traffic affected by the intent), and Instructions (e.g., actions to apply to the slice of traffic of interest). The IBN model abstracts the specification of the needs of workloads consuming network services (the "what"), from the way the network infrastructure satisfy those needs (the "how"). This is meant to be achieved through a policy-management service at the northbound interface of the SDN controller; the latter is in charge of translating the network policies into corresponding control actions, e.g. flow rules installation.

The dependability of a system or a service is a concept encompassing several quality attributes, namely availability, reliability, safety, confidentiality, integrity, and maintainability, with confidentiality, integrity, and availability being part of the composite attribute referred to as security. Various example embodiments for supporting control plane resiliency testing in a software defined network may be configured to support dependability requirements placed on software defined networks concerning availability, reliability, and scalability. Some of these quality attributes are discussed further below.

Reliability expresses the continuity of correct service. It is the probability that the system functions properly in the time interval $(0, t)$, or $R(t)=P(!\text{failure in } (0, t))$. Typically, reliability is evaluated through widely spread metrics such as Mean Time To Failure (MTTF), Mean Time Between Failures (MTBF), and Mean Time To Repair (MTTR).

Availability expresses the readiness for correct service. It is the probability that the system functions properly at time t, or $A(t)=P(\text{system ready to accept new commands})$ at any time t). Availability is often expressed as uptime divided by total time (uptime plus downtime); often, it is computed as the ratio: MTTF/(MTTF+MTTR) or equivalently 1/(1+MTTR/MTTF). The definitions show that for improving availability, it is important to reduce the ratio between MTTR and MTTF, by increasing the mean time to failure and/or by reducing the mean time to repair.

Fault-tolerance is a means to increase the dependability of a system. It is important for SDN since, in the event of a controller failure, the whole network can be compromised, because each of the applications and services depends on it. SDN controllers generally are engineered with mechanisms to tolerate such events, and clearly fault-tolerance is one of the major techniques used to ensure a high level of resilience. Various example embodiments for supporting control plane resiliency testing in a software defined network may be configured to use failure injection as a testing technique to intentionally introduce failures, representative of failure events which can actually occur at various levels in SDN networks, so as to evaluate the fault-tolerance mechanisms of the controller and, more generally, to assess the extent to which a controller is able to provide the desired level of resilience.

Resilience (or resiliency) has multiple definitions, as it has developed in different disciplines, including physics, psychology, ecology, engineering, and so forth. Very likely, the term originally referred to a property of a physical material or of an entity, but the concept is now applied also to networked systems or organizations. Despite the different definitions, it is generally accepted there are three elements present across most of them, including the ability to change when a force is enacted, to perform adequately or minimally while the force is in effect, and to return to a predefined expected normal state whenever the force relents or is rendered ineffective. In engineering, the term somehow intuitively conveys the notion of the ability to survive to unintentional or malicious threats (e.g., failures or the like) and to resume normal operating conditions. With this in mind, the resilience of a system may be thought as its ability to provide and maintain an acceptable level of performance or service in presence of failures. It is worth to explicitly point out that resilience may be considered to be a macroscopic-scale property of a system, i.e., a property of the system as a whole.

Network resilience generally may be considered to be the ability of a network to maintain an acceptable level of service under various conditions. For example, network resilience may be considered to be the ability to provide and maintain an acceptable level of service in the face of faults and challenges to normal operation. Similarly, for example, network resilience may be considered to the ability of a network to defend against and maintain an acceptable level of service in the presence of challenges, such as malicious attacks, software and hardware faults, human mistakes (e.g., software and hardware misconfigurations), and large-scale natural disasters threatening its normal operation.

Network resilience, in certain situations, has been evaluated by means of a time-dependent indicator, known as figure-of-merit F, which is a quantifiable indicator of the performance of the system. The state of a system is characterized by a value of F, directly affected by the two events, the disruptive event and the corresponding recovery action. Multiple indicators can be defined to provide a measurement of resilience, concerning reliability, network connectivity paths, flows, and so forth. In this context, the progression of the system is as follows. The system is initially functional at time $t_0$, and this state remains constant until the occurrence of a disruptive event at time $t_e$, bringing the value of the delivery function of the system from its initial value $F(t_0)$, to the lower value $F(t_d)$. Thus, the system is assumed to function in a degraded mode from $t_e$ to $t_d$, when it reaches the point where the functionality is considered to be entirely lost. The system remains in such state until a recovery/repair action is initiated at time $t_r$, when the system regains functionality, although in a degraded mode. As a result of the resilience action, the system is considered recovered and fully-functional at time $t_f$, with delivery function value $F(t_f)$. However, the final state, reached by the system after the recovery action, does not necessarily have to coincide with the original state of the system, i.e., the figure-of-merit $F(t_f)$ can be equal to, greater, than, or smaller than $F(t_0)$. Finally, the value of resilience corresponding to a specific figure-of-merit function can be computed as: $\lambda(t)=(F(t)-F(t_d))/(F(t_0)-F(t_d))$ where $0<=\lambda(t)>=1\$ for t in $(t_r, t_f)$ assuming that the recovery action succeeds in restoring the functionality.

In recent years, the concept of resilience has been broadened to incorporate a notion of dependability also with respect to changes; indeed, it is increasingly conceived as the capability of a system to remain dependable in the present of changes. This may come from papers which pointed out the need to address the growth of complexity of today so pervasive computing systems, a need deriving from This led to the introduction of scalable resilience as a concept of "survivability in direct support of the emerging pervasiveness of computing systems".

In view of the foregoing discussion of resilience, and more specifically network resilience, it is noted that, for various example embodiments for supporting control plane resiliency testing in a software defined network, network resilience may be defined as the ability to provide and maintain an acceptable level of service in the face of failures. Of course, it will be appreciated that other definitions may be supported under certain circumstances.

The knowledge as to the manner in which failures may affect software systems is important for improving resilience and reliability of the delivered services. With the complexity of modern distributed systems, the design of effective detection and mitigation mechanisms can no longer rely exclusively on software testing techniques in controlled environments. Indeed, it is impractical to fully reproduce a complex operational context. In SDNs, for instance, it has been shown that a faulty SDN application can compromise or crash the whole SDN network, e.g., while SDN controller software is likely to stabilize, even the application plane may be a vehicle for dependability threats. Therefore, in the engineering of softwarized network services, a key goal is to be able to test the proper functioning not only in controlled environments, but also in-production, under real operating conditions.

Networks will need to adopt a new approach to support the predicted growth in scale, diversity and complexity of use cases. With new services and applications emerging continuously, devices will be connected much more often, and consequently, a distinct competitive market advantage could be created by those network operators capable of implementing new services rapidly. Future networks will be able to host hundreds, or even thousands, of service creations per day increasing the flow-through provisioning, and minimizing manual intervention using cloud technologies that will provide a multi-service programmable fabric built to precisely meet each of the different service requirements, in spite of changing network conditions, unpredictable traffic patterns, continuous streams of applications and services and short innovation cycles.

The wide spread of SDN technologies has raised advanced challenges in achieving: i) failure resilience, e.g., the persistence of service delivery that can justifiably be trusted, when facing changes, and ii) fault tolerance, meant as the ability to avoid service failures in the presence of faults. The decoupling of the control plane from the data plane leads to the dependency of the overall network resilience on the fault-tolerance in the data plane, as in the traditional networks, but also on the capability of the (logically) centralized control functions to be resilient to faults. Additionally, SDNs are by nature distributed system, introducing further threats to the network resilience, such as inconsistent global network state shared between the SDN controllers, as well as a network partitioning. Moreover, compared to the legacy network appliances, which rely on dedicated high-performance hardware, the delivery of network services over cloud technology leaves room for new failure scenarios which periodically occur in data centers.

Consequently, as the controller technology develops and progressively becomes mature for the market, the need to engineer and to assess the compliance of SDN solutions with non-functional requirements—such as high availability, fault tolerance, and high resilience—becomes fundamental. In such a context, traditional software testing techniques may be insufficient to evaluate the resilience and availability of a distributed SDN ecosystems. Indeed, although these techniques are useful to validate specific system behaviors (e.g. the functional testing), full operational testing may be possible only in production, due to the unlikelihood that the entire ecosystem can be reproduced in a testing environment. Ultimately, even if a system can be reproduced in a test context, it is impractical, or even impossible, to fully reproduce aspects and failure modes that can characterize complex distributed systems during production hours.

One effective way to assess fault-tolerance mechanisms, as well as to quantify system availability and/or reliability, is failure injection. Failure injection allows for assessment of fault tolerance mechanisms by reproducing various failure scenarios, such as a latent communication, service failure, or hardware transient faults. If applied in a controlled environment while the system is in production, the failure injection can lead to discovery of problems in a timely manner, without affecting the customers, and can provide helpful insights to build better detection and mitigation mechanisms to recover the system when real issues arise. Therefore, along with the softwarization of network services, it is an important goal in the engineering of such services, e.g., SDNs and NFVs, to be able to test and assess the proper functioning not only in emulated conditions before release and deployment, but also in-production, when the system is under real operating conditions. Failure injection generally focuses on deliberately introducing failures in the components of the system under assessment, or in their execution environment, under real or emulated load conditions, to evaluate the ability internal mechanisms of the system under assessment to react to anomalous situations potentially occurring during operation.

While there has been some research on SDN performance and dependability, research on SDN performance and dependability still may be considered to be in the relatively early stages. Clearly, the decoupling of control plane from the network devices and the implementation of controllers as distributed systems inevitably make SDNs inherit the weaknesses associated with reliable distributed systems. The specific benefits and risks that SDN may bring to the resilience of carrier-grade networks seem to be largely unexplored.

SDN fault tolerance may be addressed in a number of different ways, such as by using primary-backup replication mechanisms to provide resilience, controller redundancy and redundant controller placement, SDN availability design, failure injection testing, and so forth.

SDN fault tolerance may be addressed using a primary-backup mechanism to provide resilience against several types of failures in a centralized OpenFlow-based controlled network. In primary-backup replication, one or more secondary (backup) replica servers are kept consistent with the state of the primary server, and as the primary server enters in a failure state, one (warm) backup replica is chosen to replace the primary server. The approach has been implemented in the NOX controller, and has been shown to work in several failure scenarios, namely abrupt abort of the controller, failure of a management application (e.g., client running atop the controller), and Distributed Denial-of-Service (DDoS) attacks. In at least some such cases, the OpenFlow protocol may be appropriate to support relatively easy implementation of primary-backup replication.

SDN fault tolerance may be addressed using controller redundancy and redundant controller placement. The Fault Tolerant Controller Placement Problem may be formulated as the problem of deciding how many controllers are needed, where those controllers are to be deployed, and what network devices are under control of each of those controllers, in order to achieve at least five nines reliability at the southbound interface (the typical reliability level required by carrier-grade networks). This also may be used in conjunction with a heuristic to compute placements with such a reliability level. Here, it will be appreciated that the answers may depend on the topology (rather than on the network size).

SDN fault tolerance may be addressed by SDN availability design. There may be situations where link failures can compromise the proper functioning of portions of a SDN. This is due to the fact that controller internal modules—specifically, distributed consensus protocols, mechanisms for switch-controller or controller-controller communication, and transport protocols for reliable message exchange—can have cyclical dependencies.

This means that link failures can cause transient disconnections between switches and controllers or controller instances, which in turn undermines high availability. It is noted that what appears to be particularly critical in SDN is the lack of robustness to failures which partition the topology of controllers. In fact, it may be noted that—since in SDN the control has been taken out of switches and logically centralized in the control plane—it may happen that two switches may be unable to communicate even if a physical path between them does exist. In this case, current SDNs may be unable to offer high availability.

Fault injection is the technique of introducing faults in a system to assess its behavior and to measure the effectiveness of fault tolerance or other resilience mechanisms. It is noted that software fault injection (SFI), although developed more recently than hardware fault injection, is widely used. SFI developed as it became clear that software faults were becoming a major cause of system failures. It proved to be effective for fault-tolerance and reliability assessment for several classes of systems, such as distributed systems, operating systems, wireless sensor networks, database management systems, and software-as-a-service platforms, among others, and is currently recommended by several standards in critical systems domains.

SFI typically consists of applying small changes in a target program code with the goal of assessing the system behavior in the presence of (injected) faults, which clearly have to be representative of potentially real faults—or, specifically, of residual faults, i.e., those which escape testing and debugging before software product release and may be activated in execution on-field. In an SFI experiment, a fault is injected in the program, which is executed under a workload, in turn representative of real operating conditions.

Fault injection has been proposed for dependability evaluation and benchmarking of Network Function Virtualization Infrastructures (NFVIs). NFV is a field closely related to, yet different from, SDN. While SDN is more concerned with control plane programmability, NFV mainly focuses on data plane programmability. As for SDNs, NFV inherits performance and reliability requirements from telecommunication systems. For example, some key performance indicators for Virtualized Network Functions (VNFs) may include latency, throughput, and experimental availability, and fault injection may be used for evaluation and benchmarking of VNFs.

Various example embodiments presented herein may be configured to use failure injection for the assessment of the resilience mechanisms of SDN distributed controllers. Various example embodiments presented herein may be configured to use failure injection for the assessment of the resilience mechanisms of SDN distributed controllers in both testbed environments and production environments.

Various example embodiments may be configured to provide an approach to implement an automated methodology for characterizing the resilience of SDNs through a configurable software infrastructure. Various example embodiments may be configured to provide an automated and configurable distributed software infrastructure for testing and measuring resiliency and reliability SLA compliance of SDN controllers when operating under failure conditions. Various example embodiments may be configured to provide a failure injection methodology, conceived for both development and in-production stage assessment, that may include definition of the workload (e.g., according to an IBN model to create a testing plane on demand), providing operating conditions (e.g., configuration and workload) to the testing plane for running the testing plane as a real production environment, injection of failures, selected from a library of failure models, collection of resiliency and reliability metrics based on the injection of failures, and evaluation of SLA compliance based on analysis of the resiliency and reliability metrics. Various example embodiments may be configured to evaluate the effectiveness of the failure detection and mitigation mechanisms provided by SDN controllers, as well as the capability of the SDNs to ultimately satisfy SLAs in terms of resiliency, availability, and reliability requirements. Various example embodiments may be configured to provide automation in the analysis of the SDN control plane resiliency and reliability, providing various advancements in testing and evaluation of SDNs. Various example embodiments may be configured to automate the creation of failure conditions and collection of associated measurements related to the failure conditions in testing environments (e.g., based on on-demand creation of a testing plane in the testing environment) and production environments (e.g., based on interfacing with the production environment). Various example embodiments may be configured to support an automated methodology for characterizing the resilience of SDNs through a configurable software infrastructure that may include targeting a distributed SDN platform to perform a resilience assessment under failure scenarios aiming to verify if such systems provide suitable failover mechanisms, reproducing failure scenarios which are representative for SDN ecosystems (e.g. faulty communications between SDN controllers, a faulty controller service, or the like), providing measurements which give valuable insights into the performance and resilience of the SDNs, and so forth. These and various other example embodiments and associated advantages or potential advantages may be further understood by considering the various figures discussed below.

Figure 2:
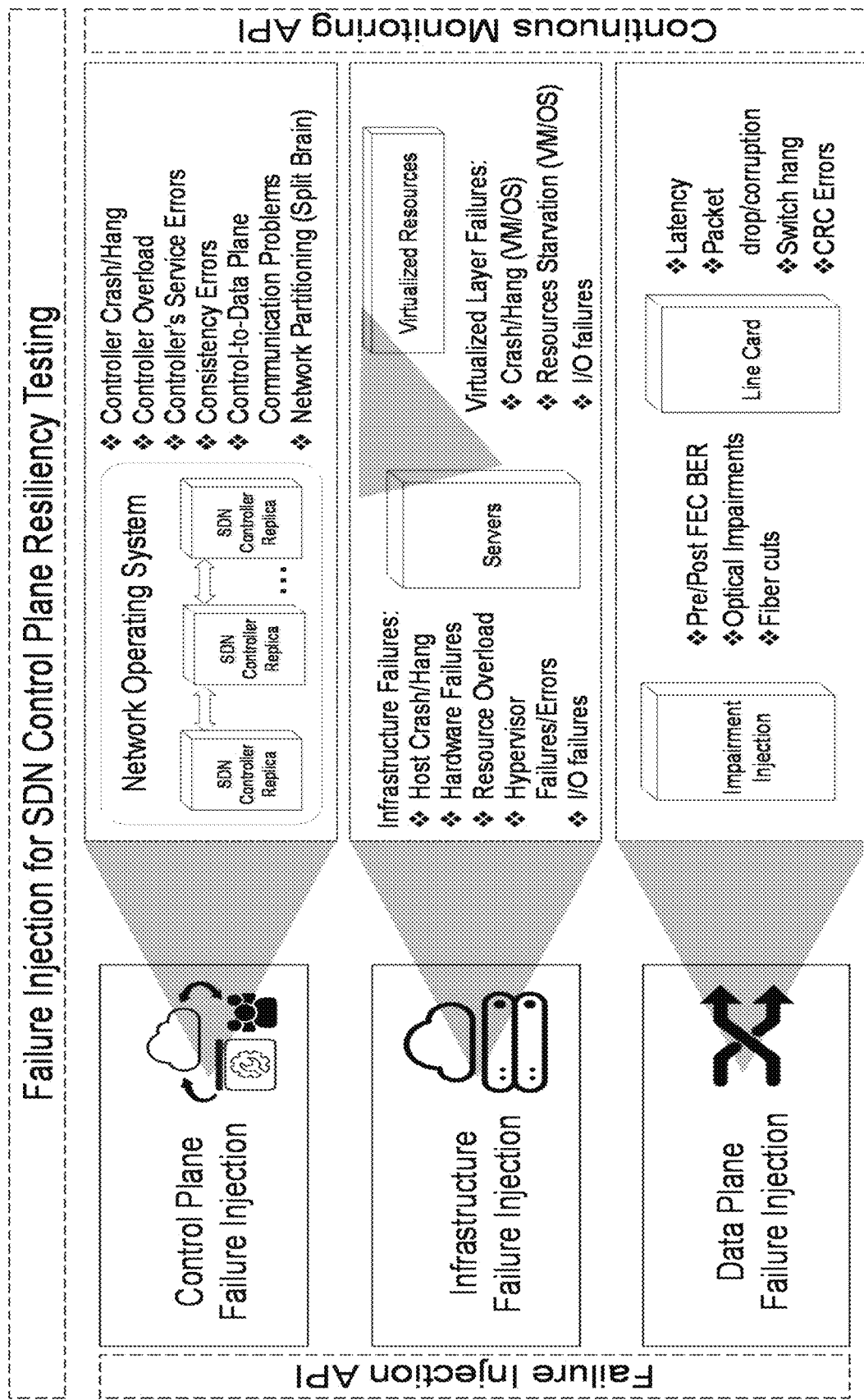
FIG. 2 depicts an example of an in-production continuous testing environment which may be used to support control plane resiliency testing in an SDN.

FIG. 2 depicts a high-level view of an approach, where failure injection is used to continuously assess the reliability and resilience of the network services against a wide range of failure scenarios. This will provide continuous feedback on the capabilities of the softwarized network services to survive failures, which is of fundamental importance for improving the system internal mechanisms to react to anomalous situations potentially occurring in operation, while its services are regularly updated or improved. To this end, failures are injected in different layers of the telco cloud infrastructure (FIG. 2), namely: (1) at the data-plane level, to emulate faulty network appliances, e.g. by injecting Bit Error Rate (BER) or packet latency and corruption at the switch port level, (2) at the infrastructure level, to emulate faulty physical nodes or virtualized hosts, and (3) at the control plane level, to emulate faulty network controllers.

With this approach in mind, consider the use of software failure injection to deliberately introduce failures in the components of the system under assessment, or in their execution environment, under real or emulated load scenarios, to evaluate the system behavior under (possibly unforeseen) disruptive conditions. Specifically, use of software failure injection may focus on the resilience of the control plane layer, and a methodology and a tool suite may be used to validate the reliability and resilience of distributed SDN platforms.

Various example embodiments presented herein may be configured to support control plane resiliency testing in a software defined network based on use of a failure injection methodology.

Various example embodiments presented herein may be configured to support control plane resiliency testing in a software defined network by assessing the effectiveness of the failure detection and mitigation mechanisms provided by the SDN technology by reproducing representative failure scenarios. It is worth mentioning that, although the failure model described herein is meant to target specifically the control plane ecosystem, some of the failure modes may overlap with those required to emulate faulty condition at infrastructure level (see FIG. 2), e.g. a controller crash may correspond with the crash of the virtual machine hosting such controller. To this end, various SDN control plane testing capabilities may be improved with a failure injection tool suite to deliberately inject failures in the SDN ecosystem limiting intrusiveness, as much as possible.

Various example embodiments presented herein may be configured to support control plane resiliency testing in a software defined network by exercising the system with a workload and a faultload. The workload reflects a load profile that a distributed SDN system will face in production environment (in the case in which this is applied in a test environment) or reflects a load profile that a distributed SDN system faces in the production environment (in the case in which this is applied in a production environment). The faultload includes of a set of failures (e.g., system or network misbehaving), which are injected in the system (e.g., test environment or production environment). By executing the system with the workload and subjecting it to the faultload, failures may be introduced into the SDN ecosystem and control plane resiliency to the failures may be evaluated and assessed.

Figure 3:
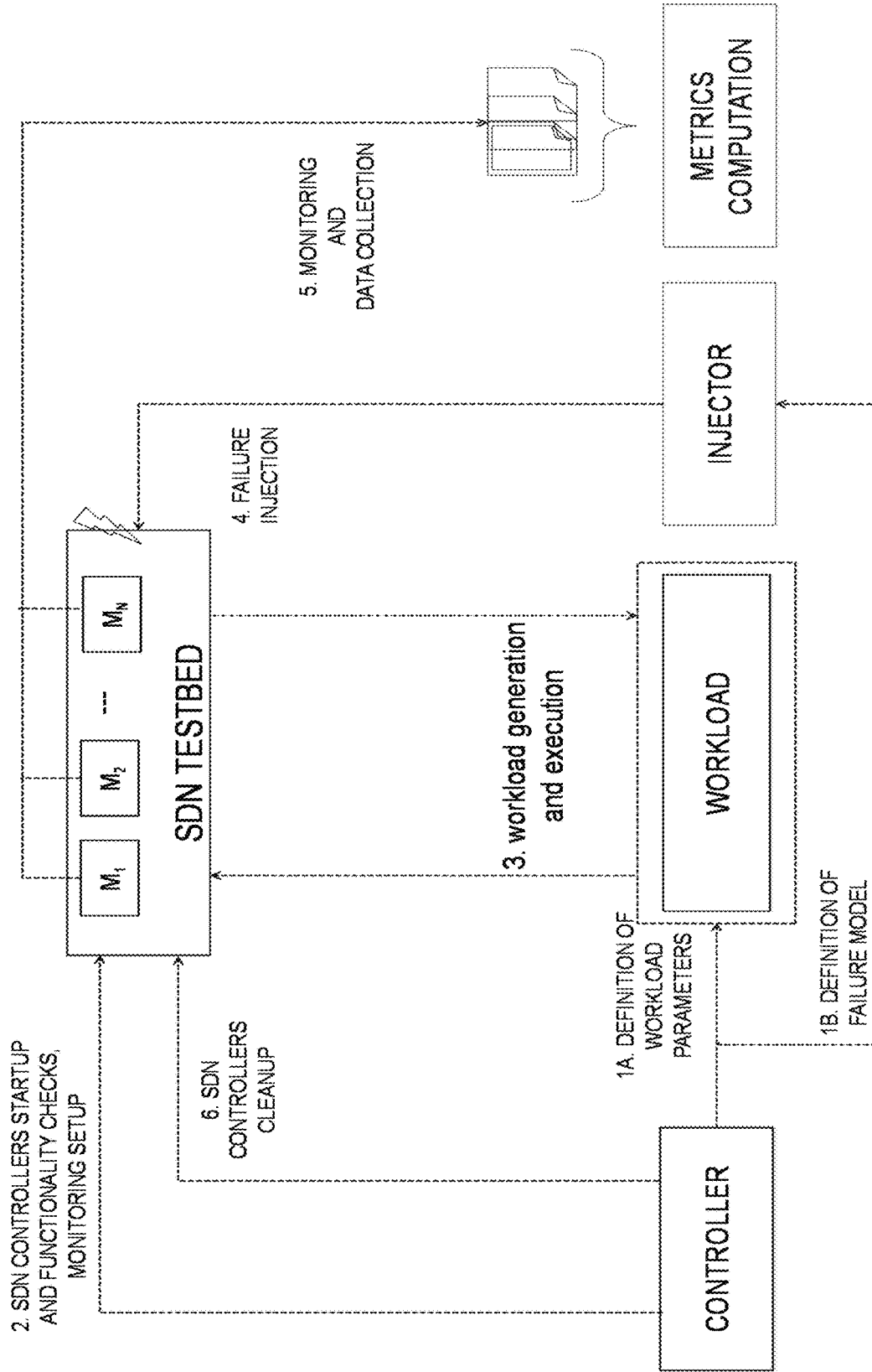
FIG. 3 depicts an example embodiment of a process for a failure injection experiment for an SDN.

FIG. 3 depicts an example embodiment of a process for a failure injection experiment for a software defined network.

The execution of the experiments is automated and supervised by the Experiment Manager program, or EM, while the System Under Test (SUT) is the target SDN infrastructure, i.e., the set of the SDN controller instances distributed across several machines. The EM specifies the experimental parameters, sets the SUT, i.e., deployment, starts/stops the SDN controller instances and the components of the framework, and restores the machines to ensure the same initial conditions for each experiment.

The execution of the experiments may proceed as follows. After the definition of the failure model and the workload parameters (step 1), the experiment is set up, configuring and deploying the SDN infrastructure under evaluation, along with the data monitors (step 2). Then the workload is generated (step 3), so as to stimulate the SDN to bring it into a state in which to inject a failure selected from the failure model. During execution, a failure is injected (step 4), while the system is monitored and data are collected (step 5). After execution, the testbed is cleaned up by restoring the original status of the machines running the SDN controllers, and restoring the controller instances, before starting the next experiment (step 6). This process is repeated for each execution of a failure injection experiment, and several failures are injected at each experiment of the campaign (while keeping the same workload and collecting the same performance measurements). It will be appreciated that various steps may be performed contemporaneously or in a different order than as described above.

It is noted that, although the analysis provided herein is primarily based on experiments conducted in a controlled test environment, the proposal has been conceived as a framework (methodology and injection infrastructure) to assess the resilience of the SDNs in production. Indeed, the complexity of the environments where SDNs operate can lead to situations that are difficult or even impossible to replicate with the traditional software testing approaches. As such, various example embodiments configured to support control plane resiliency testing in a software defined network may be applied within various contexts (e.g., in a controlled test environment, in a production environment, or the like). The support infrastructure has been designed to be easily deployed into the target SDN ecosystem, so as to support the injections of failures in any type of environment (e.g., in a test environment or even in a production environment) with the aim of continuous testing and analysis.

Various example embodiments presented herein may be configured to support control plane resiliency testing in a software defined network based on use of a failure model.

FIG. 4 depicts a table of failure models which may be used to inject failures in a software defined network. Each class is intended to mimic different types of failure scenarios at different levels of the software stack. According to the level to which they apply, failures are classified in three main categories follows: Infrastructure Failures (including System Failures and Network Failures) and SDN Controller Failures.

The control plane resiliency testing may be performed using System Failures. The computational power and reliability of hardware equipments, adopted for both dedicated and COTS (Commercial Off-The-Shelf) servers, has increased dramatically in the past several decades. Despite these increases, failures still occur in complex and high powerful infrastructures. The adoption of virtualization technologies and cloud computing solutions has introduced further challenges in terms of security and reliability. Therefore, the failure model encompasses failures affecting the computational resources as well as I/O operations (e.g., physical/virtual CPU, memory, and disk) of a target node. The goals is to evaluate the resilience of the SDNs to failures and resources depletion affecting the machines hosting the controller instances. The failure types envisaged in this respect are system hang, starvation, outage, and shutdown (at single CPU level), as well as disk and memory saturation. Furthermore, a single controller instance might suffer from increased CPU utilization, e.g., due to other compute-intensive jobs running on the same target machine. The corresponding failure types to mimic such a scenario are CPU or I/O burn. This class of failures is induced by starting additional jobs that deliberately consume CPU cycles and allocate memory areas aiming to cause resource exhaustion, e.g., CPU and memory hogs.

The control plane resiliency testing may be performed using Network Failures. Network problems, such as link failures or latent communication, are among the ones that have been faced by distributed applications. The most common consequence of these kind of failures is the partitioning of the network that split a system into multiple disjoint, disconnected partitions. As a result, even if a system is designed to be partition-tolerant, there is no guarantee that the modern SDN distributed systems are able to cope with partitioned, unreliable networks. To reproduce such network failures, message corruption or loss, partial or total (control plane and/or dataplane) network partitions, as well as the permanent route/node unavailability may be introduced into the network interfaces. In addition, even latent communications, packet reordering, crc errors, and bandwidth limitation may be included in the list of available failures.

The control plane resiliency testing may be performed using SDN Controller Failures. This class of failures aims of mimicking the malfunctioning that may occur in the interaction between the SDN controller services, or malfunctioning of the controller itself. API calls are used to emulate a faulty controller instance by shutting it down or to mimic an anomalous service behavior by forcing the termination of specified system process. The corresponding failure types are emulated by process kill, and controller or dependency shutdown. Furthermore, a memory corruption failure may be provided to corrupt the state of the controller, mimicking a hardware fault, or a programming error affecting the memory of the controller. It is worth noting that future SDN controllers are likely to be engineered to be deployable also in virtualized platforms, or in container technologies. This means that system failures should, in principle, be injectable also at the virtual machine (VM) or container level.

In the Failure Model, in addition to the failure type to be injected, failures may be injected according to various other injection parameters. For example, a failure may be triggered according to a specified injection time which is the exact time when the failure is to be injected. For example, in order to allow the user to design more complex failure-injection scenarios, the failure can be injected according to an injection duration parameter, which may specify whether the failure that is injected is transient (e.g., the failures are injected only once and removed after a specified amount of time in order to emulate temporary failure), intermittent (e.g., the failures are periodically injected and left in the system for a specified amount of time to emulate temporary, but recurrent failure conditions), or permanent (e.g., the failures are injected and remain in the system to emulate persistent failure conditions).

Various example embodiments presented herein may be configured to support control plane resiliency testing in a software defined network based on use of measurement to evaluate the resiliency of the control plane of the software defined network to failures.

In order to evaluate the performance of an SDN platform under faulty scenarios, and the capability of the SDN platform in detecting and mitigating such disruptive conditions, two set of metrics have been identified as follows: Service-Level Measures and System-Level Resilience Measures.

In order to evaluate the performance of an SDN platform under faulty scenarios, and the capability of the SDN platform in detecting and mitigating such disruptive conditions, Service-Level Resilience Measures may be used. These are high-level performance measurements representative of the quality of the service provided by the system, which are primary indicators of the health of the system. These measures encompasses (1) IBN Service throughput and (2) IBN Service latency.

In order to evaluate the performance of an SDN platform under faulty scenarios, and the capability of the SDN platform in detecting and mitigating such disruptive conditions, System-Level Resilience Measures may be used. In general, the goal of the resilience mechanisms of the system is to reduce, as much as possible, the disruptions to business operations. The ultimate goal is to avoid any possible downtime. Unfortunately, the provided resilience mechanisms may fail in accomplishing their purpose, proving to be inefficient under certain faulty conditions. Therefore, these set of measurements cope with the characterization of the SDNs in terms of their ability to detect and correctly handle unforeseen faulty conditions. They may encompass the following metrics: Failure Detection Coverage (FDC), Failure Detection Latency (FDL), Failure Recovery Coverage (FRC), Failure Recovery Latency (FRL), Availability, or the like, as well as various combinations thereof.

Failure Detection Coverage (FDC) may be defined as the percentage of failure injection tests in which the SDN infrastructure raises a notification about the faulty condition, either on a single node, or on the failure-free nodes belonging to the cluster. FDC may be computed as follows: $FDC=\#F_{detected}/[\#F_{undetected}+\#F_{detected}]$, where $\#F_{detected}$ and $\#F_{undetected}$ are the number of tests in which the injected failure is detected and reported by the SDN cluster and the number of tests in which the injected failures is not detected but causes performance degradation, respectively.

Failure Detection Latency (FDL) may be computed as $FDL=t^e_{detected}/t^e_{injection}$, $e \in E$, where $t^e_{injection}$ refers to the time the failure is actually injected on the target controller and $t^e_{detected}$ refers to the time at which an anomaly is raised by the SDN cluster. In computing this metric we only consider the subset e of the performed experiments E in which the failures have been correctly detected and reported by the SDN infrastructure.

Failure Recovery Coverage (FRC) may be defined as the percentage of failure injection tests in which the SDNs initiated and successfully completed a recovery process. FRC may be computed as: $FRC=\#F_{detected}/\#F_{recovered}$, where $\#F_{detected}$ and $\#F_{recovered}$ are the number of tests in which the injected failure is detected and the number of tests in which a corresponding recovery action is successfully completed, respectively. For example, upon the crash of a controller instance, the recovery action is considered successful if the remaining controllers correctly redistribute the management of the switches controlled by the failed instance, keeping a consistent view of the data plane network, and without losing performance.

Failure Recovery Latency (FRL) may be computed as $FRL=t^e_{recovery}-t^e_{detection}$, $e \in E$, which is the time between detection of the failure ($t^e_{detection}$) and the termination of the recovery procedure ($t^e_{recovery}$). It is computed exclusively for those experiments in which a recovery action has been taken by the failure-free SDN nodes.

Availability may measure the availability of the SDN platform as the percentages of Intent requests correctly processed by the controllers during a failure injection experiment, e.g., the percentage of requests that receive an answer within a predefined time interval and are correctly translated into flow-rules installation. Availability may be computed as follows:

$$\text{Availability} = \frac{\sum_{0 \leq t_{proc} \leq T} Intent^{succ}_{req}}{\sum Intent_{req}} \times 100$$

where $t_{proc}$ and T refer to the time between the Intent request and its response, and the time threshold after which an Intent requests is considered unsuccessful, respectively. It is noted that, at a lower level of abstraction, the system availability may translate into the percentage of flow entries correctly installed into the physical devices. Indeed, having a high error rate for the flow-rule installation may reflects the incapacity of a controllers to communicate with the devices, due to either a faulty communication channel or a malfunction of the devices. As consequence, a controller will be unable to satisfy an Intent request, affecting the overall system availability.

Various example embodiments presented herein may be configured to support control plane resiliency testing in a software defined network based on use of a Failure Injection framework.

The Failure Injection framework may include a Failure Injector which may be composed of a Failure Injection Manager and a Failure Injection Actuator, both of which are discussed further below.

Figure 5:
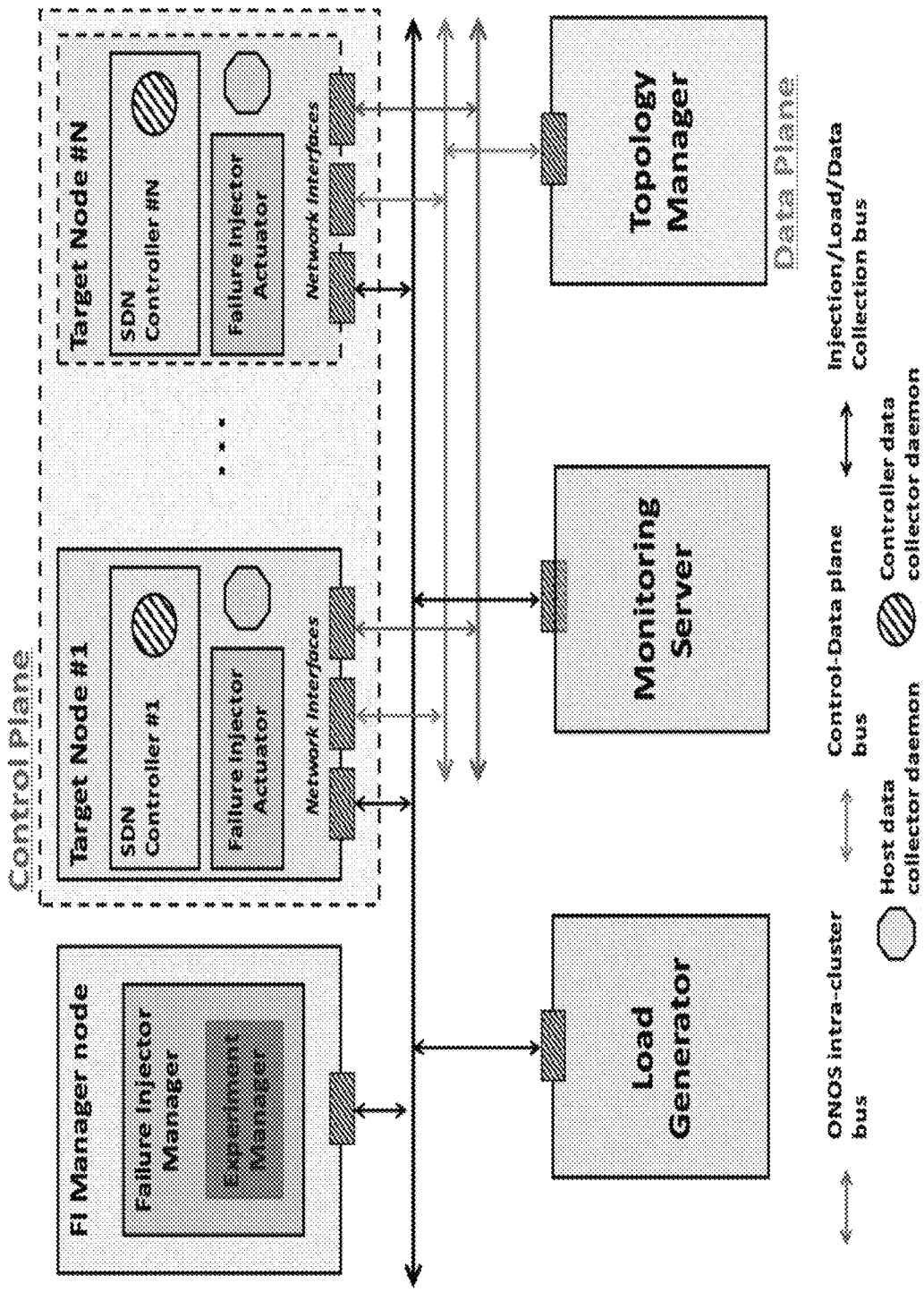
FIG. 5 depicts an architecture of an SDN failure injection framework configured to inject failures in an SDN for a failure injection experiment for the SDN.

FIG. 5 depicts an architecture of an SDN failure injection framework configured to inject failures in a software defined network. The failure injection framework includes a Failure Injector (FI). The FI may be based on the failure model described with respect to FIG. 4. The FI may support and simplify the generation of several failure scenarios, such as misbehaving or crashing of one or more SDN controllers. Using those scenarios, a network provider could pick the proper template failure scenario to run against their SDN ecosystem. The failures supported by the model are synthetically introduced into components of the SDN, thereby allowing the components to experience a series of failures that simulate real-world failures. In addition, since error conditions and corner cases occur in a production environment, even if they are not observed during testing activities, the FI also may be configured to inject failures into running SDNs, as a mechanism to best mimic real-world dependability challenges.

Figure 6:
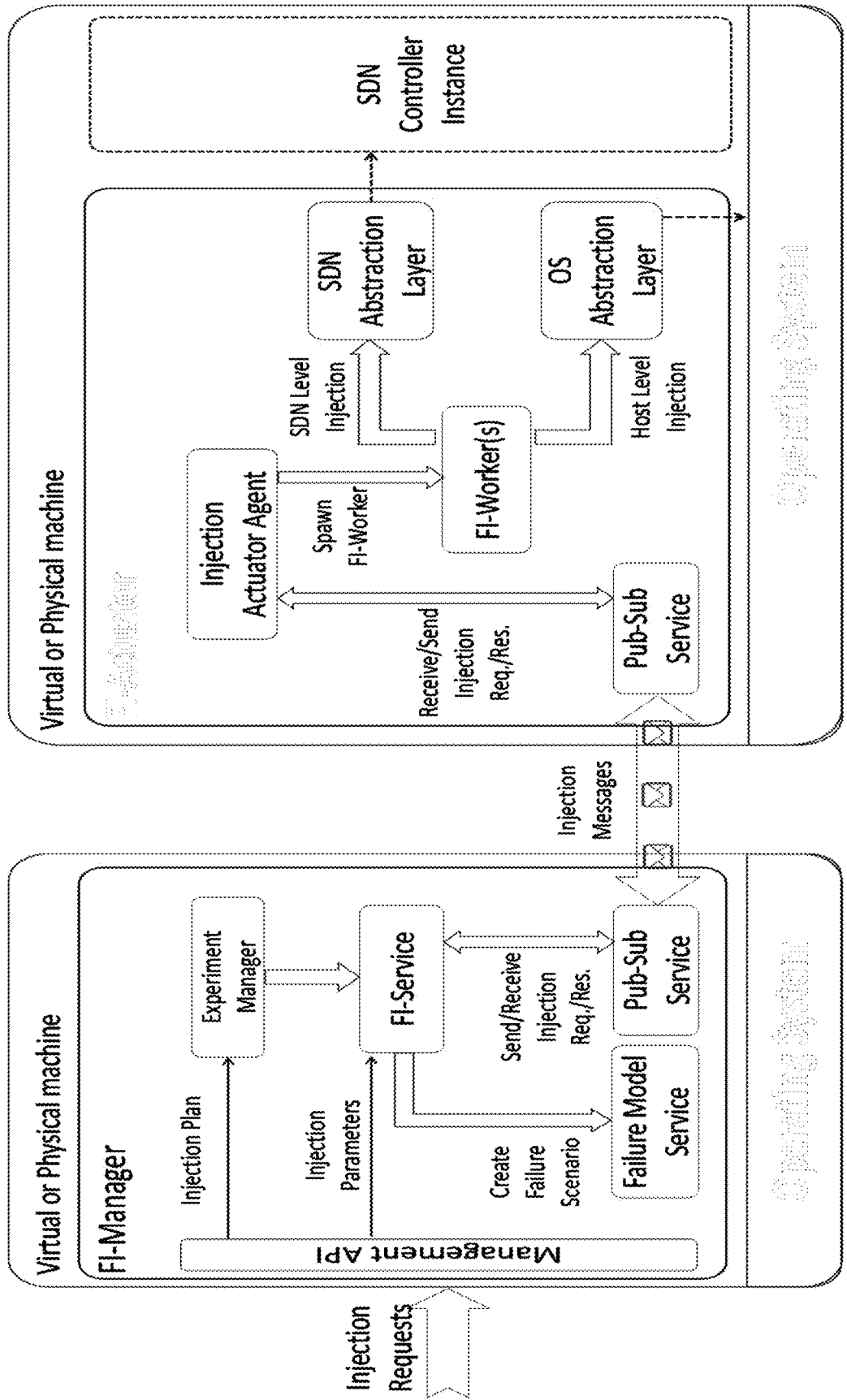
FIG. 6 depicts a failure injector architecture for a failure injector configured to inject failures in an SDN for a failure injection experiment for the SDN.

FIG. 6 depicts a failure injector architecture for a failure injector configured to inject failures in a software defined network. The foundation of the architecture for the FI is that of a distributed application with a publish/subscribe (or pub/sub, for short) communication model. The architecture for the FI includes two main components as follows: a Failure Injector Actuator and a Failure Injector Manager. The Failure Injector Actuator is a program that resides on the Target Node, that is the machine running the target SDN controller instance, and which actually performs the failure injection. The Failure Injector Manager is a user space program that resides on a separate machine from the Target Nodes(s), the FI Manager node, and which remotely coordinates failure injection on the Target Node(s). The FI architecture may be designed with the goal of simplifying and speeding up the extension of the failure scenarios, while the provided user-friendly API makes the tool suite easy-to-use and accessible.

Various example embodiments presented herein may be configured to support control plane resiliency testing in a software defined network based on use of a Failure Injector, which may be implemented as follows.

Figure 7:
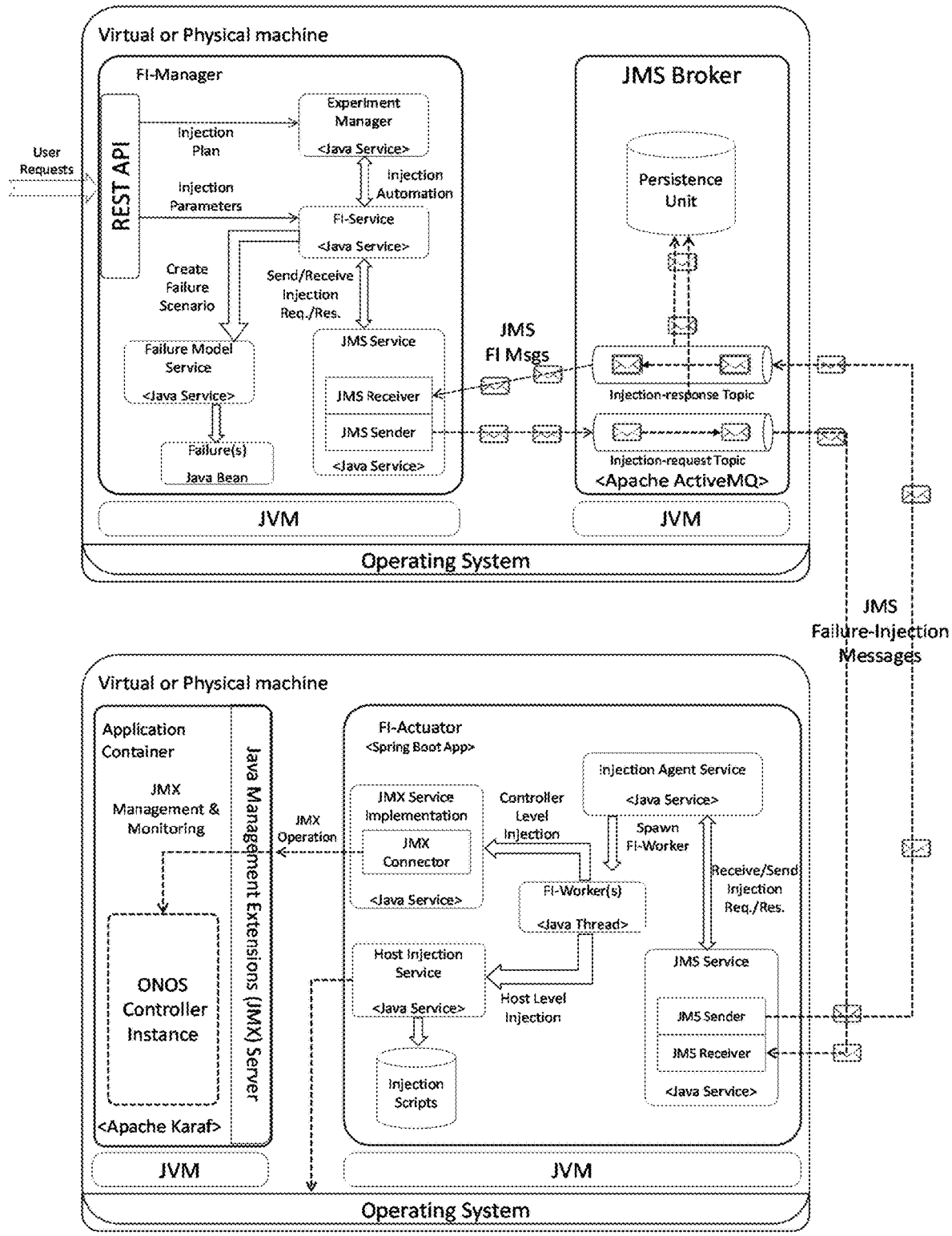
FIG. 7 depicts an example of a failure injector configured to inject failures in an SDN for a failure injection experiment for the SDN.

FIG. 7 depicts an example of a failure injector configured to inject failures in a software defined network. As depicted in FIG. 7, the FI Manager and the FI Actuators are deployed on different hosts, and communicate through the Apache ActiveMQ (e.g., ActiveMQ 5.14) message broker. ActiveMQ is a Java implementation of the Publish-Subscribe design pattern. The broker resides on the same machine hosting the FI Manager, and provides a reliable topic-based messaging infrastructure that the FI components can use without being coupled to each other. According to such pattern, the FI components act as senders (publishers), and/or receivers (subscribers). The former publish messages (i.e., events) on specific topics, without knowing the subscribers, i.e., without specifying the receivers. Similarly, subscribers receive only messages for the topics to which they subscribe, without knowing the sender.

Various example embodiments presented herein may be configured to support control plane resiliency testing in a software defined network based on use of a Failure Injector (FI) Manager, which may be implemented as follows.

The FI Manager runs as a system service on the Manager Node. With respect to the adopted Pub-Sub messaging model, the manager acts as a publisher while sending failure injection requests to the FI Actuator(s) and acts as a durable subscriber while receiving responses from the FI Actuator(s). Here, a failure injection request refers to a message including the parameters the FI-Actuator will use to actually apply the injection.

The FI Manager internals are depicted FIG. 7. The FI Manager provides an end-user API that adheres to the principles of REpresentational State Transfer (REST) paradigm, or RESTful web services, simplifying the parametrization of the failure injection experiments. Each experiment is converted in a corresponding failure scenario. To this aim, the Failure Injection Service interacts with the Failure Model Service to retrieve the "failureload" scenario(s), i.e., the Java Bean object which specifies what failure to inject, as well as when and where to perform the injection. The latter is then translated into a message and sent to the corresponding actuators through the JMS Service.

As can be seen in FIG. 6 and FIG. 7, the FI Manager interfaces with an Experiment Manager (e.g., an Experiment Manager of an SDN control plane testing capability) to automate the failure injection experiments. To this end, the FI Manager extends the user-provided specification with further parameters to support the failure injection. FIG. 8 shows an example of such specification file. In addition to the data plane and workload parameters, the specification file defines the target nodes of the failure injection experiment, namely the FI Actuators that must inject the failure (e.g., the nodes with IP addresses X.Y.Z.1 and X.Y.Z.2). It also specifies the type of failure to inject on such nodes, e.g. a "burnCpu", namely a System Failure; and the failure injection mode, i.e., a transient failure with an injection time span of 10 s. The user can also specify a set of failure injection experiments to be performed sequentially.

If one of the above steps fail, the FI Automation Service forces a cleanup of the hosting machines, and schedules the failed run to be performed again when the experimental plan is completed. These steps ensure that the results of each experimental run will not be biased by previous experiments.

The FI-Service acts as a coordinator of the manager services. By means of the Failure Model Service, it translates the injection requests into corresponding Java Bean Objects to send to the message broker through the JMS Service. Finally, the FI Automation Service can be used to automate the generation of failure injection scenarios according to a specific experiment plan. This service is the most complicated component, in terms of implementation, of the FI Controller that aims to translate an injection policy plan into a corresponding set of commands for running the failure injection experiments.

As indicated above, each experiment consists of a specific type of failure to inject and, according to the provided failure injection parameters, it can be repeated several times before running the next type of experiment.

For each type of failure injection experiment, and for each run of such failure injection experiment, the FI Automation Service performs three steps as follows. First, the FI Automation Service performs a Start-Up Step in which the controller instances are deployed into the corresponding hosting machines, the components of the framework are started, and several sanity checks are performed to make sure that the operations completed successfully, i.e. without any errors (e.g. a tool or a controller instance that does not start properly). Next, the FI Automation Service performs an Experiment Execution Step during which the single experiment is executed according to the failure injection parameters defined in the injection policy, and then the data (e.g. the log files, the loader, the data collector measurements, and so forth) are stored into a specific experimental folder. Finally, the FI Automation Service performs a Cleanup Step in which the involved machines are cleaned up, e.g., the logs and measurements are removed, the controller instances are removed, and the hosting machines are restarted.

Various example embodiments presented herein may be configured to support control plane resiliency testing in a software defined network based on use of a Failure Injector (FI) Actuator, which may be implemented as follows.

The FI-Actuator component is in charge of performing the failure injection. It is a lightweight program running as a system service daemon on a target node and, as the FI-Manager, acts as both subscriber and publisher in receiving failure injection requests and sending failure injection responses, respectively.

The FI Actuator internals are depicted FIG. 7. The Injection Agent Service is the main service of the actuator. It coordinates the communication with the message broker and triggers the FI-Worker to perform the injection task. According to the injection type and the timing parameters provided along with the injection request, the Injection Agent Service spawns one or more FI-Workers—in the form of Java threads—which can run once, to emulate transient and permanent failures, or periodically to emulate intermittent failures.

When a failure injection request is received by the FI-Manager, the Injection Agent Manager first checks if the failure must be injected and, if so, it spawns a Failure Injection Worker which actually perform the injection. Furthermore, according to the failure scenario to assess, failures may be injected in a specific component, e.g. in the SDN controller or in the Operating System (OS). To this end, the FI-Workers use interfaces (see FIG. 6), acting as abstraction layers to make the injector cross-platform compatible, namely: an SDN Abstraction Layer, a Java Management Extension (JMX) Service, and a Host Abstraction Layer.

The SDN Abstraction Layer provides a common and restricted set of APIs to simulate internal failures of the services of the SDN controller or the SDN controller itself. To this end, the FI Actuator provides an implementation of JMX, which is the technology supporting the monitoring and the management of Java application. Through this service, the FI-Workers can intercept and terminate specific SDN controller services as well as the controller instance itself, by directly interacting with the corresponding JMX server exposed by the Apache Karaf Container running the SDN controller.

The JMX Service is configured to directly interact with the Apache Karaf Container, which is the application container hosting the SDN controller instance. Specifically, the JMX Service provides an implementation of the JMX—the technology supporting the monitoring and the management of Java application—to interact with the JMX server exposed by Karaf. Through this service, the FI-Workers can intercept and terminate specific SDN controller services as well as the SDN instance itself.

The Host Abstraction Layer offers the abstractions required to enable the injection of failure at the OS level. To this end, the FI Actuator provides the Host Injection Service which runs lightweight injection scripts, C programs, or kernel modules, according to the type of failure to inject. The Host Injection Service works with several Unix-like operating systems, and it can be simply extended to work with other OSs and to accommodate further failure modes.

Various example embodiments presented herein may be configured to support control plane resiliency testing in a software defined network based on use of failure injection, where failure injection may be implemented as follows.

Figure 9:
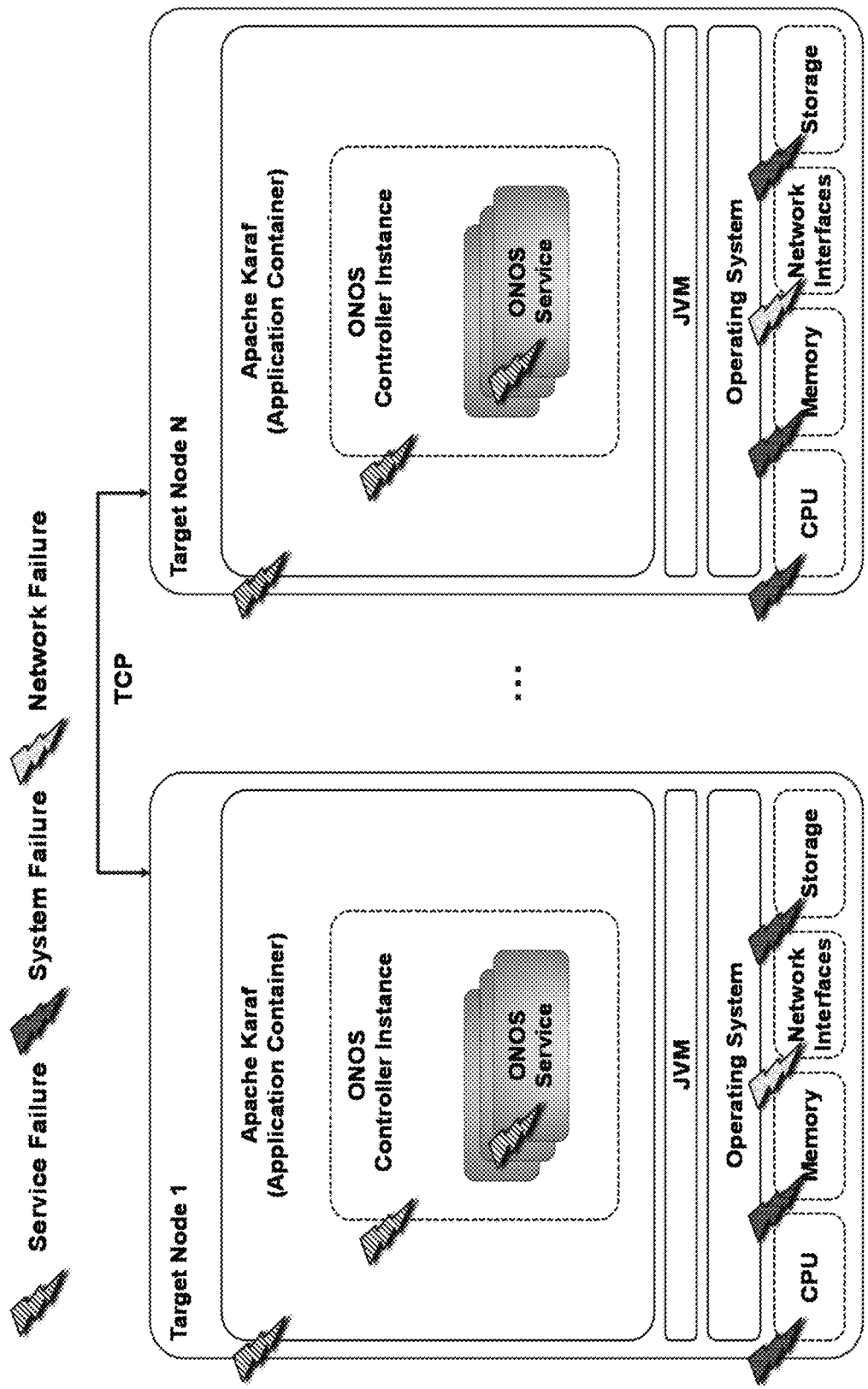
FIG. 9 depicts an example of localization of failure injections for injecting a service failure in an SDN.

As depicted in FIG. 9, failures classes are intended to target different components of a target node. The System failures are injected to emulate failures related to the computational resources of the machine hosting an operating system instance (e.g., an ONOS instance or other suitable instance). The Network failures are injected to specifically emulate failures concerning network communications and interfaces. The Controller failures are injected at service level (e.g., at the application container or process level) to emulate a faulty controller instance. Each of these failures can be injected, at the same time, into a specific target node, a subset of nodes, or all nodes. Additionally, as already pointed out, these failure models may be used to assess: i) the resilience and performance of the target SDN platform; and ii) if proper failover mechanisms (e.g., fallback logics, degraded operation modes, or the like) are provided under faulty conditions.

Various example embodiments presented herein may be configured to support control plane resiliency testing in a software defined network based on use of failure injection that uses injection of system failures.

This class of failures reproduces scenarios mimicking resource saturation or crashes of the machines hosting the SDN controller instances. It encompasses several modes such as, system hang, starvation, outage, and shutdown (at single CPU level), as well as disk and memory saturation.

The hang of the hosting machine is emulated by installing a kernel module in the OS which performs uninterruptible computation, e.g., it takes control of the available computational resources without releasing them. By doing so, the controller process and other system processes are no longer able to acquire any CPU cycle to perform operations. In addition, although the system is hung at a very low level in the kernel and is no longer processing threads, the network driver is still able to operate in "degraded mode", and this may lead the SDN platform into an inconsistent state. Indeed, the failure-free controllers are still able to communicate at network level with the faulty instance, however, inconsistent behavior may occur due to the degradation of the communication.

The shutdown and system outage failures may lead to the same failure scenarios, e.g., the stop of the machine hosting the SDN controller instance. However, while the first one may be a controller stop of the hosting machine, the second one may cause the crash of the system. Indeed, the shutdown may be performed by calling the Linux shutdown script which gracefully stop the running daemons, while the system outage may lead to the stop of the machine hosting the SDN controller instance. This failure class may be implemented as a kernel module which performs inconsistent operations leading to the so called kernel panic error.

The system starvation is another type of failure which can cause the crash of the hosting machine. It depletes the system resources. If injected and left in the system for enough time, or injected in a permanent manner, it slows down or crashes the system due to resource starvation. This failure scenario is reproduced by starting a user-space process which continuously replicates itself, exhausting the system resources. The speed at which the process replication process happens can be controlled to emulate specific resource exhaustion trends.

The memory and disk saturation failures may be implemented as high priority user-space processes which allocate as much memory, or disk, space as possible, without ever freeing the acquired resources. These classes of failure are meant to assess how the lack of memory, or disk, space, can affect the availability of a controller instance, and if such a condition can lead to an "inconsistent" state of the control plane.

In order to evaluate the resilience of the SDN platform against faulty CPUs or maintenance activities, the Injector can inject also CPU shutdown failures. This class of failures changes the target CPU state by turning it off. In doing so, the Injector may exploit the CPU hot-plugging feature supported by the Linux, which is the ability to turn a CPU core on and off dynamically. The Injector changes the state of a CPU by modifying the value in /sys/devices/system/ cpu/cpuX/online where X is the target CPU to turn on or off, which in turn invokes the corresponding kernel function that updates the CPU state.

Finally, a single target controller instance might suffer from increased CPU utilization, e.g., due to resource over-commitment problems in a virtualization environment or to other compute-intensive jobs running on the same target machine. The corresponding failure types to mimic such a scenario are CPU burns and I/O burns. These two classes of failures may be emulated by spawning high-priority user-space processes which compute CPU or I/O intensive activities, respectively, causing the performance degradation of other system processes.

It will be appreciated that various other system failures may be injected to support control plane resiliency testing in a software defined network.

Various example embodiments presented herein may be configured to support control plane resiliency testing in a software defined network based on use of failure injection that uses injection of network failures.

In complex distributed environments, such as those of SDNs, network problems can occur at any layers of the infrastructure. For instance, network failures can be due to physical faults of network devices, bad network configurations, wrong designs, or the like. This turns out to produce "inconsistencies" among the layers of the SDN stack, e.g., the view of the logical network is misaligned with the physical network, or to compromise the control-to-data plane communication, resulting in a "brainless" network. Therefore, the failures belonging to this class aim to mimic network-related problems typically addressed by distributed systems, such as a corrupted messages, or a latent connection which can lead to split brain problems.

Figure 10:
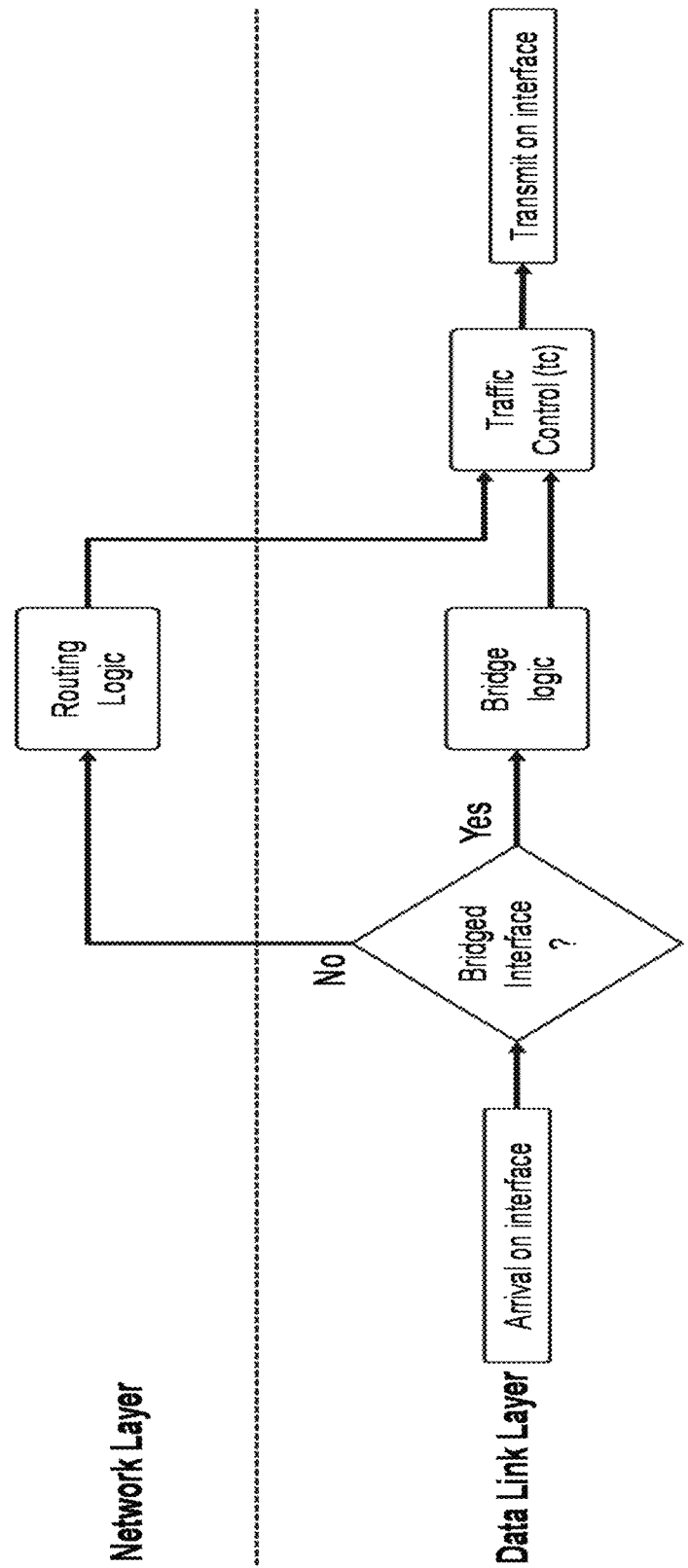
FIG. 10 depicts an example of a Linux Traffic Control toolset configured for use in reproducing failure scenarios for injecting a failure in an SDN.

In order to reproduce these failure scenarios, the Injector may leverage the Linux Traffic Control toolset, or tc, which is a powerful tool for network traffic shaping, scheduling, classification, and prioritization. It is part of the Linux stack for controlling and monitoring various aspects of networking, such as routing, bridging, and firewalling. As shown in FIG. 10, tc is the last component of the Linux networking environment that packets pass through before leaving a specific output interface. The tc tool is built atop qdisc (for queue discipline), which is basically a scheduler for the packets passing through a network interface. The simplest implementation of a qdisc is first in first out (FIFO), however several schedulers are provided.

The Injector leverages the tc built-in Token Bucket Filter (TBF) queue discipline to slow down, i.e. throttle, the outgoing network traffic flowing from a target controller replica to one or more replicas, aiming to emulate failures due to network congestion problems. Vice versa, it uses the Network Emulation (NetEm) utility, in order to emulate failures scenarios due to packet latency, loss, corruption, and so forth.

The Injector, by means of this kernel component, may define specific queue disciplines to fail or corrupt the requests between two or more controllers, as well as to inject latency or to induce miss-ordering into such requests.

The Injector, to mimic failures due to "firewalling" or faulty network interfaces, may add specific filtering rules into Netfilter, the framework provided by the Linux kernel for packet filtering and manipulation. Such rules are intended to filter the incoming and/or outgoing packets directed to specified IP addresses and/or ports, and discard them, with a drop or reject action.

Finally, the black-hole failure injection may be performed by leveraging the ip Linux utility to add entries into the TCP/IP routing table of the Linux kernel ("Forwarding Information Base") aiming to mimic possible split brain problems, by dropping the network packets that are designated to a specified IP address and/or ports.

It will be appreciated that various other network failures may be injected to support control plane resiliency testing in a software defined network.

Various example embodiments presented herein may be configured to support control plane resiliency testing in a software defined network based on use of failure injection that uses injection of SDN controller failures.

Many SDN controllers may be engineered as a set of software modules, or bundles, interacting with each other to provide several types of services at different levels of the software stack, as specified by the OSGi framework, which in turn is built atop the Apache Karaf feature service, an OSGi container which simplifies the management of the OSGi services.

In such a complex ecosystem, failures can occur, leading to impairment of the interaction between the ONOS services, or worse, to the unavailability of the ONOS instance itself. Thus, this class of failures aims of reproducing scenarios affecting the ONOS services, as well as scenarios that emulate a faulty controller instance.

The injector may use the JMX features provided by the Karaf container to emulate problems affecting the SDN controller services. The Injector provides an implementation of a JMX Client to interact with the corresponding server exposed by Karaf and dynamically manage the resources of Karaf at runtime. Specifically, the Apache Karaf features provide a set of Managed Beans (MBeans), i.e., an enhanced Java bean representing a manageable resource, which are accessible through the MBean Server. Then, the Injector may use the JMX Connector to connect to an MBean server and to manage the registered resources, such as the installed OSGi services, or the Karaf instance itself.

Figure 11:
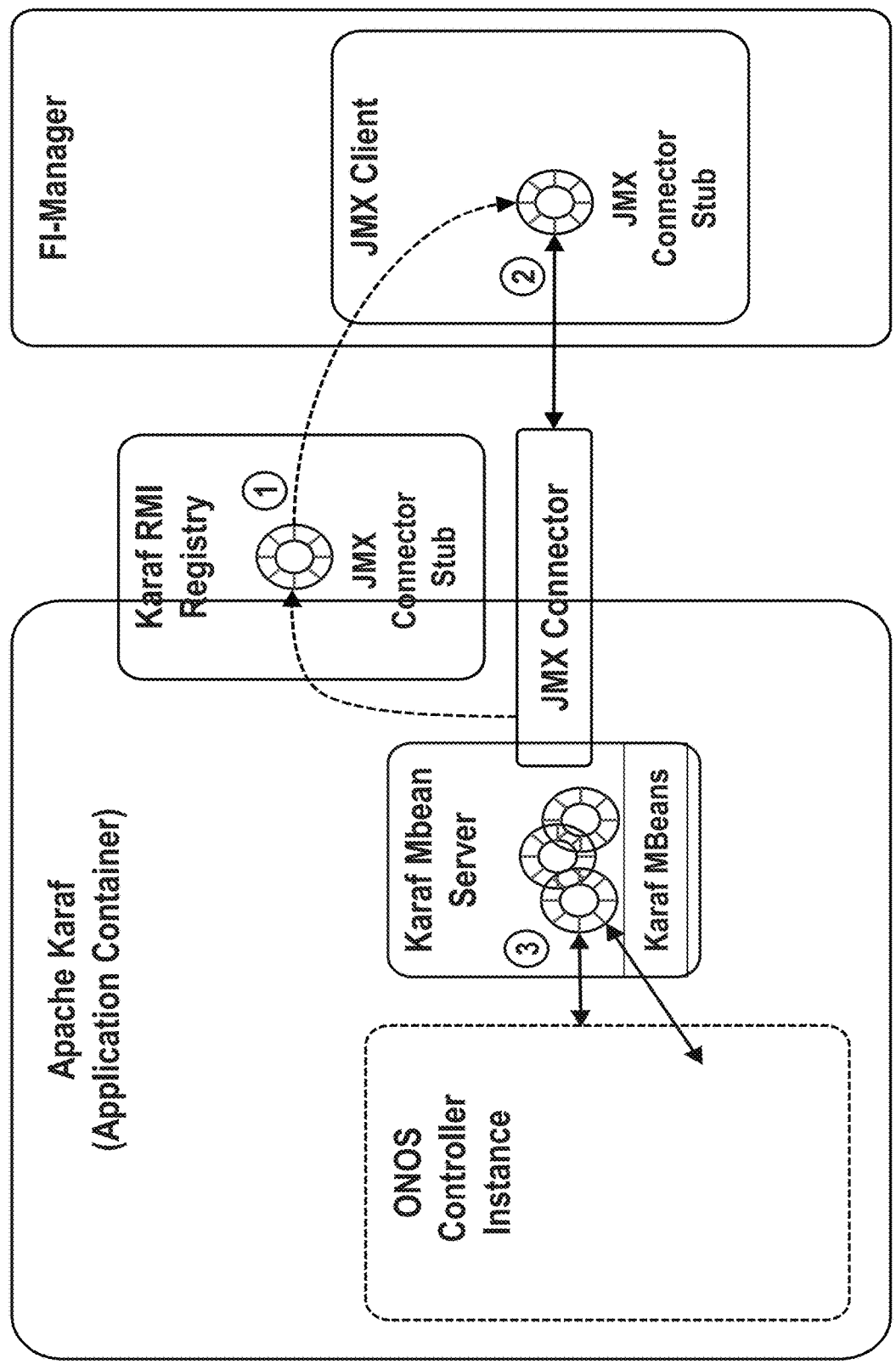
FIG. 11 depicts an example of a Java Management Extension (JMX)-based procedure for injecting a service failure in an SDN.

The stop of the SDN controller instance may be performed as follows. As an example, FIG. 11 depicts a procedure which may be used by the Injector to stop the ONOS SDN controller, or one or more of its modules. The steps are the following: (1) the Injector, acting as JMX Client, issues a Java Remote Method Invocation (RMI) to the Karaf RMI Registry to obtain the stub for the JMX Connector Server (where the stub is a local Java class implementing the remote interface of the JMX Connector), (2) the client uses the stub to connect to the Karaf MBean Server and interacts with the MBeans, and (3) the client leverages the services of the MBean of Karaf to inject a service failure, e.g. by shutting down or restarting the ONOS instance or its services, or the Karaf container itself. According to the provided injection parameters, the Injector calls the appropriate methods exposed by the MBean of Karaf to actually inject the failure.

The kill of the SDN controller instance may be performed by sending to its main process the SIGKILL signal. Unlike the clean stop of the instance, the SIGKILL signal is not captured by the process and stops it immediately, thus not allowing the SDN controller instance to cleanly close the socket connections.

The Failure Injector framework provides a further injection to corrupt the state of an SDN controller instance. To this end, the Injector corrupts partially, or totally, the Java heap or stack space of the controller process memory. In the first case, the corruption affects the runtime environment of the controller, while in the second case it affects the execution environment of the controller threads. Moreover, both conditions can lead to corruption, or worse, to Java Virtual Machine (JVM) crash.

The corrupt failure injection is meant to observe how an instance with a corrupted runtime environment can affect the data integrity of the overall SDN platform, and if the failure-free instances are able to deal with a misbehaving instance. Indeed, even if the instance lies in a corrupted state, for a short amount of time it is still able to interact with its peers and the data plane.

In order to perform a memory corruption, the Injector runs a user-space process which observes and controls the SDN controller process, by use of the Linux Process Trace system call (ptrace). Ptrace provides a mechanism to examine and change the core image and registers of a monitored process, and is used primarily to implement breakpoint debugging and system call tracing. By means of ptrace, the Injector, (i.e., the tracer), first attaches to the SDN controller process, i.e., the tracee, then it identifies and accesses the memory locations of such process and corrupts the content of the heap, or stack, memory.

It will be appreciated that various other SDN controller failures may be injected to support control plane resiliency testing in a software defined network.

Various example embodiments presented herein to support control plane resiliency testing in a software defined network may be further understood by considering various experiments conducted using at least some such embodiments, a description of which follows.

The experimental evaluation of various embodiments for supporting control plane resiliency testing in a software defined network may further understood by first considering the experimental setup for the experiments.

High availability and reliability are key goals for SDN technologies, that need to meet the six-nines reliability requirements of the carrier-grade networks before being widely adopted in network. Therefore, this experimental campaign aimed to verify how the SDN technologies, such as the ONOS platform, perform under disruptive conditions affecting the control plane. Specifically, the goal is to a) characterize the resiliency and reliability of the ONOS platform by reproducing faulty scenarios, and b) investigate the effectiveness of the detection and mitigation mechanisms of ONOS.

In order to demonstrate the application of various example embodiments for supporting control plane resiliency testing in a software defined network, an experimental campaign was conducting running ONOS 1.8 as the SUT on a proof-of-concept telco cloud infrastructure described in the following.

The experimental testbed consists of: (1) a 3×2-Socket server equipped with 2 Intel Xeon E5-2680 v3 12-core 2.5 GHz CPU, 256 GB of DDR 4 hosting both the VMs running SDN control plane testing capabilities as well as the ONOS instances, (2) a blade server having the same hardware configuration of the previous hosts mounting a shared iSCSI storage of 14×6 TB 7.2k 3.5" SAS disk, and hosting a data collector process of an SDN control plane testing capability, (3) a 1/10 Gb Nokia Ethernet management switch interconnecting the servers, and (4) a VMware ESXi hypervisor as infrastructure as a service layer.

In order to test how ONOS performed under faulty conditions, two main high-availability setups have been considered, namely: a set-up with i) 3, and ii) 5 ONOS controllers belonging to the same cluster and deployed across the servers. Each VM runs ONOS 1.18 on Ubuntu 16.04.2 LTS, and is configured with 8 vCPU and 8 GB of RAM, while JVM running the ONOS software is configured to exploit the maximum available RAM.

Mininet 2.2 has been adopted to emulate the data plane network, consisting in a linear topology, which is a topology of 10 switches connected linearly, and 5 hosts attached to the edge switches. The management of the emulated switches has been distributed between the ONOS instances, so that an East-West communication is triggered whenever a network paths is to be established.

The ONOS cluster is exercised with a workload encompassing Intent installation and withdrawing requests (i.e., host-to-host intents), which are balanced across the controller instances. Specifically, a Load Generator component of an SDN control plane testing capability has been configured in steady-state working mode to produce 1,000 requests/s and 3,000 requests/s.

Regardless of the number of controllers, the failures are injected in a single controller to make the results reproducible and comparable across different experiments. Failures are inserted at both the infrastructure level (i.e., system level and network level) and at the SDN controller level. Transient failures are injected after 90 s from the end of a warmup phase and, if possible, removed after 60 s.

FIG. 12 depicts a table summarizing the values selected for the controllable parameters of the FI, which are common to the experimental settings of the experiments. Each experiment lasts for 300 s, and it is repeated for a total of 10 runs.

For each experiment of the campaign, the VMs hosting the controller instances are first deployed on the blade servers using the APIs of an SDN control plane testing capability, then the startup phase is activated to actually form the ONOS cluster and start the emulated topology. After that, the experimental phase is started, and the load generator of the SDN control plane testing capability is instructed to start a warmup phase to warmup the JVM of the controller. The warmup is not accounted in the final results, and the evaluation metrics are computed from the injection time up to the end of the experiment. Finally, the experiment ends with the cleanup phase by reverting the VMs with a clear snapshot.

The experimental evaluation of various embodiments for supporting control plane resiliency testing in a software defined network may further understood by considering the experimental results for the experiments.

In order to identify if the any of the failure injection tests has actually affected the overall system performance, the throughput (IST) and latency (ISL) of the IBN framework of ONOS in failure-free condition was computed. Such metrics are then compared with the measurements collected during the failure injection experiments to quantify the possible impact of performance loss of ONOS.

The failure-free performance metrics have been computed as the average over 10 runs. FIG. 13 and FIG. 14 show the throughput and latency results of the failure-free tests for both deployment sizes, i.e., 3 and 5 controllers scenarios, and for a load levels of 1,000 and 3,000 requests/s.

It is noted that, in the following, the terms "target replica" and "target controller" are used interchangeably to refer to the replica of the ONOS cluster in which the specific failure has been injected.

The experimental evaluation of various embodiments for supporting control plane resiliency testing in a software defined network may further understood by considering the experimental results for the experiments where the experiments utilize injection of system failures for testing the resilience of the control plane of the software defined network.

This section describes the performance results obtained by injecting system failures on a single instance of the ONOS deploy. FIG. 15, FIG. 16, FIG. 17, and FIG. 18 show, respectively, the throughput, the 50th and 95th percentile latency of the ONOS IBN framework, for deployments with 3 and 5 controller instances, computed for failure injection experiments with a load levels of 1,000 requests/s and 3,000 requests/s. Both types of experiments show that most of the emulated failures impact the overall system performance. The performance degradation seems to be more evident as the load increases, e.g., from 1,000 requests/s to 3,000 requests/s.

Figure 15:
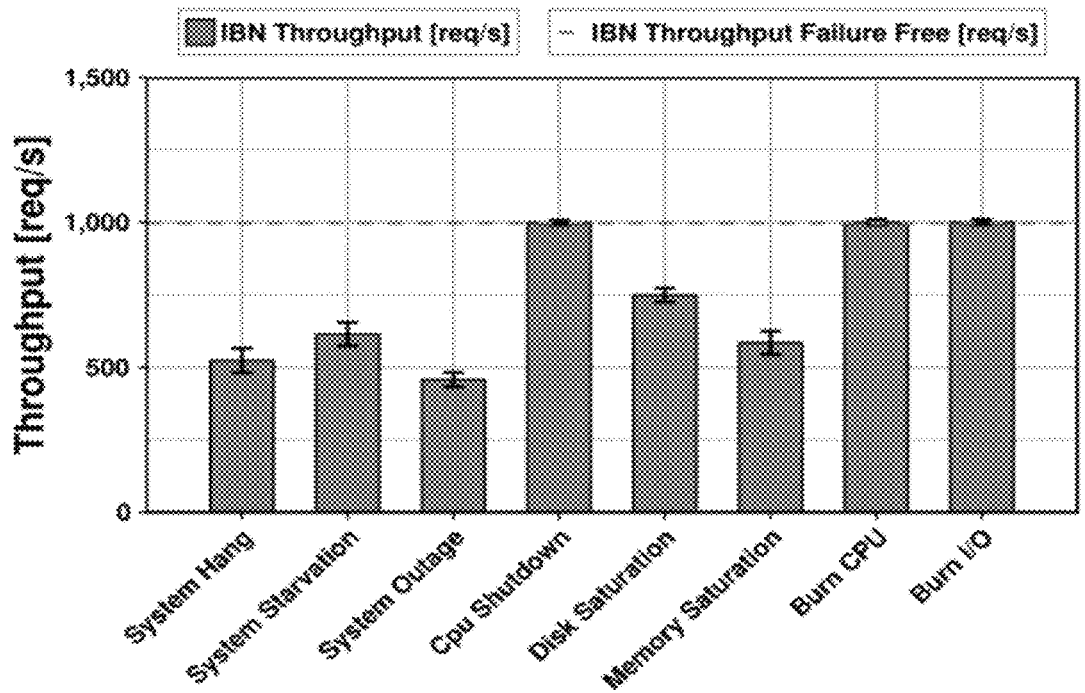
FIG. 15 depicts service throughput with system failure injection with a workload of 1000 requests per second with three SDN controllers.

FIG. 15 shows that the system hang, starvation, and outage failures, as well as the memory and disk saturation failures, impact more on the 3 controller scenario, causing a throughput loss between 30% and 60% compared to the failure-free scenario. A similar observation applies to most of the failure injection experiments reported in this section. This highlights the criticality of a deployment consisting of 3 controllers, where a single instance affected by failures can lead to the unavailability of the whole ONOS cluster.

Figure 16:
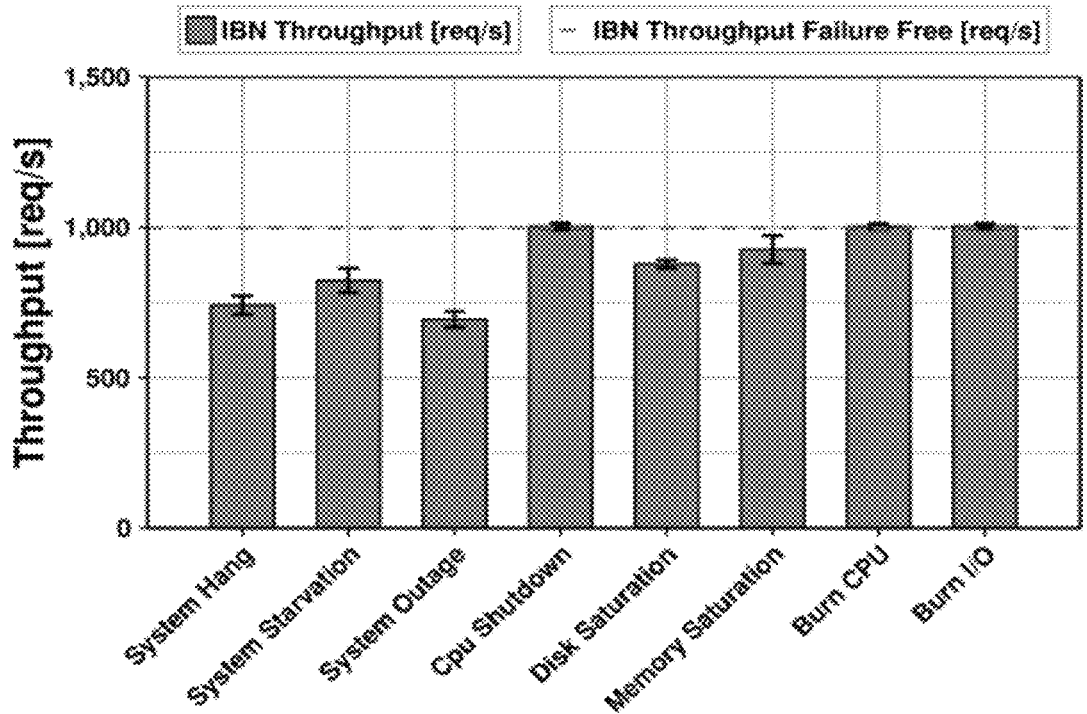
FIG. 16 depicts service throughput with system failure injection with a workload of 1000 requests per second with five SDN controllers.

As can be seen in FIG. 15 and FIG. 16, the system hang, starvation, and outage failures impact severely on the ONOS performance. System outage failures cause the crash of the target instance, while the system hang and starvation failures drastically reduce the SDN control plane responsiveness. The crash of the target replica is promptly detected by the other replicas. However, as can be seen in FIG. 15, with a load as high as 1,000 request/s, the ONOS cluster seems unable to properly recover from the injected outage failure.

This behavior is explained by the fact that the ONOS replicas not affected by the failure are still considering the target instance as master for specific devices. Therefore, each flow rule operation sent to the target replica failed without triggering any mitigation mechanisms (e.g., the election of a new master for the devices previously managed by the target instance) that lead to a high unavailability and performance loss. Similar observations also apply for system hang and starvation failure. Such anomalous condition is also confirmed even by the high volume of flow rule installation (managed by the ONOS Distributed Flow Rule Store) failures, representative of the incapability of ONOS in properly programming the data plane devices.

It is noted that the problem was that the target replica is still kept in the loop to distribute and install the flow rules on the devices requiring the failure-free replicas thereby highlighting the incapacity of the failure-free instances to correctly program the data plane switches. Most of these failures were related to the fact that target replica was unable to properly program the managed devices. Consequently, it failed in installing both the flow rules related to the managed intents, and those sent by the other replicas, triggering the re-execution of the failed flow rules. A subsequent offline analysis of the system logs has shown that this faulty situation persisted even after removing the failure and, in many cases, for the whole duration of the experiment. Clearly, repeating these activities for thousands of requests entails excessive resource utilization, and hence a reduction in the overall system performance.

As can be seen in FIG. 15 and FIG. 16, memory and disk saturation failures show different effects between the two deployment scenarios, and both indirectly affect the consistency of the data shared between the replicas. Indeed, ONOS maintains in memory the information related to the network state according to an eventually consistent approach, while the other pieces of information, namely the intents and system configurations, are stored in a persistent manner (on the disc). In particular, ONOS relies on the Raft consensus algorithm implemented by the adopted Copycat framework for consistency and data replication. To accomplish this, each server in the cluster maintains a separate copy of the system state machine along with a log of the operations that have been performed on that state machine and the associated results. Logs are durably stored on disk and are used to restore the state of a machine in the event of a failure. This is the reason why disk saturation failures lead the target controller to be no longer able to update its local state machine, hence affecting the consistency of the subset of data managed by the target replica. Its log file contains the information, hence preventing it not only from updating its current state of the system (e.g., installed/remove flows and intents), but also from properly sharing the information with the other replicas. For this reason, the majority of the intent requests submitted to the target replica failed without ever letting the other replicas to be up to date about those intents. Therefore, the throughput degradation was mainly caused by the fact that the target replica was accepting intent requests without being able neither to process them locally, nor to share them with the other replicas.

The memory saturation failure has caused a higher performance degradation than the disk saturation failure for both deployment scenarios, as well as for both tested load levels. A closer look to the system log files has shown that, after the injection of memory saturation failures, each of the ONOS replicas was experiencing unstable connections towards the data plane devices, thereby causing the disconnection of hosts. This turned out to be the failure of the intent compilation, since no valid path could be found anymore.

Figure 17:
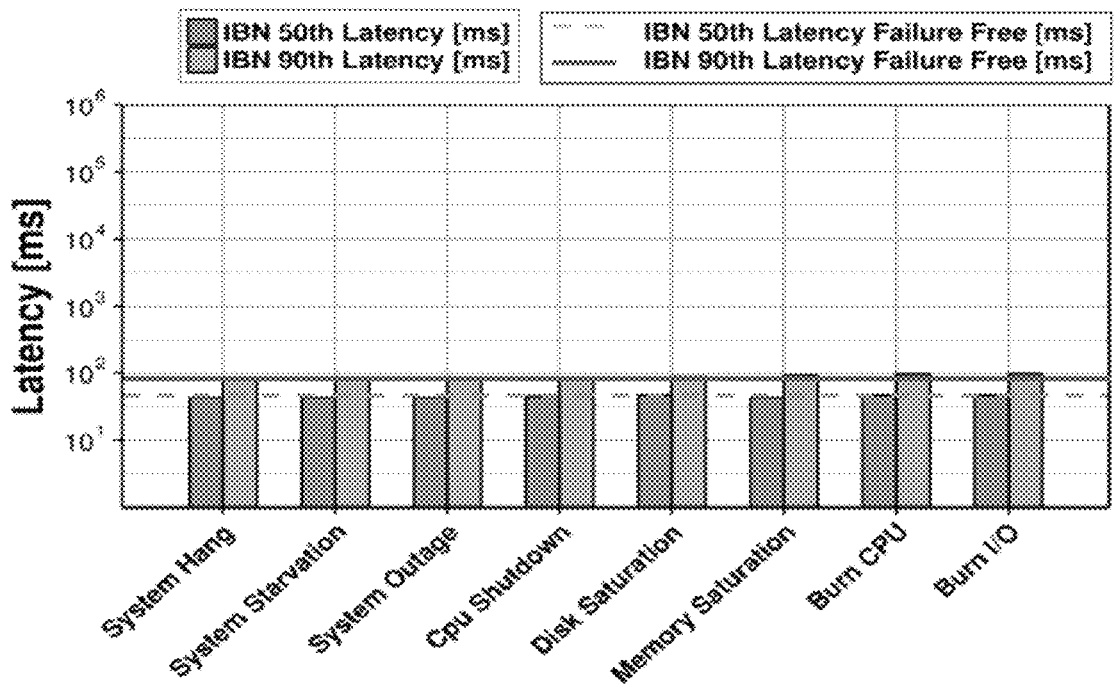
FIG. 17 depicts service latency with system failure injection with a workload of 1000 requests per second with three SDN controllers.

FIG. 17 shows that with a load as high as 1,000 request/s, none of these failure has lead to significant degradation of the IBN service latency.

Other type of injected failures, such as CPU and I/O burn, and CPU shutdown, show no direct impact on the performance for both deployments with 3 controllers and 5 controllers, and a load of 1,000 requests/s (see FIG. 15).

Figure 18:
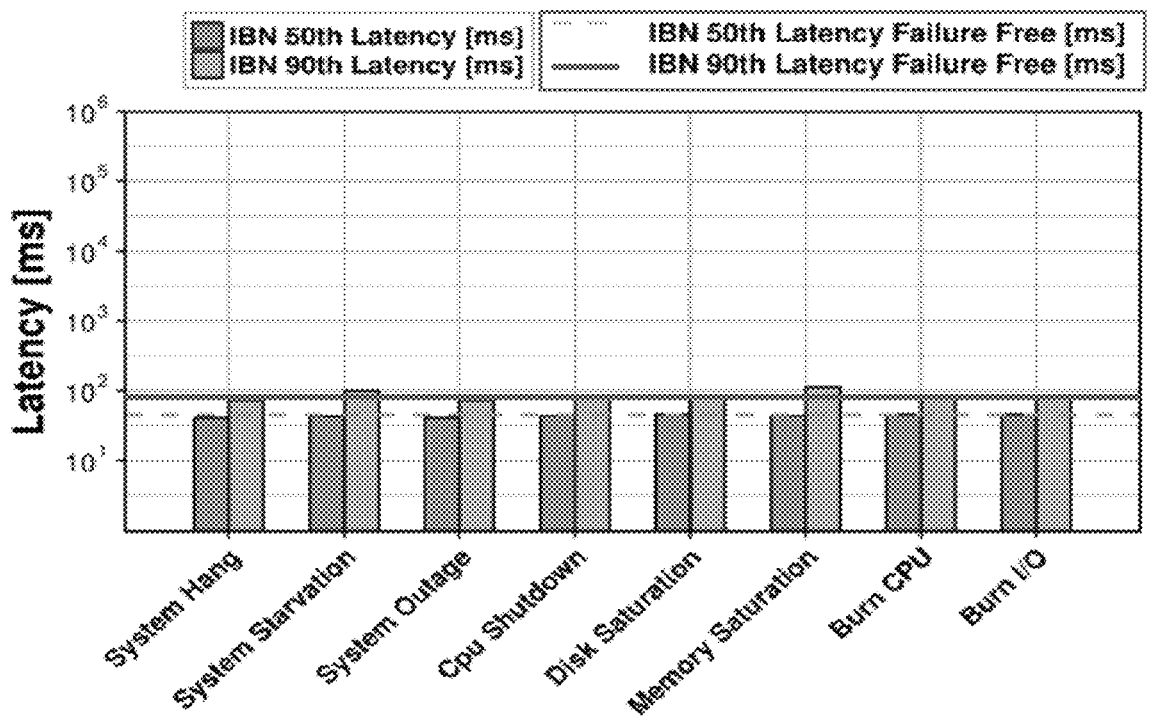
FIG. 18 depicts service latency with system failure injection with a workload of 1000 requests per second with five SDN controllers.
Figure 19:
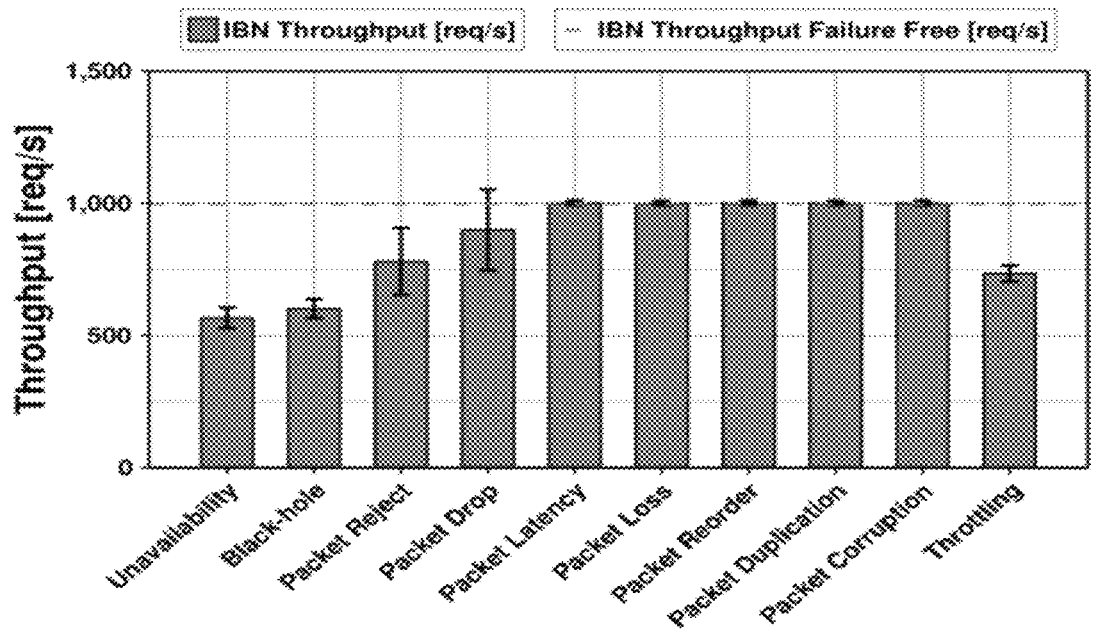
FIG. 19 depicts service throughput with system failure injection with a workload of 3000 requests per second with three SDN controllers.
Figure 20:
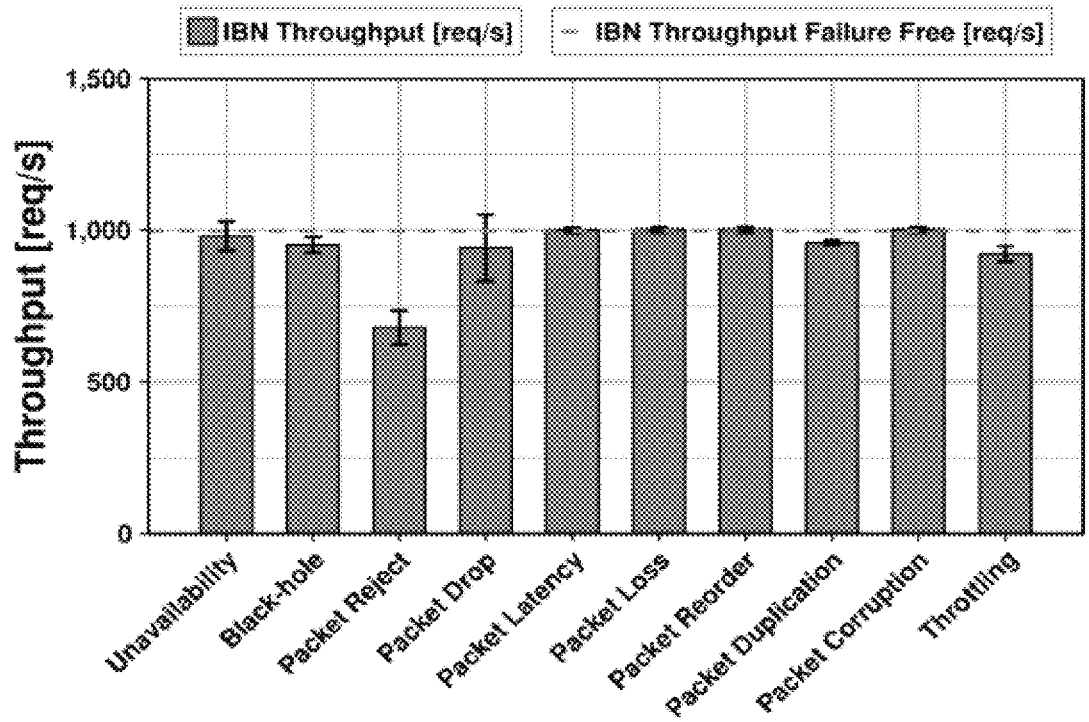
FIG. 20 depicts service throughput with system failure injection with a workload of 3000 requests per second with five SDN controllers.
Figure 21:
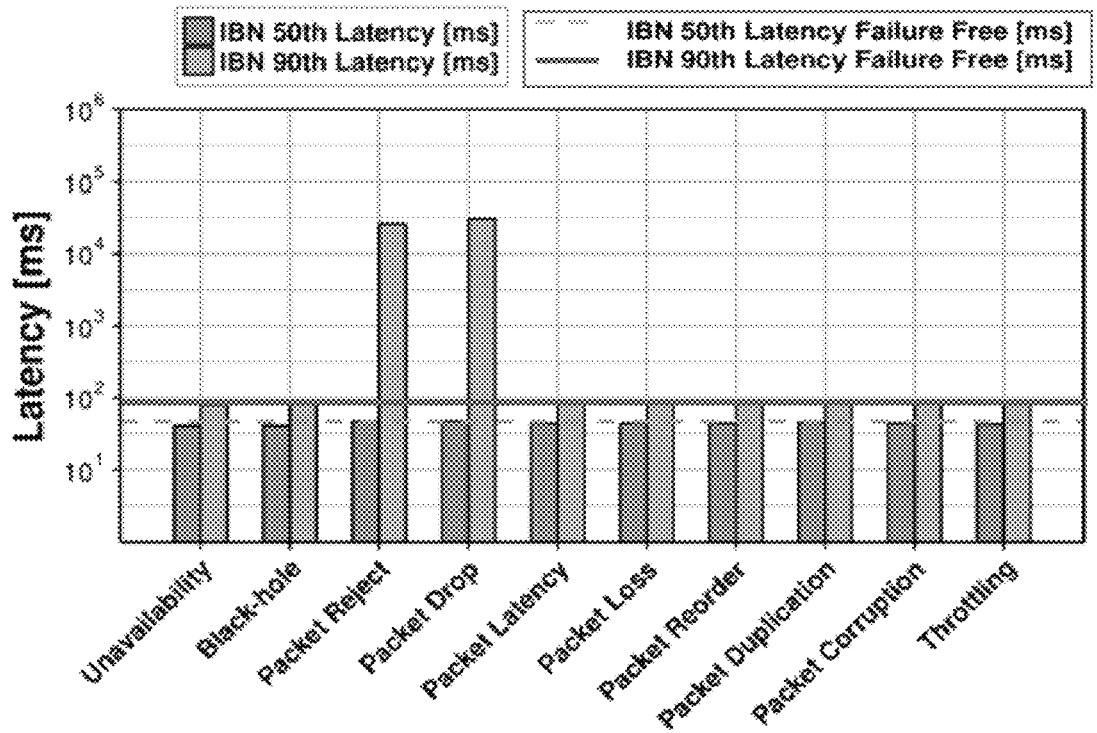
FIG. 21 depicts service latency with system failure injection with a workload of 3000 requests per second with three SDN controllers.
Figure 22:
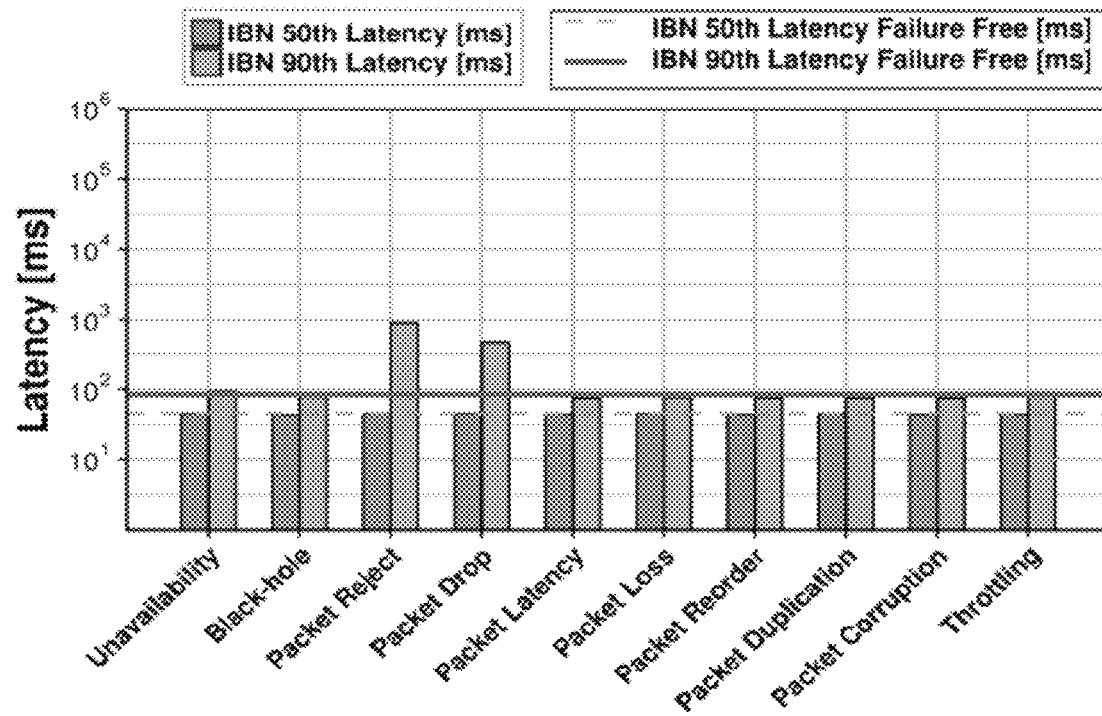
FIG. 22 depicts service latency with system failure injection with a workload of 3000 requests per second with five SDN controllers.

A different situation is that of FIG. 16 and FIG. 18, showing that most of the injected failures negatively impact both latency and throughput performance of both types of deployments, when a load of 3,000 requests/s is submitted to the system.

FIG. 16 and FIG. 18 show that CPU and I/O burn failures drastically affect the performance and latency of the 3 controller deployment. Both failures show similar effects to those observed by injecting fill memory failures. The I/O burn failure has slightly affected also the deployment consisting of 5 controllers. Indeed, the injection of such failure delay disk operations, causing the processing of intent requests to slow down. This behavior is explained by the fact that the ONOS permanently stores the intent data on the disk. FIG. 18 shows that only the system starvation failure is the one that most impacts on the latency of the 5 controller deployment. This can be explained by the fact that in some experiments the system starvation failure has lead the ONOS instance to crash, hence letting the other replicas detect and (slowly) react to an instance leaving the cluster.

The CPU shutdown failure appears to be the only one not affecting the performance at all. This can be explained by the fact that the operations performed by the ONOS process are mostly I/O bound, requiring continuous access to memory and disk while gather and update the data related to the system state machine, as well as to the data plane status.

In this set of experiments, it has been observed that no mechanisms are provided by ONOS to detect and mitigate possible resource depletion due to other user—and/or kernel—level tasks running on the same machine hosting the ONOS process. Indeed, most of the experiments involving failures mimicking resource saturation or corruption lead to an inconsistent state of the control plane. Although in such a state the target ONOS instance is still able to interact with its peers participating in the management of the cluster events, under these faulty conditions it is not able to accomplish most of its tasks (e.g. interacting with a managed switch, or satisfy an intent request). Consequently, the target instance continually triggers abnormal events (e.g., timeout exceptions in the cluster communication), as it is slow yet not believed crashed, forcing the other replicas to reply to such issues, taking away useful resources to process the incoming request load.

The experimental evaluation of various embodiments for supporting control plane resiliency testing in a software defined network may further understood by considering the experimental results for the experiments where the experiments utilize injection of network failures for testing the resilience of the control plane of the software defined network.

FIGS. 23A and 23B, FIGS. 24A and 24B, FIGS. 25A and 25B, FIGS. 26A and 26B, respectively, depict the throughput (FIGS. 23A and 23B and FIGS. 24A and 24B) and the 50th and 95th percentile latency (FIGS. 25A and 25B and FIGS. 26A and 26B) of the ONOS IBN framework, for deployments with 3 and 5 controller instances, computed during experiments with the injection of network failures and load levels of 1,000 and 3,000 requests/s. As discussed further below, the results show that network failures impact very differently in the two deployment scenarios.

Figure 23A:
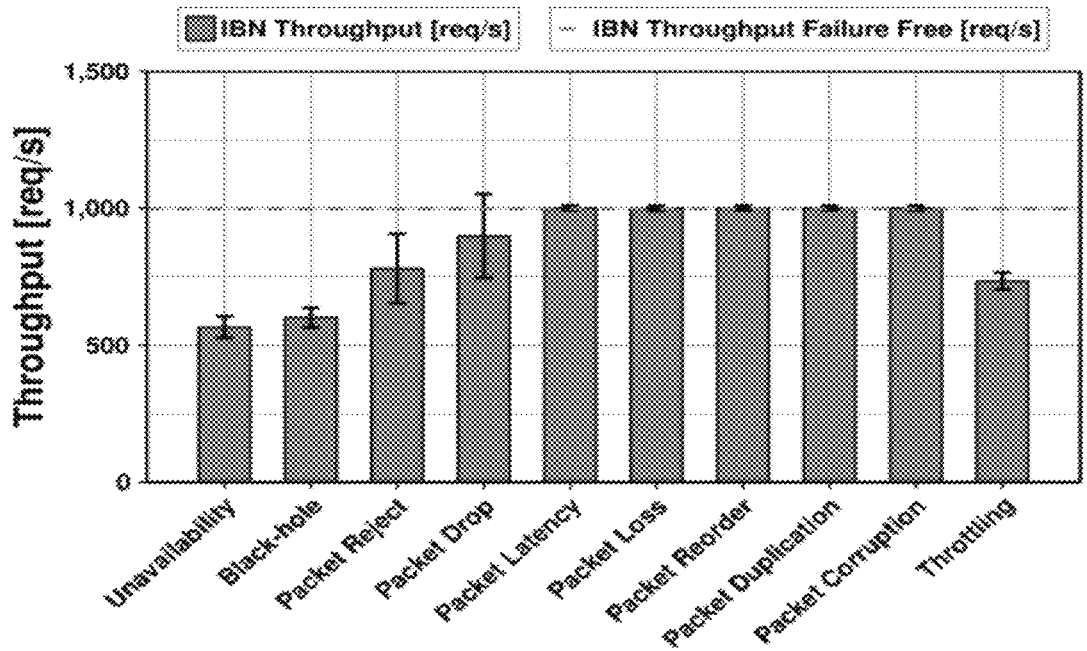
FIGS. 23A and 23B depict throughput with controller failure injection with a workload of 1000 requests per second with three and five SDN controllers, respectively.
Figure 23B:
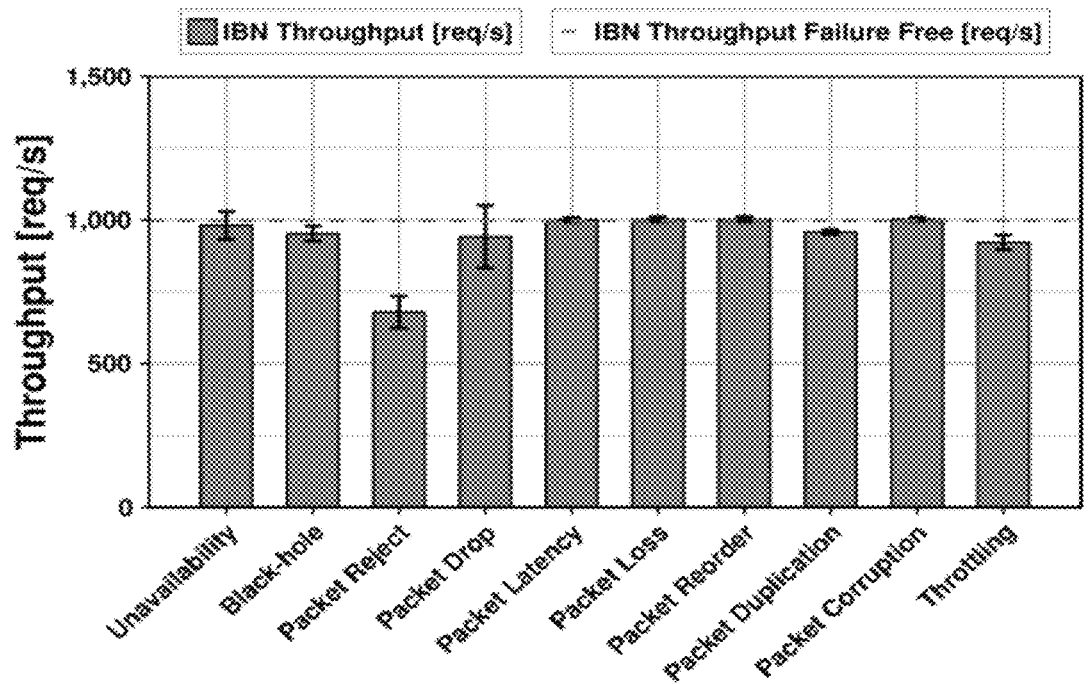
Figure 24A:
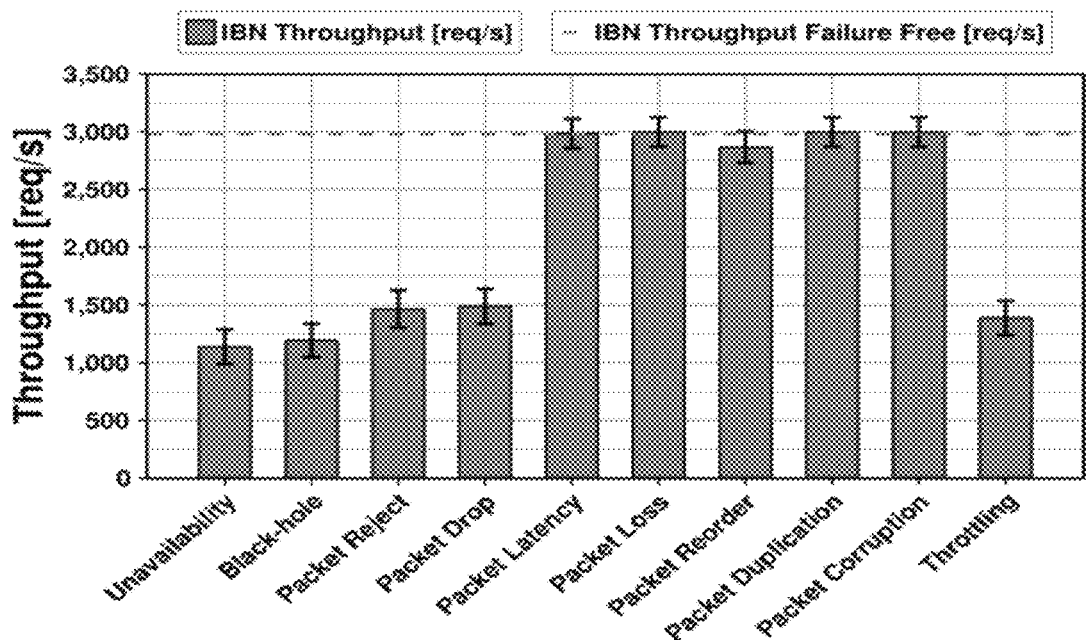
FIGS. 24A and 24B depict throughput with controller failure injection with a workload of 3000 requests per second with three and five SDN controllers, respectively.
Figure 24B:
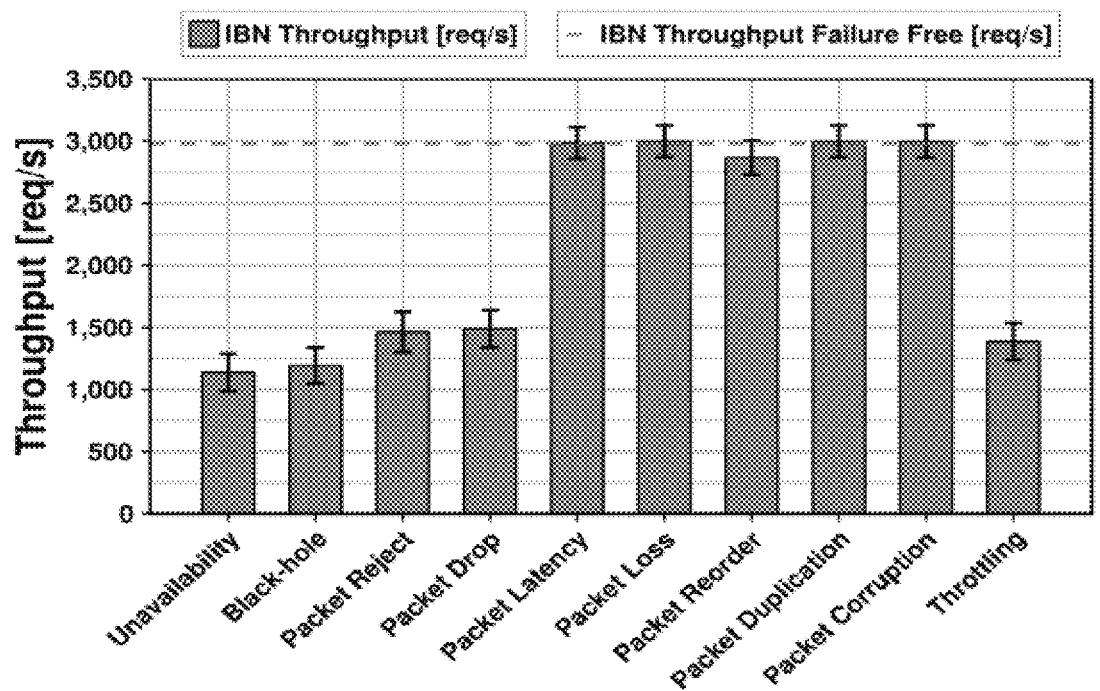

FIG. 23A and FIG. 25A show again the vulnerability of a deployment consisting of 3 ONOS instances, even under a load as high as 1,000 requests/s.

FIGS. 25A and 25B and FIGS. 26A and 26B show that the ONOS cluster tolerates most of the injected network failures. Indeed, control plane packet latency, loss, reorder, duplication, and corruption failures did not impact on the overall performance of both deployment scenarios, since most of these failures are detected and mitigated by the TCP protocol stack (e.g., packet corruption and reordering failures) and the heartbeats mechanism adopted by the ONOS Copycat framework (e.g. latency failure). The throttling, unavailability, black-hole, packet reject, and drop network failures caused substantial performance loss, for both throughput and latency.

Figure 25A:
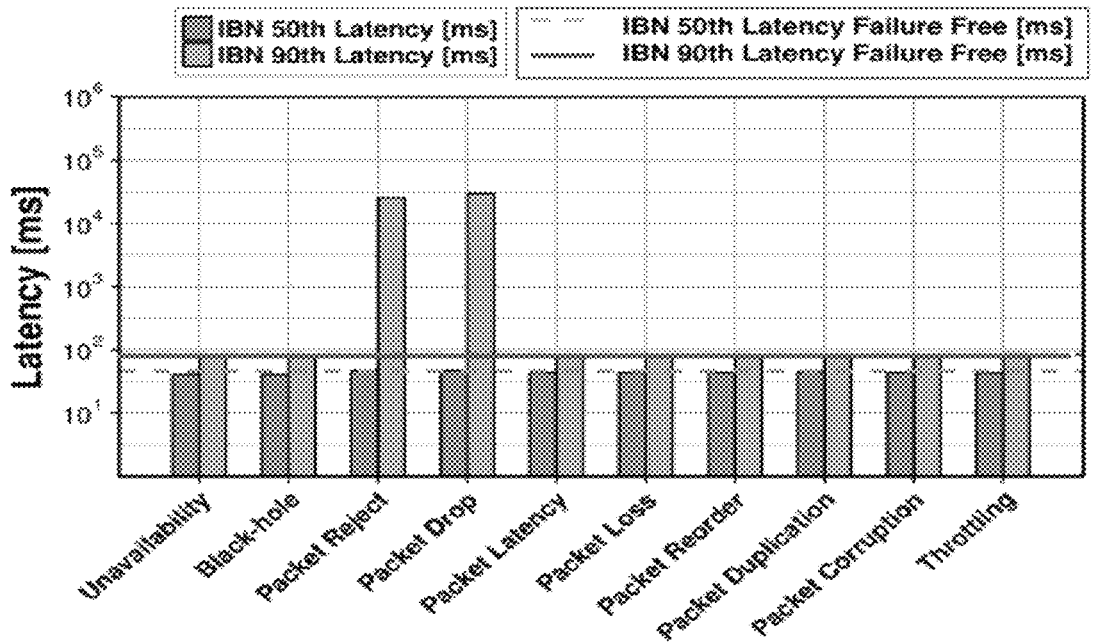
FIGS. 25A and 25B depict service latency with network failure injection with a workload of 1000 requests per second with three and five SDN controllers, respectively.
Figure 25B:
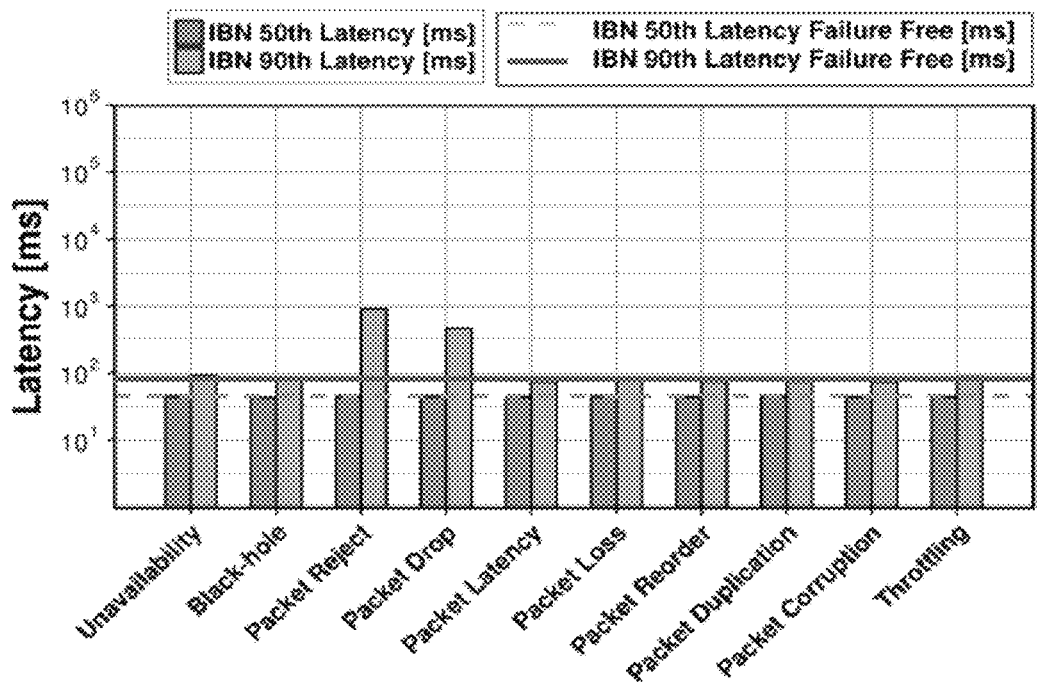
Figure 26A:
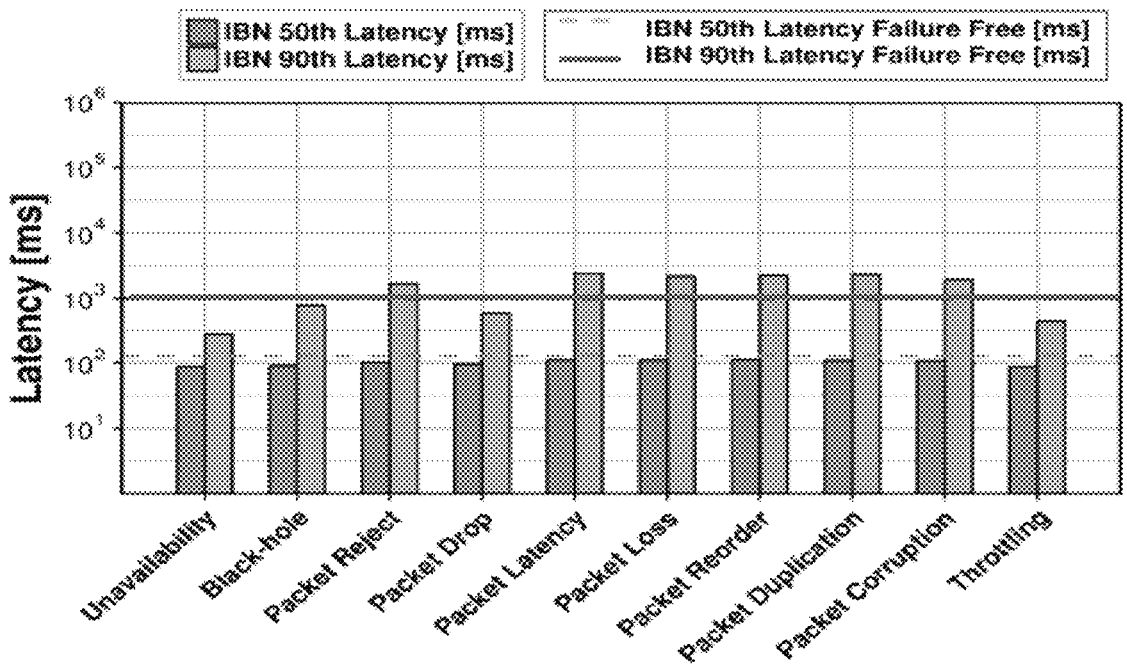
FIGS. 26A and 26B depict service latency with network failure injection with a workload of 3000 requests per second with three and five SDN controllers, respectively.
Figure 26B:
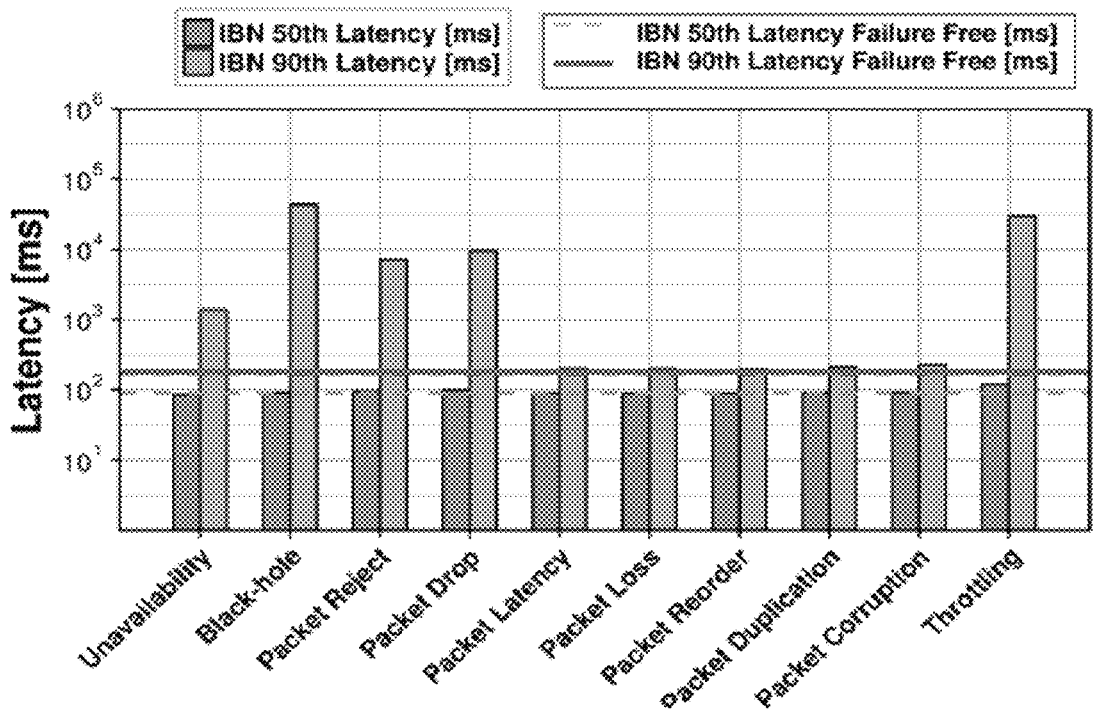

With a load as high as 1,000 requests/s, the 5 controller deployment (see FIG. 23B and FIG. 25B) seems to be more resilient to these type of network failures than the 3 controller deployment (see FIG. 23A and FIG. 25A). Similar observations do not apply to the scenario with a higher request rate, i.e., with 3,000 requests/s. As depicted in FIGS. 24A and 24B and FIGS. 25A and 25B, both deployments show significant loss of performance, both in terms of throughput and latency.

Figure 27A:
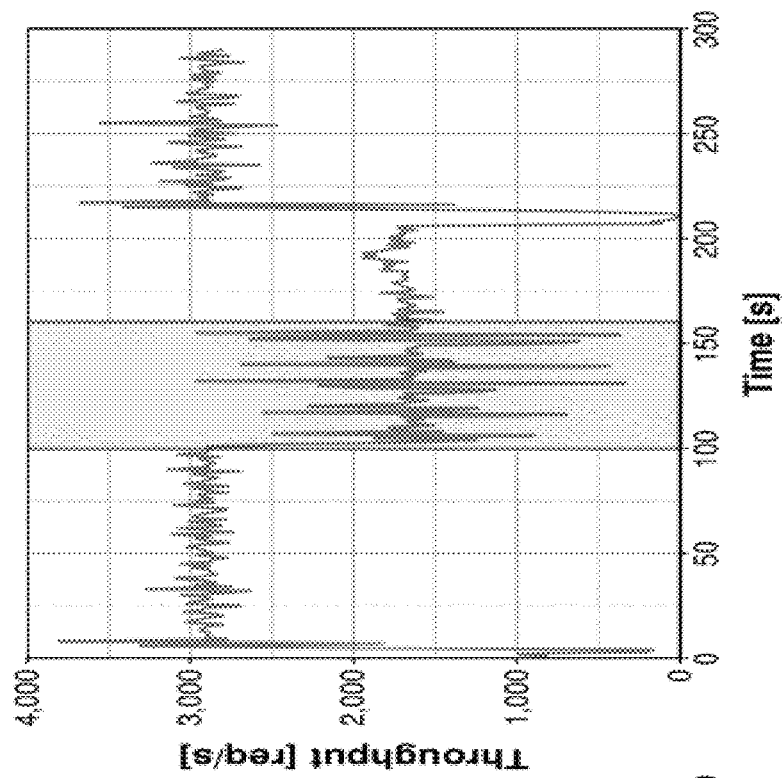
FIGS. 27A and 27B depict performance degradation with controller failure injection with a workload of 1000 requests per second with three and five SDN controllers, respectively.
Figure 27B:
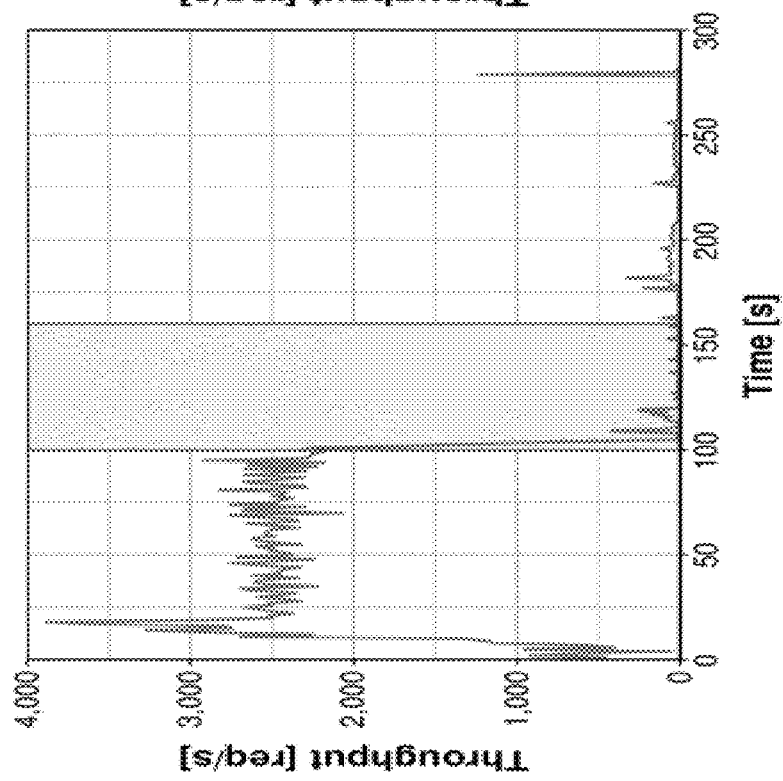
Figure 28A:
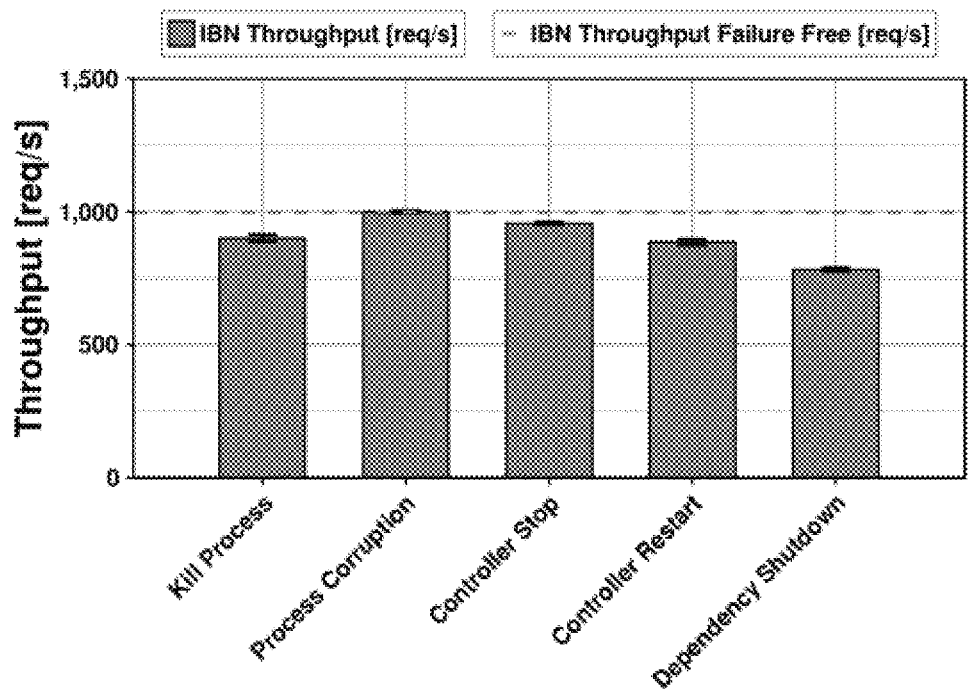
FIGS. 28A and 28B depict throughput with controller failure injection with a workload of 1000 requests per second with three and five SDN controllers, respectively.
Figure 28B:
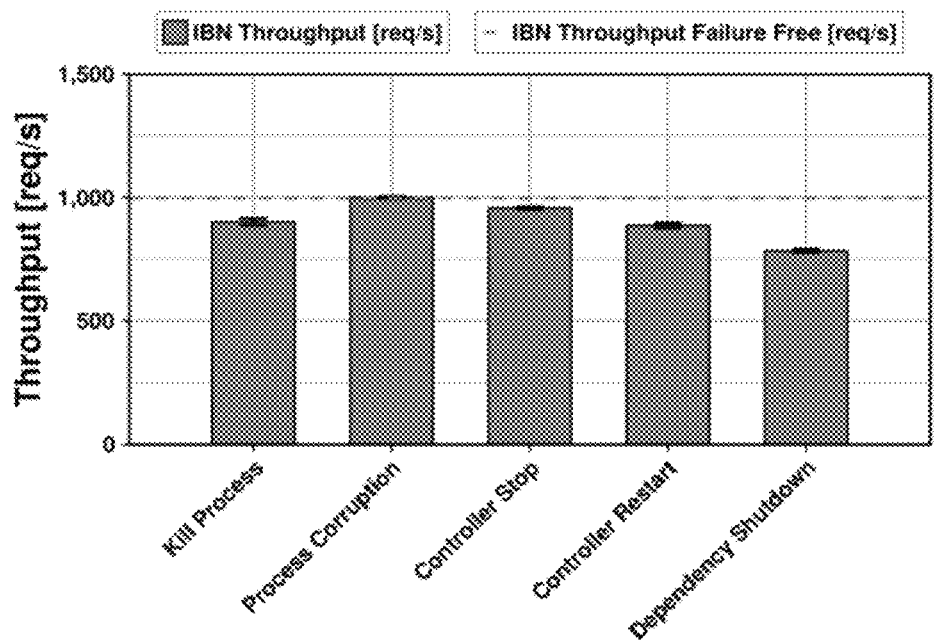
Figure 29A:
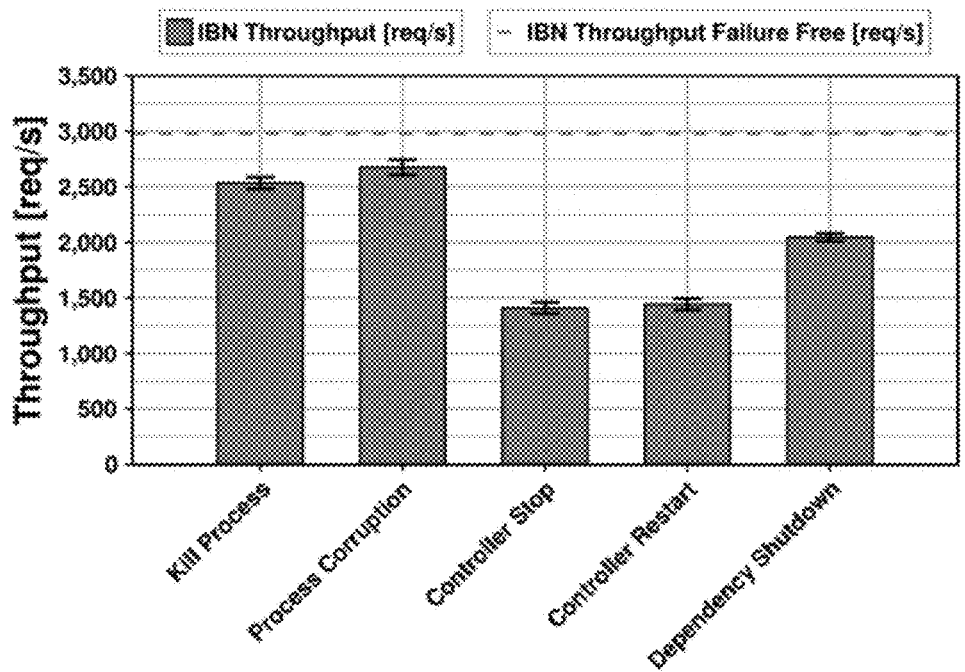
FIGS. 29A and 29B depict throughput with controller failure injection with a workload of 3000 requests per second with three and five SDN controllers, respectively.
Figure 29B:
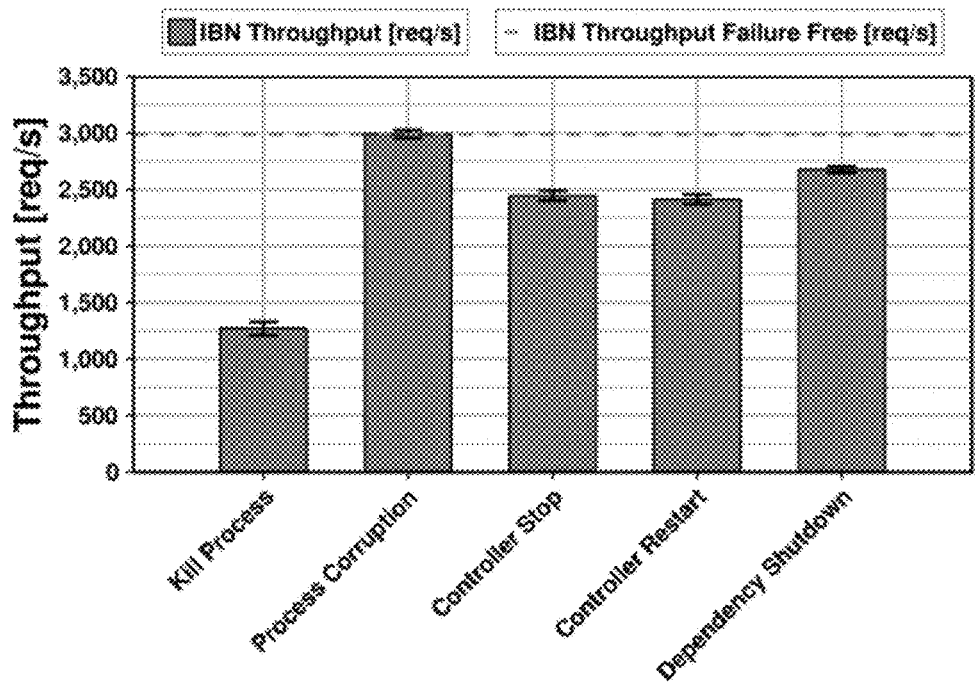
Figure 30A:
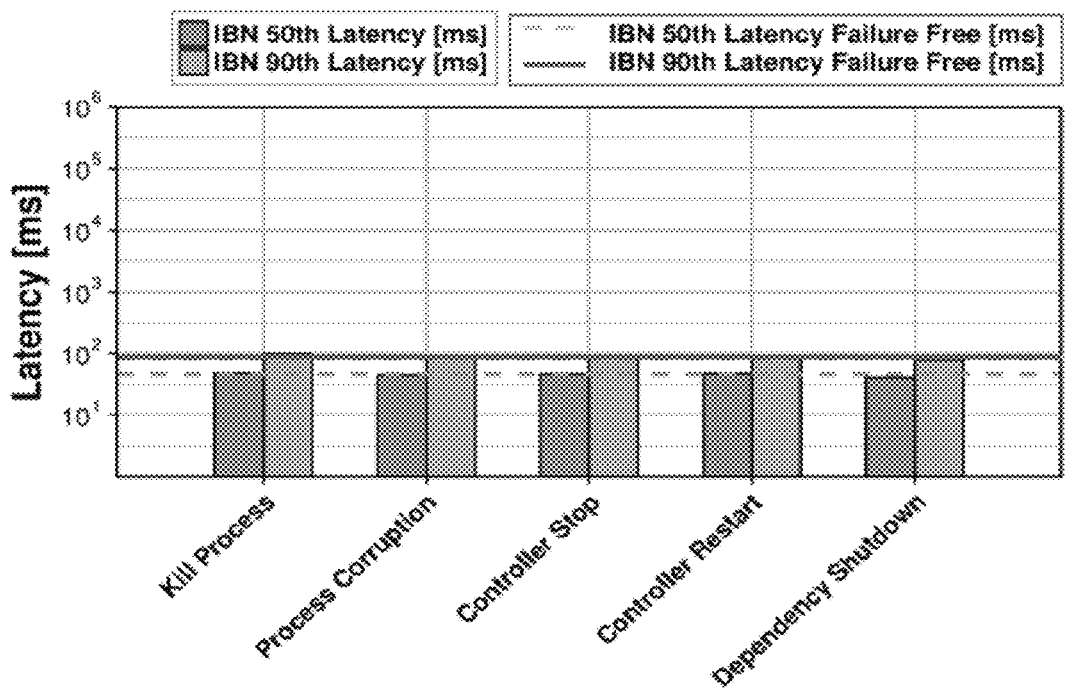
FIGS. 30A and 30B depict service latency with failure injection with a workload of 1000 requests per second with three and five SDN controllers, respectively.
Figure 30B:
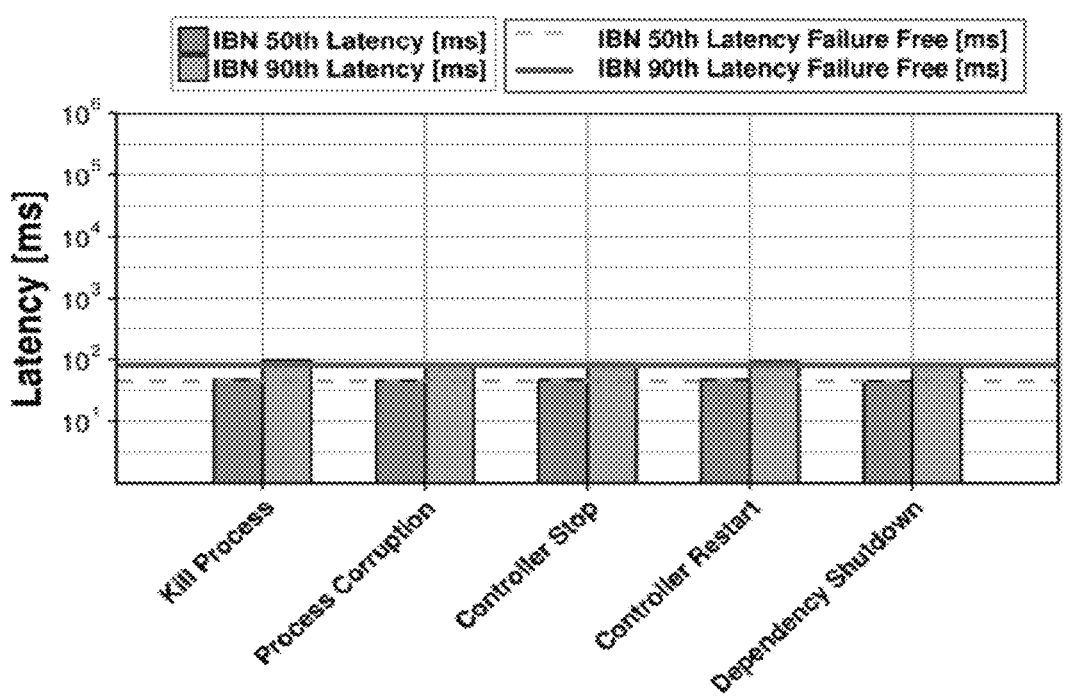

FIGS. 27A and 27B shows an example of the system throughput when a packet reject failure is injected in the target ONOS instance. As may be seen, after the injection time (left line of the red area in FIGS. 27A and 27B) the throughput drastically drops towards zero for the 3 controllers scenario, while undergoing a significant reduction for the scenario with 5 controllers. In the latter case the system appears to be unable to quickly mitigate such failure, taking a long time to recover, even after the failure is removed (right line of the red area in FIGS. 27A and 27B).

It has been determined, based on analysis of the system logs, that the network failures affecting the system performance have led to three major faulty situations as follows.

The first major faulty situation is that the ONOS instances, which keep losing the connectivity with the data plane due to the injection of network failures, try repeatedly, but unsuccessfully, to re-establish the interaction with the data plane, consuming system resources to a remarkable extent.

The second major faulty situation is that, when an ONOS instance is not promptly responsive due to network failures, the other replicas initiate a mastership election for the data plane devices, and for the new assignee of the intents previously managed by the apparently faulty instance. However, they experience issues in reprogramming the device mastership, which in turn triggers further leadership election sessions. This is due to the fact that the ONOS instance is still considered as master by its switches, as it is slow yet not believed crashed. This is especially the case for packet drop, reject, and throttling failures, which lead the cluster in a state in which the controller-device mastership status returns inconsistent results across the various instances.

The third major faulty situation is that, as a consequence of the second major faulty situation, the ONOS replicas keep recompiling and re-executing the failed intents. However, it has been observed that the recompilation or the re-execution process often fails, causing an excessive resource consumption. This is possibly due to the fact that ONOS keeps allocation new threads for the compilation and installation of the intents.

The experimental evaluation of various embodiments for supporting control plane resiliency testing in a software defined network may further understood by considering the experimental results for the experiments where the experiments utilize injection of SDN controller failures for testing the resilience of the control plane of the software defined network.

This section describes the performance results obtained by emulating failures directly affecting the ONOS instance, such as process and dependency failures FIGS. 28A and 28B and FIGS. 29A and 29B show that the controller stop, restart, and dependency shutdown failures, as well as the kill of the Java process of the target instance, cause a non negligible performance loss, both in terms of throughput and latency. These failures lead to the abnormal termination of a target instance, triggering the internal failover mechanism. In particular, the other ONOS instances started a leader election session to elect a new master for all the devices managed by the target instance. This means that, for a brief period (seconds), the cluster will be unavailable.

It is noted that, although the failover seems to work properly in detecting and mitigating the injected failure for the scenario with a low request rate (e.g., 1,000 requests/s), in which it only causes a small degradation of the system throughput, it is not the case of the scenario with a high request rate (e.g., 3,000 requests/s). Indeed, FIGS. 30A and 30B and FIGS. 31A and 31B show that the system suffers a high performance degradation, in terms of throughput and latency. This behavior was due to the service managing the flow rule operations, which repeatedly experienced failure while trying to re-program the data plane devices to restore the intents previously installed by the target node.

It is further noted that the kill process failure shows that sometimes the provided failover mechanisms prove to be inefficient in mitigating the termination of a single replica. Indeed, such failure has introduced a faulty situation, already observed with the injection of other types of failures, in which the ONOS instances keep losing the connection with the data plane devices, thus causing the connected hosts to be removed from the network view. This in turn causes the failure of most of the submitted intents, since it is no longer possible to identify a valid path to create a connection.

Each of these failure was correctly detected by the ONOS failure-free replicas, since the result of such injections is similar to an ONOS replica leaving the cluster. However, these results highlight that although the ONOS replicas were capable to detect the abnormal condition triggered by the failure injection, under a moderate request load as high as 3,000 requests/s, the ONOS mitigation mechanisms prove to be inefficient while dealing with instances leaving or rejoining the distributed cluster.

Figure 31A:
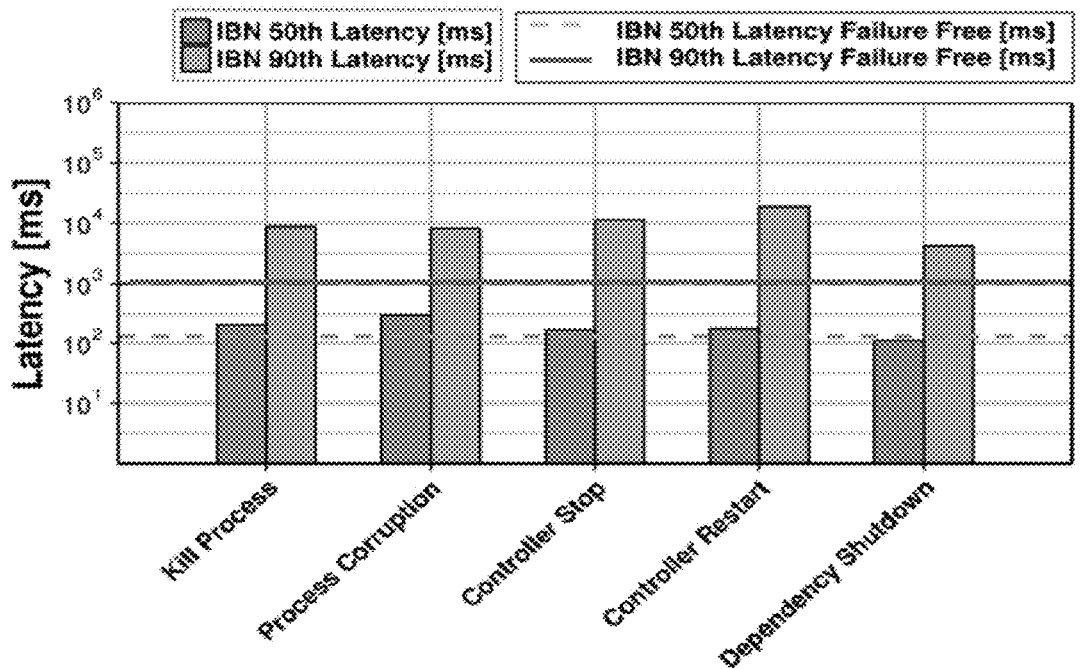
FIGS. 31A and 31B depict service latency with failure injection with a workload of 3000 requests per second with three and five SDN controllers, respectively.
Figure 31B:
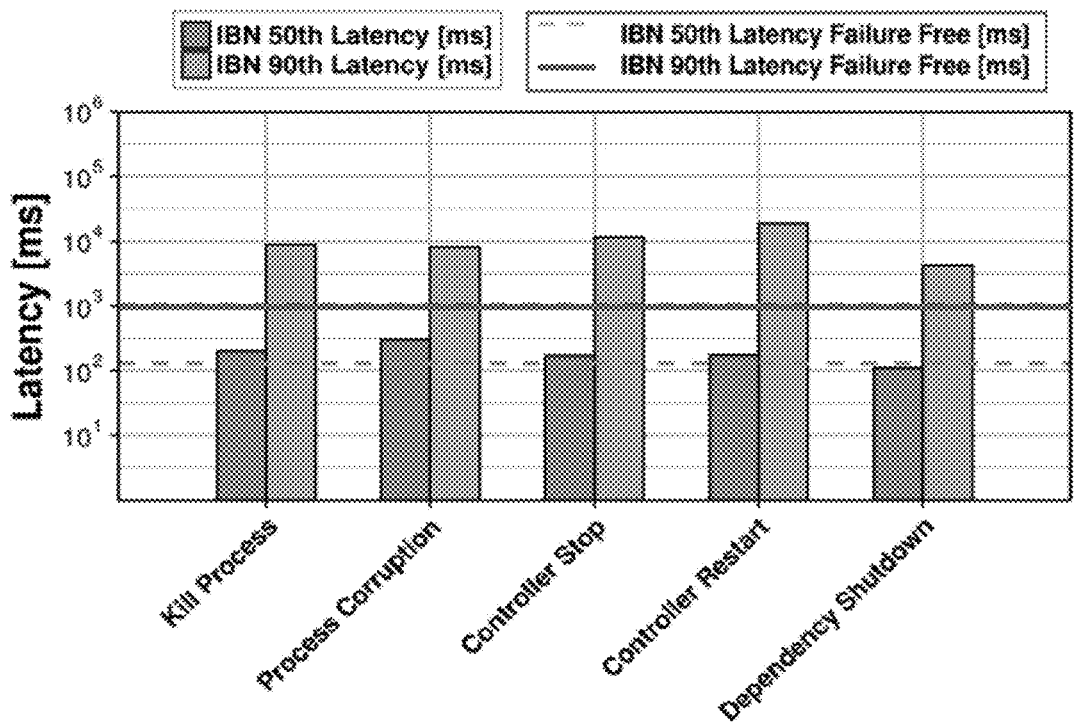

A different story is shown in FIGS. 31A and 31B where a large performance loss can be noticed for both deploy sizes, and most of the injected failures. Specifically, it can be seen that the abnormal termination of a controller instance, due to stop, restart, or kill of its JAVA process, causes a degradation of more than 50% of the throughput in each of the mentioned cases. Moreover, even the simple restart (see FIG. 31A) of the ONOS instance drastically affects the performance of the 3-controller deployment.

It will be appreciated that, although primarily presented with respect to supporting control plane resiliency testing in a software defined network where the software defined network is based on various technologies (e.g., specific types of SDNs, SDN controllers, and so forth), control plane resiliency testing in a software defined network may be supported where the software defined network is based on various other technologies, for various other types of networks in which control plane and data plane functions are separated in a manner similar to software defined networks, or the like, as well as various combinations thereof.

FIG. 32 depicts an example embodiment of a method for use by a manager to support control plane resiliency testing in a software defined network. It will be appreciated that, although primarily presented as being performed serially, at least a portion of the functions of method 3200 may be performed contemporaneously or in a different order than as presented in FIG. 32. At block 3201, the method 3200 begins. At block 3210, send, by a manager toward a target node hosting a controller for a software defined network, a failure injection request configured to request injection of a failure at the target node, wherein the failure injection request includes a set of failure injection parameters including a failure type of the failure. The failure type of the failure may be indicative that the failure is a system failure, a network failure, or a controller failure. The set of failure injection parameters may further include at least one of a failure injection time for the failure or a failure injection duration for the failure. At block 3220, receive, by the manager from the target node, a failure injection response including information indicative of a response to the failure in the software defined network. The information indicative of the response to the failure in the software defined network may include at least one of an indication as to whether a performance degradation was detected in the software defined network as a result of the failure, an indication as to whether an element of the software defined network raised a notification of the failure, a time at which an element of the software defined network raised a notification of the failure, or an indication as to whether a recovery process was successfully completed in response to the failure, or an indication as to whether an intent was successfully processed during the failure. At block 3230, determine, by the manager based on the information indicative of the response to the failure in the software defined network, a measure of resiliency of the software defined network to failures. The measure of resiliency of the software defined network to failures may include a measure of resiliency of a control plane of the software defined network to failures. The measure of resiliency of the software defined network to failures may include at least one of a failure detection coverage computed based on a number of tests in which injected failures are detected and reported and a number of tests in which failures are not detected, a failure detection latency computed based on a time at which the failure was injected at the target node and a time at which a notification of the failure was raised in the software defined network, a failure recovery coverage computed based on a number of tests in which failures were detected and a number of tests in which a recovery action was successfully completed in response to failures, a failure recovery latency computed based on a time at which a notification of the failure was raised in the software defined network and a time at which a recovery action was successfully completed in response to the failure, or an availability computed based on a number of intents requested during the failure and a number of intents successfully processed during the failure. At block 3299, the method 3200 ends.

Figure 33:
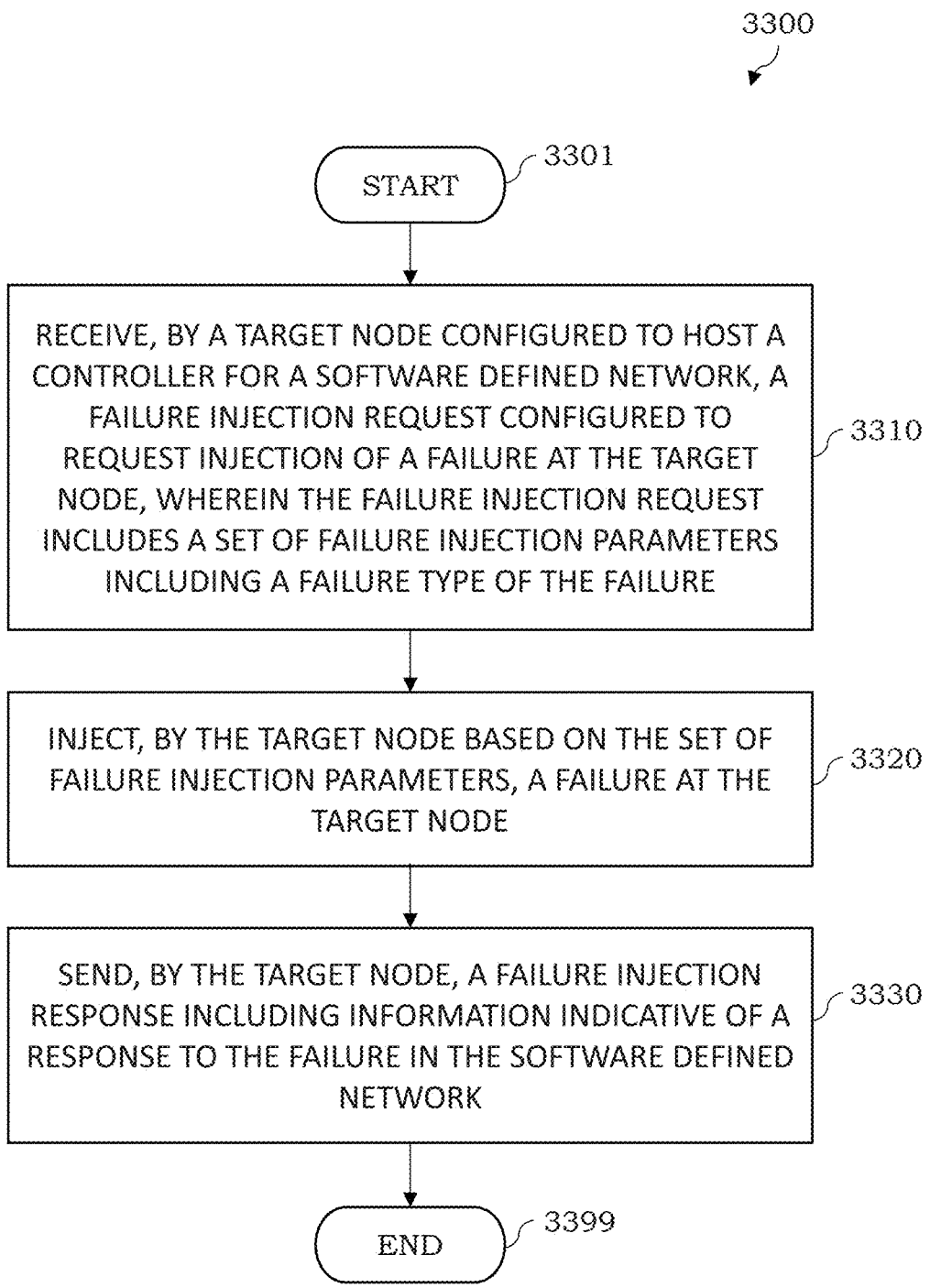
FIG. 33 depicts an example embodiment of a method for use by a node to support control plane resiliency testing in a software defined network.

FIG. 33 depicts an example embodiment of a method for use by a node to support control plane resiliency testing in a software defined network. It will be appreciated that, although primarily presented as being performed serially, at least a portion of the functions of method 3300 may be performed contemporaneously or in a different order than as presented in FIG. 33. At block 3301, the method 3300 begins. At block 3310, receive, by a target node configured to host a controller for a software defined network, a failure injection request configured to request injection of a failure at the target node, wherein the failure injection request includes a set of failure injection parameters including a failure type of the failure. The set of failure injection parameters may further include at least one of a failure injection time for the failure or a failure injection duration for the failure. The failure type of the failure may be indicative that the failure is a system failure (e.g., at least one of a system hang failure, a system starvation failure, a system outage failure, a central processing unit shutdown failure, a disk saturation failure, a memory saturation failure, a burn central processing unit failure, or a burn input/output failure). The failure type of the failure may be indicative that the failure is a network failure (e.g., at least one of a black-hole failure, a packet reject failure, a packet drop failure, a packet latency failure, a packet loss failure, a packet re-order failure, a packet duplication failure, a packet corruption failure, or a throttling failure). The failure type of the failure may be indicative that the failure is a controller failure (e.g., at least one of a kill process failure, a process corruption failure, a controller shutdown failure, a controller restart failure, or a dependency shutdown failure). At block 3320, inject, by the target node based on the set of failure injection parameters, a failure at the target node. The injection of the failure at the target node may include determining, based on the failure type of the failure, whether to direct the failure to host resources of the target node or to the controller for the software defined network. At block 3330, send, by the target node, a failure injection response including information indicative of a response to the failure in the software defined network. The failure injection response may include at least one of an indication as to whether a performance degradation was detected in the software defined network as a result of the failure, an indication as to whether an element of the software defined network raised a notification of the failure, a time at which an element of the software defined network raised a notification of the failure, or an indication as to whether a recovery process was successfully completed in response to the failure, or an indication as to whether an intent was successfully processed during the failure. At block 3399, the method 3300 ends.

Various example embodiments for supporting control plane resiliency testing in a software defined network may provide various advantages or potential advantages. For example, various example embodiments for supporting control plane resiliency testing in a software defined network may be configured to provide an approach to implement an automated methodology for characterizing the resilience of SDNs through a configurable software infrastructure. For example, various example embodiments for supporting control plane resiliency testing in a software defined network may be configured to provide an automated and configurable distributed software infrastructure for testing and measuring resiliency and reliability SLA compliance of SDN controllers when operating under failure conditions. for supporting control plane resiliency testing in a software defined network may be configured to provide a failure injection methodology, conceived for both development and in-production stage assessment, that may include definition of the workload (e.g., according to an IBN model to create a testing plane on demand), providing operating conditions (e.g., configuration and workload) to the testing plane for running the testing plane as a real production environment, injection of failures, selected from a library of failure models, collection of resiliency and reliability metrics based on the injection of failures, and evaluation of SLA compliance based on analysis of the resiliency and reliability metrics. For example, various example embodiments for supporting control plane resiliency testing in a software defined network may be configured to provide automation in the analysis of the SDN control plane resiliency and reliability, providing various advancements in testing and evaluation of SDNs beyond what can be achieved based on traditional software analysis and network testing techniques. For example, various example embodiments for supporting control plane resiliency testing in a software defined network may be configured to automate the creation of failure conditions and collection of associated measurements related to the failure conditions in testing environments (e.g., based on on-demand creation of a testing plane in the testing environment) and production environments (e.g., based on interfacing with the production environment). Various example embodiments for supporting control plane resiliency testing in a software defined network may be configured to support an automated methodology for characterizing the resilience of SDNs through a configurable software infrastructure that may include targeting a distributed SDN platform to perform a resilience assessment under failure scenarios aiming to verify if such systems provide suitable failover mechanisms, reproducing failure scenarios which are representative for SDN ecosystems (e.g. faulty communications between SDN controllers, a faulty controller service, or the like), providing measurements which give valuable insights into the performance and resilience of the SDNs, and so forth. Various example embodiments for supporting control plane resiliency testing in a software defined network may provide various other advantages or potential advantages.

Figure 34:
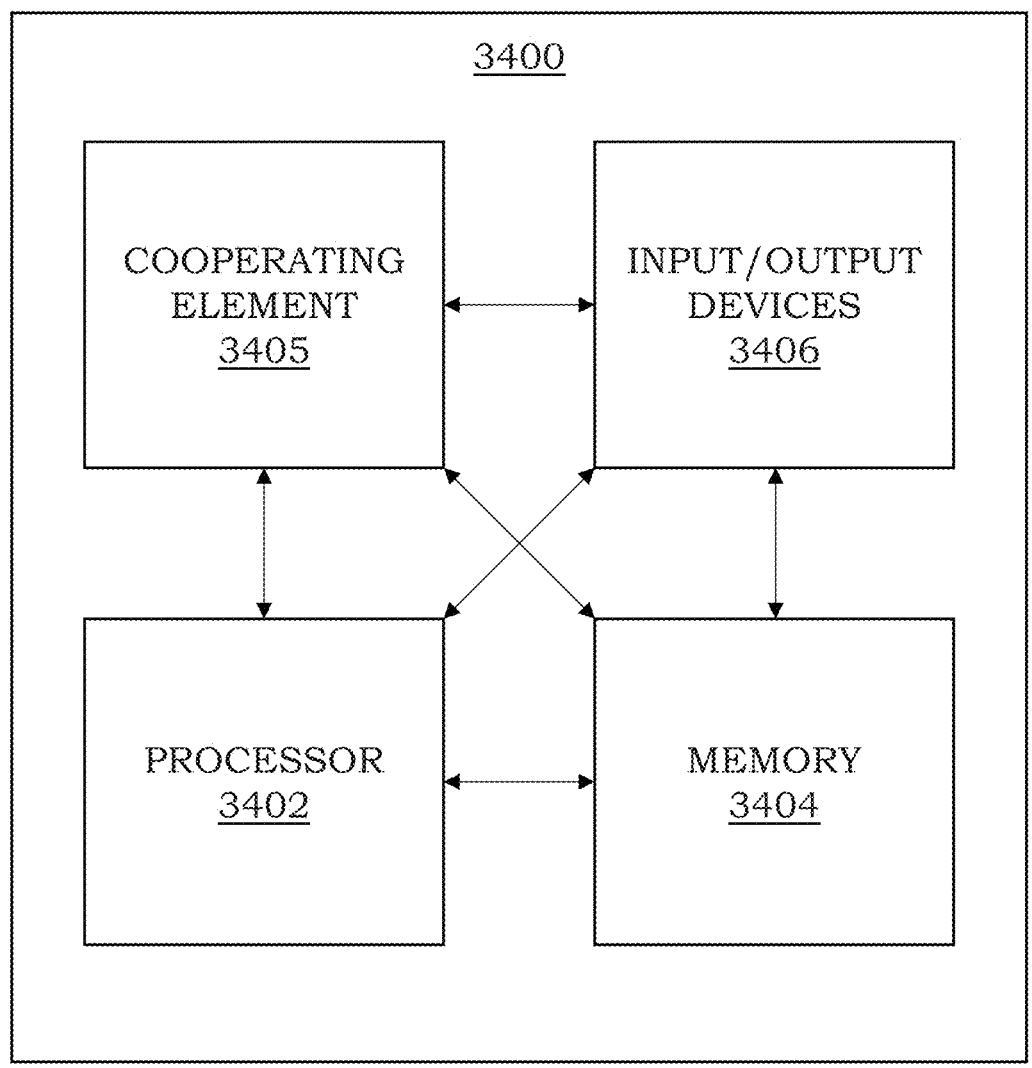
FIG. 34 depicts an example embodiment of a computer suitable for use in performing various functions presented herein.

FIG. 34 depicts an example embodiment of a computer suitable for use in performing various functions presented herein.

The computer 3400 includes a processor 3402 (e.g., a central processing unit (CPU), a processor, a processor having a set of processor cores, a processor core of a processor, or the like) and a memory 3404 (e.g., a random access memory, a read only memory, or the like). The processor 3402 and the memory 3404 may be communicatively connected. In at least some example embodiments, the computer 3400 may include at least one processor and at least one memory including a set of instructions, wherein the set of instructions is configured to, when executed by the at least one processor, cause the computer to perform various functions presented herein.

The computer 3400 also may include a cooperating element 3405. The cooperating element 3405 may be a hardware device. The cooperating element 3405 may be a process that can be loaded into the memory 3404 and executed by the processor 3402 to implement various functions presented herein (in which case, for example, the cooperating element 3405 (including associated data structures) can be stored on a non-transitory computer-readable storage medium, such as a storage device or other suitable type of storage element (e.g., a magnetic drive, an optical drive, or the like)).

The computer 3400 also may include one or more input/output devices 3406. The input/output devices 3406 may include one or more of a user input device (e.g., a keyboard, a keypad, a mouse, a microphone, a camera, or the like), a user output device (e.g., a display, a speaker, or the like), one or more network communication devices or elements (e.g., an input port, an output port, a receiver, a transmitter, a transceiver, or the like), one or more storage devices (e.g., a tape drive, a floppy drive, a hard disk drive, a compact disk drive, or the like), or the like, as well as various combinations thereof.

It will be appreciated that computer 3400 may represent a general architecture and functionality suitable for implementing functional elements described herein, portions of functional elements described herein, or the like, as well as various combinations thereof. For example, computer 3400 may provide a general architecture and functionality that is suitable for implementing one or more elements presented herein, such as network devices (e.g., routers or the like), network controllers, or the like, as well as various combinations thereof.

It will be appreciated that at least some of the functions presented herein may be implemented in software (e.g., via implementation of software on one or more processors, for executing on a general purpose computer (e.g., via execution by one or more processors) so as to provide a special purpose computer, and the like) and/or may be implemented in hardware (e.g., using a general purpose computer, one or more application specific integrated circuits, and/or any other hardware equivalents).

It will be appreciated that at least some of the functions presented herein may be implemented within hardware, for example, as circuitry that cooperates with the processor to perform various functions. Portions of the functions/elements described herein may be implemented as a computer program product wherein computer instructions, when processed by a computer, adapt the operation of the computer such that the methods and/or techniques described herein are invoked or otherwise provided. Instructions for invoking the various methods may be stored in fixed or removable media (e.g., non-transitory computer-readable media), transmitted via a data stream in a broadcast or other signal bearing medium, and/or stored within a memory within a computing device operating according to the instructions.

It will be appreciated that the term "or" as used herein refers to a non-exclusive "or" unless otherwise indicated (e.g., use of "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. An apparatus, comprising:
   at least one processor; and
   at least one memory storing instructions that, when executed by the at least one processor, cause the apparatus at least to:
   send, by a manager toward a target node hosting a controller for a software defined network, a failure injection request configured to request injection of a failure at the target node, wherein the failure injection request includes a set of failure injection parameters including a failure type of the failure;
   receive, by the manager from the target node, a failure injection response including information indicative of a response to the failure in the software defined network; and
   determine, by the manager based on the information indicative of the response to the failure in the software defined network, a measure of resiliency of a control plane of the software defined network to failures, wherein the measure of resiliency of the control plane of the software defined network to failures includes an availability computed based on a number of intents requested during the failure and a number of intents successfully processed during the failure.

2. The apparatus of claim 1, wherein the set of failure injection parameters further includes at least one of a failure injection time for the failure or a failure injection duration for the failure.

3. The apparatus of claim 1, wherein the failure type of the failure is indicative that the failure is a system failure, a network failure, or a controller failure.

4. The apparatus of claim 1, wherein the information indicative of the response to the failure in the software defined network includes at least one of an indication as to whether a performance degradation was detected in the software defined network as a result of the failure, an indication as to whether an element of the software defined network raised a notification of the failure, a time at which an element of the software defined network raised a notification of the failure, or an indication as to whether a recovery process was successfully completed in response to the failure, or an indication as to whether an intent was successfully processed during the failure.

5. An apparatus, comprising:
   at least one processor; and
   at least one memory storing instructions that, when executed by the at least one processor, cause the apparatus at least to:
   send, by a manager toward a target node hosting a controller for a software defined network, a failure injection request configured to request injection of a failure at the target node, wherein the failure injection request includes a set of failure injection parameters including a failure type of the failure;
   receive, by the manager from the target node, a failure injection response including information indicative of a response to the failure in the software defined network; and
   determine, by the manager based on the information indicative of the response to the failure in the software defined network, a measure of resiliency of a control plane of the software defined network to failures, wherein the measure of resiliency of the control plane of the software defined network to failures includes at least one of:
   a failure detection coverage computed based on a number of tests in which injected failures are detected and reported and a number of tests in which failures are not detected, or
   a failure detection latency computed based on a time at which the failure was injected at the target node and a time at which a notification of the failure was raised in the software defined network.

6. An apparatus, comprising:
   at least one processor; and
   at least one memory storing instructions that, when executed by the at least one processor, cause the apparatus at least to:
   send, by a manager toward a target node hosting a controller for a software defined network, a failure injection request configured to request injection of a failure at the target node, wherein the failure injection request includes a set of failure injection parameters including a failure type of the failure;
   receive, by the manager from the target node, a failure injection response including information indicative of a response to the failure in the software defined network; and
   determine, by the manager based on the information indicative of the response to the failure in the software defined network, a measure of resiliency of a control plane of the software defined network to failures, wherein the measure of resiliency of the control plane of the software defined network to failures includes at least one of:
   a failure recovery coverage computed based on a number of tests in which failures were detected and a number of tests in which a recovery action was successfully completed in response to failures, or
   a failure recovery latency computed based on a time at which a notification of the failure was raised in the software defined network and a time at which a recovery action was successfully completed in response to the failure.

* * * * *